US009413775B2

(12) United States Patent
Oakenfull

(10) Patent No.: US 9,413,775 B2
(45) Date of Patent: *Aug. 9, 2016

(54) MACRO GRID GOVERNANCE AND COMMUNICATION

(71) Applicant: International Business Machines Corporation, Armonk, NY (US)

(72) Inventor: Ian E. Oakenfull, Canberra (AU)

(73) Assignee: International Business Machines Corporation, Armonk, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/741,557

(22) Filed: Jun. 17, 2015

(65) Prior Publication Data

US 2015/0304348 A1 Oct. 22, 2015

Related U.S. Application Data

(63) Continuation of application No. 12/963,777, filed on Dec. 9, 2010, now Pat. No. 9,154,362, which is a continuation of application No. 12/541,205, filed on Aug. 14, 2009, now abandoned.

(51) Int. Cl.
*G06N 5/02* (2006.01)
*H04L 29/06* (2006.01)
(Continued)

(52) U.S. Cl.
CPC ............ *H04L 63/1416* (2013.01); *G06N 5/02* (2013.01); *H04L 29/06102* (2013.01); *H04W 4/22* (2013.01); *G06N 5/047* (2013.01); *G06N 99/005* (2013.01); *H04L 29/06* (2013.01); *H04L 63/145* (2013.01); *H04L 69/16* (2013.01)

(58) Field of Classification Search
None
See application file for complete search history.

(56) References Cited

U.S. PATENT DOCUMENTS 5,243,704 A 9/1993 Baty et al.
5,253,141 A 10/1993 Hellwig et al.
(Continued)

OTHER PUBLICATIONS

David J. Scott, "Abstracting application-level security policy for ubiquitous computing", Technical Report No. 613, University of Cambridge Computer laboratory, Cabridge CB3 OFD UK, Jan. 2005, pp. 1-186.*

(Continued)

*Primary Examiner* — Kakali Chaki
*Assistant Examiner* — Walter Hanchak
(74) *Attorney, Agent, or Firm* — Schmeiser, Olsen & Watts, LLP; John Pivnichny

(57) ABSTRACT

A governance apparatus and a communication method for communicating within the governance apparatus. The governance apparatus includes a Government. The Government includes Councils such that a macro grid including an artificial intelligence and the Government is configured to respond to an alert pertaining to an event through use of the artificial intelligence and the Government. The governance apparatus also includes an enhanced Transmission Control Protocol/Internet Protocol (TCP/IP) communication stack of layers including a Governance Layer and an Intelligence Layer. The Intelligence Layer includes intelligence software configured to process data pertaining to the event, data pertaining to the alert, and data pertaining to the Government. The Governance Layer includes governance software configured to filter data in a TCP/IP packet header structure through data security and data integrity algorithms, both to and from the intelligence software in the Intelligence Layer, to protect the artificial intelligence from attack.

9 Claims, 45 Drawing Sheets

(51) Int. Cl.
*H04W 4/22* (2009.01)
*G06N 5/04* (2006.01)
*G06N 99/00* (2010.01)

(56) References Cited

U.S. PATENT DOCUMENTS

| | | | |
|---|---|---|---|
| 5,301,089 | A | 4/1994 | Takashima |
| 5,537,111 | A | 7/1996 | Martin et al. |
| 6,242,984 | B1 | 6/2001 | Stones et al. |
| 6,598,124 | B1 | 7/2003 | Damron et al. |
| 7,343,222 | B2 | 3/2008 | Solomon |
| 7,461,130 | B1 | 12/2008 | AbdelAziz et al. |
| 7,521,138 | B2 | 4/2009 | Pearson |
| 7,594,015 | B2 | 9/2009 | Bozak et al. |
| 7,603,441 | B2 | 10/2009 | Synek et al. |
| 7,962,425 | B1 | 6/2011 | Oakenfull |
| 8,035,337 | B1 | 10/2011 | Oakenfull |
| 8,180,999 | B1 | 5/2012 | Oakenfull |
| 8,429,381 | B1 | 4/2013 | Oakenfull |
| 8,664,911 | B1 | 3/2014 | Oakenfull |
| 8,738,832 | B1 | 5/2014 | Oakenfull |
| 8,819,395 | B2 | 8/2014 | Oakenfull |
| 9,154,362 | B1 | 10/2015 | Oakenfull |
| 2005/0160424 | A1 | 7/2005 | Broussard et al. |
| 2007/0073861 | A1 | 3/2007 | Amanuddin et al. |
| 2008/0027591 | A1 | 1/2008 | Lenser et al. |
| 2008/0133052 | A1 | 6/2008 | Jones et al. |
| 2010/0145536 | A1 | 6/2010 | Masters et al. |
| 2013/0194737 | A1 | 8/2013 | Oakenfull |

OTHER PUBLICATIONS

Heiner Litz, Holger Froening, Mondrian Nuessle, Ulrich Bruening, "VELO: A Novel Communication Engine for Ultra-Low Latency Message Transfers", Proceedings of the 2008 37th International Conference on Parallel Processing (ICPP), 2008, pp. 238-245.*

Rajesh Kota, Rich Oehler, "Horus: Large-Scale Symmetric Multiprocessing for Opteron Systems", Proceedings of IEEE Micro, vol. 25, 2005, pp. 30-40.*

Behrouz Forouzan, "TCP/IP Protocol Suite", McGraw-Hill Higher Education, Boston, USA, 2006, pp. 1-979.*

Jia Yu, Rajkumar Buyya, "A Taxonomy of Workflow Management Systems for Grid Computing", Newsletter ACM SIGMOD Record, vol. 34, Issue 3, Sep. 2005, pp. 44-49.*

Marco Tartagni, Marc Belleville, Eugenio Cantatore, Herve Fanet, Paolo Fiorini, Pierre Nicole, Marcel Pelgrom, Christian Piguet, Robert Hahn, Chris Van Hoof, Ruud Vullers, "Energy Autonomous Systems: Future Trends in Devices, Technology, and Systems", www.catrene.org, 2009, pp. 1-84.*

U.S. Appl. No. 12/494,497, filed Jun. 30, 2009; First Named Inventor Ian Edward Oakenfull; Expressly Abandoned Nov. 19, 2010. Notice of Abandonment Nov. 23, 2010.

U.S. Appl. No. 12/497,818, filed Jul. 6, 2009; First Named Inventor Ian Edward Oakenfull; Expressly Abandoned Nov. 24, 2010. Notice of Abandonment Nov. 29, 2010.

U.S. Appl. No. 12/541,205, filed Aug. 14, 2009; First Named Inventor Ian Edward Oakenfull; Expressly Abandoned Dec. 13, 2010. Notice of Abandonment Dec. 16, 2010.

U.S. Appl. No. 12/609,057, filed Oct. 30, 2009; First Named Inventor Ian Edward Oakenfull; Expressly Abandoned Jan. 21, 2011. Notice of Abandonment Jan. 24, 2011.

U.S. Appl. No. 12/699,128, filed Feb. 3, 2010; First Named Inventor Ian Edward Oakenfull.

U.S. Appl. No. 12/699,177, filed Feb. 3, 2010; First Named Inventor Ian Edward Oakenfull.

U.S. Appl. No. 12/952,716, filed Nov. 23, 2010; First Named Inventor Ian Edward Oakenfull.

U.S. Appl. No. 12/949,059, filed Nov. 18, 2010; First Named Inventor Ian Edward Oakenfull.

U.S. Appl. No. 13/010,123, filed Jan. 20, 2011; First Named Inventor Ian Edward Oakenfull.

Notice of Allowance (Mail Date Feb. 9, 2011) for U.S. Appl. No. 12/952,716, filed Nov. 23, 2010.

Anonymous: "Blade server"; Wikipedia; Jul. 3, 2009; pp. 1-6; XP002601339. [online]. Retrieved from the Internet: < URL: http://en.wikipedia.org/w/index.php?title=Blade_server&oldid=300051901 . [retrieved on Sep. 20, 2010].

Smith et al.; "Towards a Service-Oriented Ad Hoc Grid"; Parallel and Distributed Computing, 2004. Third International Symposium on/Algorithms, Models and Tools for Parallel Computing on Heterogeneous Networks, 2004. Third International Workshop on Cork, Ireland Jul. 5-7, 2004, Piscataway, NJ, USA, IEEE, Jul. 5, 2004. pp. 201-208.

Grnarov, Aksenti et al., "Grid Computing Implementation in Ad Hoc Networks"; 2008; Springer Science; Advances in Computer and Information Sciences and Engineering; pp. 196-201.

Wang et al.; "Wireless Grid Computing over Mobile Ad-Hoc Networks with Mobil Agent"; 2005; Proceedings of the First International Conference on Semantics, Knowledge and Grid (SKG 2005); 3 pages.

U.S. Appl. No. 12/699,128, filed Feb. 3, 2010; First Named Inventor Ian Edward Oakenfull; Expressly Abandoned Mar. 14, 2011.

U.S. Appl. No. 13/045,654, filed Mar. 11, 2011; First Named Inventor Ian Edward Oakenfull.

U.S. Appl. No. 12/699,177, filed Feb. 3, 2010; First Named Inventor Ian Edward Oakenfull; Expressly Abandoned Mar. 16, 2011.

U.S. Appl. No. 13/048,158, filed Mar. 15, 2011; First Named Inventor Ian Edward Oakenfull.

Notice of Allowance (Mail Date May 17, 2011) for U.S. Appl. No. 13/045,654, filed Mar. 11, 2011.

Office Action (Mail Date Sep. 12, 2011) for U.S. Appl. No. 13/048,158, filed Mar. 11, 2011.

Notice of Allowance (Mail Date Jan. 17, 2012) for U.S. Appl. No. 13/048,158, filed Mar. 11, 2011.

U.S. Appl. No. 13/438,267, filed Apr. 3, 2012.

Office Action (Mail Date Aug. 20, 2012) for U.S. Appl. No. 13/438,267, filed Apr. 3, 2012.

Amendment filed Nov. 20, 2012 in response to Office Action (Mail Date Aug. 20, 2012) for U.S. Appl. No. 13/438,267, filed Apr. 3, 2012.

Notice of Allowance (Mail Date Dec. 18, 2012) for U.S. Appl. No. 13/438,267, filed Apr. 3, 2012.

Office Action (Mail Date Jan. 11, 2013) for U.S. Appl. No. 12/949,059, filed Nov. 18, 2010.

Amendment filed Apr. 8, 2013 in response to Office Action (Mail Date Jan. 11, 2013) for U.S. Appl. No. 12/949,059, filed Nov. 18, 2010.

Notice of Allowance (Mail Date Jul. 2, 2013) for U.S. Appl. No. 13/010,123, filed Jan. 20, 2011.

Notice of Allowance (Mail Date Jan. 9, 2014) for U.S. Appl. No. 12/949,059, filed Nov. 18, 2010.

Office Action (Mail Date Nov. 25, 2013 for U.S. Appl. No. 13/790,513, filed Mar. 8, 2013.

Response (Filed Feb. 20, 2014) for U.S. Appl. No. 13/790,513, filed Mar. 8, 2013.

Notice of Allowance (mail date Apr. 18, 2014) for U.S. Appl. No. 13/790,513, filed Mar. 8, 2013.

Office Action (Oct. 1, 2014) for U.S. Appl. No. 12/963,777, filed Dec. 9, 2010.

Amendment (Dec. 31, 2014) for U.S. Appl. No. 12/963,777, filed Dec. 9, 2010.

Notice of Allowance (May 26, 2015) for U.S. Appl. No. 12/963,777, filed Dec. 9, 2010.

Litz et al., VELO: A Novel Communication Engine for Ultra-Low Latency Message Transfers, Proceedings of the 2008 37th International Conference on Parallel Processing (ICPP), 2008, pp. 238-245.

Kota et al., Horus: Large-Scale Symmetric Multiprocessing for Opteron Systems. Proceedings of IEEE Mircro, vol. 25, 2005, pp. 30-40.

Balasubramanian, et al., Channel Adaptive Real-Time MAC Protocols for a Two-Level Heterogeneous Wireless Network, from S. Aluru et al. (Eds): HIPC 2007, LNCS 4873, Springer Verlag, 2007, pp. 625-636.

* cited by examiner

| OPEN SYSTEMS INTERCONNECTION (OSI) MODEL | | | |
|---|---|---|---|
| | DATA UNIT | LAYER | FUNCTION |
| HOST LAYERS | DATA | 7. APPLICATION | NETWORK PROCESS TO APPLICATION |
| | | 6. PRESENTATION | DATA REPRESENTATION AND ENCRYPTION |
| | | 5. SESSION | INTER-HOST COMMUNICATION |
| | SEGMENT | 4. TRANSPORT | END-TO-END CONNECTIONS AND RELIABILITY |
| MEDIA LAYERS | PACKET | 3. NETWORK | PATH DETERMINATION AND LOGICAL ADDRESSING |
| | FRAME | 2. DATA LINK | PHYSICAL ADDRESSING |
| | BIT | 1. PHYSICAL | MEDIA, SIGNAL AND BINARY TRANSMISSION |

| | | | OPEN SYSTEMS INTERCONNECTION (ENHANCED) | | |
|---|---|---|---|---|---|
| | | | | LAYER | FUNCTION |
| VIRTUAL LAYERS | MECHATRONICS | IP ACTUATOR | | 9. INTELLIGENCE | ARTIFICIAL COGNITION AND COMMAND |
| | | IP ALERT SENSOR | TCP HEADER (ENHANCED) | 8. GOVERNANCE | MICRO-GRID ASSIGNMENT, MACRO-GRID EMBODIMENT |
| HOST LAYERS | | | DATA | 7. APPLICATION | NETWORK PROCESS TO APPLICATION |
| | | | | 6. PRESENTATION | DATA REPRESENTATION AND ENCRYPTION |
| | | | | 5. SESSION | INTER-HOST COMMUNICATION |
| | | | SEGMENT | 4. TRANSPORT | END-TO-END CONNECTIONS AND RELIABILITY |
| | | | PACKET | 3. NETWORK | PATH DETERMINATION AND LOGICAL ADDRESSING |
| | | | FRAME | 2. DATA LINK | PHYSICAL ADDRESSING |
| MEDIA LAYERS | | | BIT | 1. PHYSICAL | MEDIA, SIGNAL AND BINARY TRANSMISSION |

| CLASS | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| A | 0 | NETWORK BITS | | | | | | | HOST BITS | | | | | | | | | | | | | | | | | | | | | | | |
| B | 1 | 0 | NETWORK BITS | | | | | | | | | | | | | HOST BITS | | | | | | | | | | | | | | | | |
| C | 1 | 1 | 0 | NETWORK BITS | | | | | | | | | | | | | | | | | | | HOST BITS | | | | | | | | | |
| D | 1 | 1 | 1 | 0 | MULTICAST GROUP | | | | | | | | | | | | | | | | | | | | | | | | | | | |
| E | 1 | 1 | 1 | 1 | 0 | ARTIFICIAL INTELLIGENCE | | | | | | | | | | | | | | | | | | | | | | | | | | |

FIG. 14B

MACRO GRID GOVERNANCE AND COMMUNICATION

This application is a continuation application claiming priority to Ser. No. 12/963,777, filed Dec. 9, 2010, which is a continuation of Ser. No. 12/541,205, filed Aug. 14, 2009, Abandoned.

FIELD OF THE INVENTION

The present invention relates to a method and system for Intelligence, Governance & Communication.

BACKGROUND OF THE INVENTION

Alarms, beeps, whistles, and alerts commonly prevail. People are surrounded by gadgets that warn of everything, from a kettle whistle, a microwave oven beep, a cell phone melody, a washing machine chime, an intruder siren, a door bell, a reversing truck horn, an airplane seat-belt gong, a radar detector buzzer, a target discriminators squeal, an inter-planetary probes micro-wave data burst, a tsunami sensors sonar, a global warning CO2 transponder, etc. The world is becoming domestically, commercially, and militarily swamped by alerts.

Furthermore, the Internet now penetrates the lives of everyone. People accessing the Internet are not only surrounded by voluminous amounts of information, but bombarded by unsolicited web pages, software viruses, inappropriate content, tricksters and conspirers, provided by a global communication system continuing to grow exponentially without appropriate control. The world is becoming swamped with irrelevant non-requested information (frequently by concealed perpetrators), and is structurally restricted of its full potential to automatically respond and administer solutions to situations of need.

Unfortunately, current technology does not provide responses to alerts that utilize resources efficiently with effective communication.

Thus, there is a need for a method, system, and apparatus that provides responses to alerts that utilize resources efficiently with sufficiently effective communication with respect to the Internet.

SUMMARY OF THE INVENTION

The present invention provides a governance apparatus, comprising:

a Government comprising a plurality of governmental components, said governmental components collectively comprising a plurality of Councils such that a macro grid comprising an artificial intelligence and the Government is configured to respond to an alert pertaining to an event through use of the artificial intelligence and the Government, each governmental component being an either an Executive or a Parliament; and a plurality of micro grid apparatuses, each micro grid apparatus being either a simple micro grid apparatus or a complex micro grid apparatus, each complex micro grid apparatus being a connectivity structure, each micro grid apparatus being wirelessly connected to another micro grid apparatus of the plurality of micro grid apparatuses, each micro grid apparatus comprising a unique governmental component of the plurality of governmental components, each Executive consisting of a unique processor of a plurality of processors disposed in a unique simple micro grid apparatus of the plurality of micro grid apparatuses, each Parliament consisting of a unique processor of each plurality of processors of at least two pluralities of processors disposed in a unique complex micro grid apparatus of the plurality of micro grid apparatuses, each processor of each plurality of processors of each micro grid apparatus having its own operating system, each unique processor in each Executive or Parliament in the Government being a Council of the plurality of Councils and having a unique operating system differing from the operating system of each other processor in the plurality of processors that comprises said each unique processor.

The present invention provides a communication method, said method comprising:

providing a governance apparatus, said governance apparatus comprising:

a Government comprising a plurality of governmental components, said governmental components collectively comprising a plurality of Councils such that a macro grid comprising an artificial intelligence and the Government is configured to respond to an alert pertaining to an event through use of the artificial intelligence and the Government, each governmental component being an either an Executive or a Parliament; and a plurality of micro grid apparatuses, each micro grid apparatus being either a simple micro grid apparatus or a complex micro grid apparatus, each complex micro grid apparatus being a connectivity structure, each micro grid apparatus being wirelessly connected to another micro grid apparatus of the plurality of micro grid apparatuses, each micro grid apparatus comprising a unique governmental component of the plurality of governmental components, each Executive consisting of a unique processor of a plurality of processors disposed in a unique simple micro grid apparatus of the plurality of micro grid apparatuses, each Parliament consisting of a unique processor of each plurality of processors of at least two pluralities of processors disposed in a unique complex micro grid apparatus of the plurality of micro grid apparatuses, each processor of each plurality of processors of each micro grid apparatus having its own operating system, each unique processor in each Executive or Parliament in the Government being a Council of the plurality of Councils and having a unique operating system differing from the operating system of each other processor in the plurality of processors that comprises said each unique processor; and communicating between governance entities within the governance apparatus, said Government responding to the alert, each governance entity being a Council of the plurality of Councils, said communicating comprising a first Council of the plurality of Councils sending a message to a second Council of the plurality of Councils in accordance with an enhanced Transmission Control Protocol/Internet Protocol (TCP/IP) communication stack of layers and a TCP/IP packet header structure comprising an enhanced IP header, an enhanced TCP header, and a Data Area.

The present invention provides a method of forming a governance apparatus, said governance apparatus comprising a Government and a plurality of micro grid apparatuses, said method comprising:

forming the Government, said Government comprising a plurality of governmental components, said governmental components collectively comprising a plurality of Councils such that a macro grid comprising an artificial intelligence and the Government is configured to respond to an alert pertaining to an event through use of the artificial intelligence and the Government, each governmental component being an either an Executive or a Parliament; and forming the plurality of micro grid apparatuses, each micro grid apparatus being either a simple micro grid apparatus or a complex micro grid apparatus, each complex micro grid apparatus being a connectivity structure, each micro grid apparatus being wirelessly connected to another micro grid apparatus of the plurality of micro grid apparatuses, each micro grid apparatus comprising a unique governmental component of the plurality of governmental components, each Executive consisting of a unique processor of a plurality of processors disposed in a unique simple micro grid apparatus of the plurality of micro grid apparatuses, each Parliament consisting of a unique processor of each plurality of processors of at least two pluralities of processors disposed in a unique complex micro grid apparatus of the plurality of micro grid apparatuses, each processor of each plurality of processors of each micro grid apparatus having its own operating system, each unique processor in each Executive or Parliament in the Government being a Council of the plurality of Councils and having a unique operating system differing from the operating system of each other processor in the plurality of processors that comprises said each unique processor.

The present invention advantageously provides responses to alerts that utilize resources efficiently with sufficiently effective communication with respect to the Internet.

BRIEF DESCRIPTION OF THE DRAWINGS

FIG. 11A is a diagram depicting an Open Systems Interconnection (OSI) seven layered model for data communication interchange, in accordance with embodiments of the present invention.

FIG. 11B is a diagram depicting an enhanced Open Systems Interconnection (OSI enhanced) nine layered model for micro grid data communication interchange, in accordance with embodiments of the present invention.

FIG. 14B is a diagram depicting the Internet micro grid address (IP Address) Class E structure in the IP header, for micro grid Artificial Intelligence use, in accordance with embodiments of the present invention.

DETAILED DESCRIPTION OF THE INVENTION

The present invention relates generally to grid computing, and more particularly to micro grid and macro grid processing, the functional system purpose, the system structure, and method of system use of the same, that provides for the functionality of a micro grid, additional data buses necessary to interface to a micro grid and macro grid, and each of the system elements' functional relationship with, wireless macro grid alerts under artificial intelligence control. Existing application software, operational system software, communications software, and other software including drivers, interpreters and compilers for micro processor systems can function within embodiments of the present invention.

The detailed description of the invention is presented in the following sections:
  A. Micro Grids and Macro Grids;
  B. Governance;
  C. Macro Grid Communication; and
  D. Data Processing Apparatus.

A. Micro Grids and Macro Grids

Figure 1:
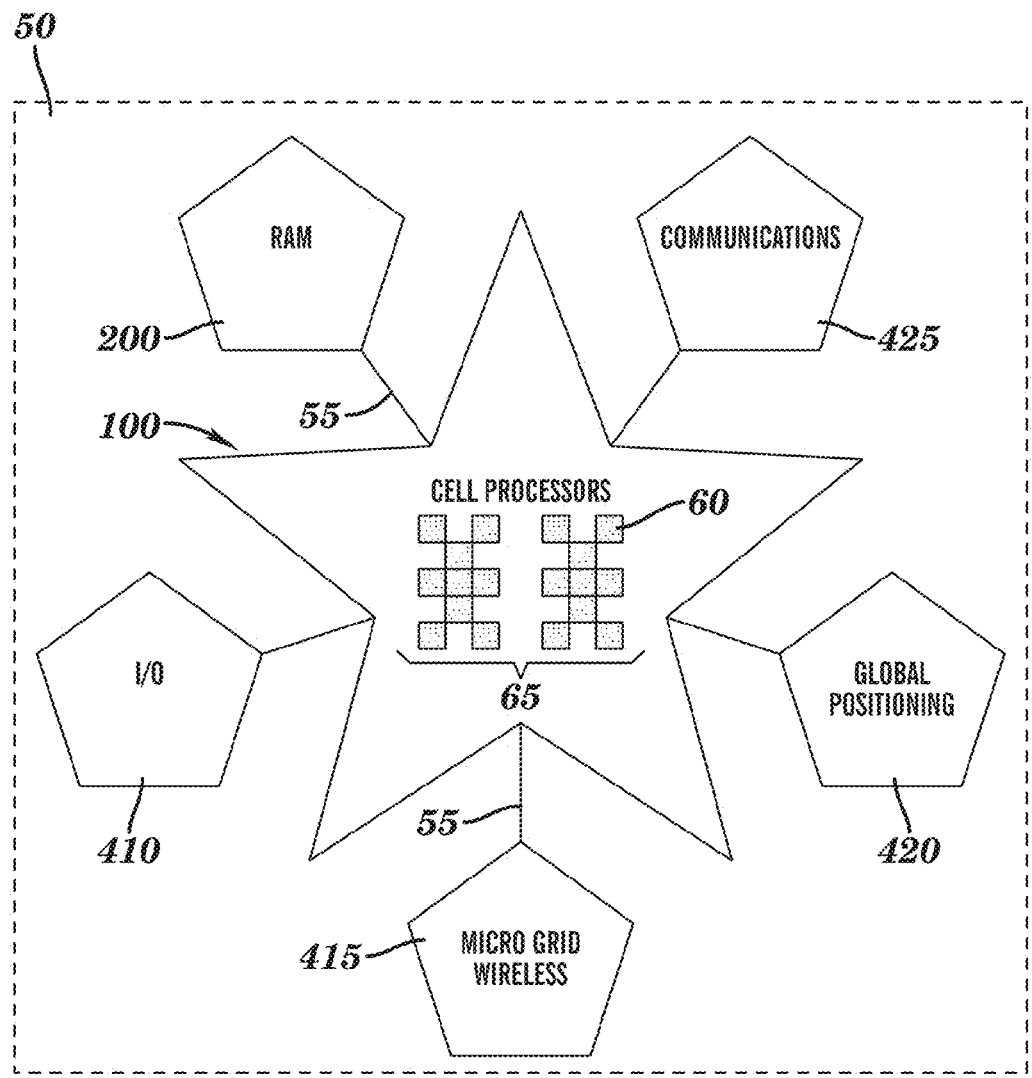
FIG. 1 is a block diagram of a computer system comprising a micro grid apparatus and irregular shaped modules connected to the micro grid apparatus via respective connection interfaces, in accordance with embodiments of the present invention.

FIG. 1 is a block diagram of a computer system 50 comprising a micro grid apparatus 100 and irregular shaped modules 200, 410, 415, 420, and 425 connected to the micro grid apparatus 100 via respective connection interfaces 55, in accordance with embodiments of the present invention. The micro grid apparatus 100 is also called a "complex shape".

The micro grid apparatus 100 is configured to enable the irregular shaped modules 200, 410, 415, 420, and 425 to be geometrically connected thereto via the respective connection interfaces 55. The connection interfaces 55 accommodate a V-shaped geometric connection between the irregular shaped modules 200, 410, 415, 420, and 425 and the complex shape of the micro grid apparatus 100.

Figure 2A:
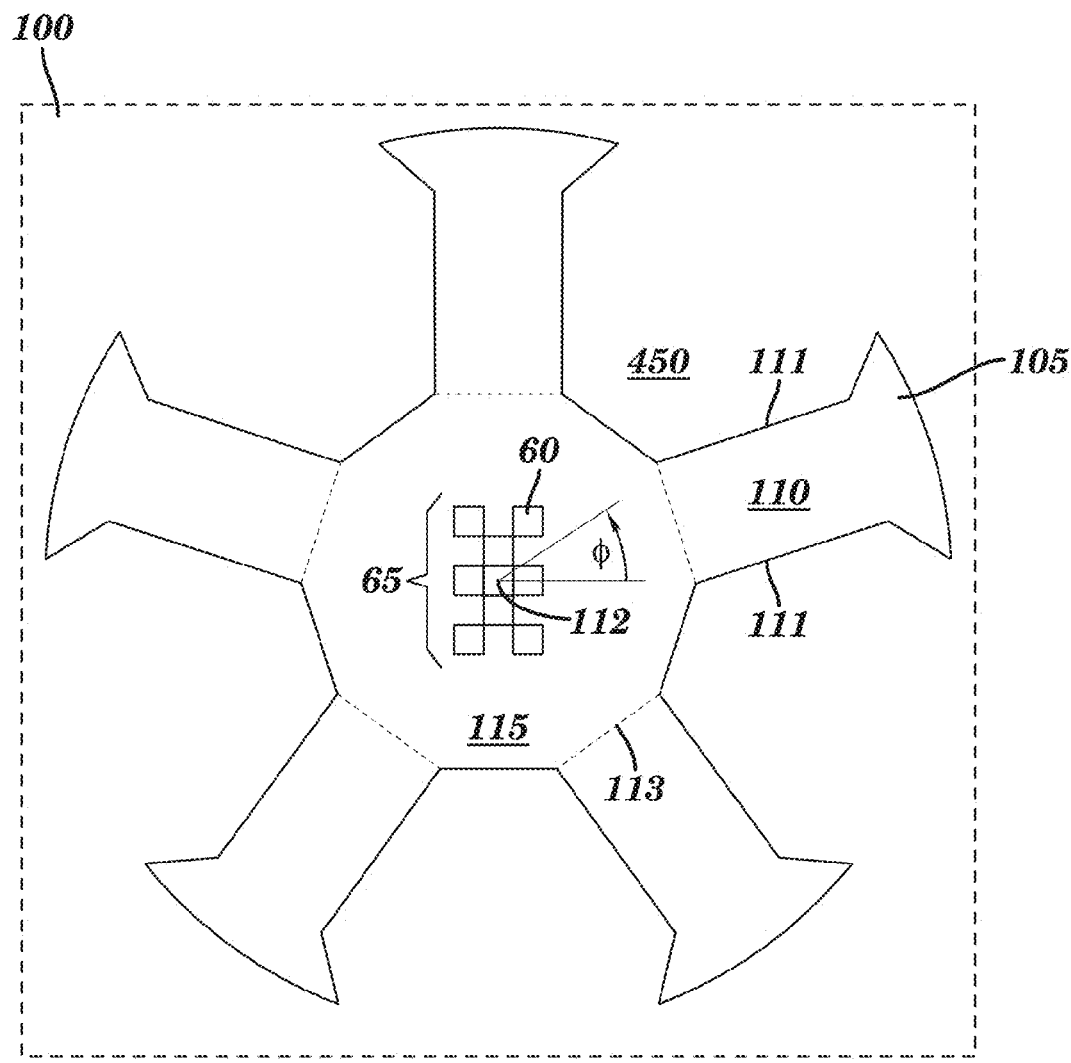
FIG. 2A is a diagram depicting the micro grid apparatus of FIG. 1, in accordance with embodiments of the present invention.

The micro grid apparatus 100 comprises a central area 115 (see FIG. 2A) that includes a micro grid, wherein the micro grid comprises a plurality of processors 65. In one embodiment, each processor of the plurality of processors 65 has a unique Internet Protocol (IP) address. The reference numeral "65" refers to the collection of processors that the plurality of processors consists of. In embodiments of the present invention, the plurality of processors 65 consists of nine or eighteen individual processors. In practice, the number of processors may be determined by design criteria, manufacturing considerations, etc. In FIG. 2A, a central area 115 of the micro grid apparatus 100 having a complex shape comprises a plurality of processors 65 consisting of nine processors with connection to a micro grid wireless module of irregular shape 415 and four other types of add-on hardware interface modules of the irregular shaped modules 200, 410, 420, and 425 (see FIG. 1) accommodated in the five docking bays 450. The central area 115 comprises a plurality of processors 65 that are linked together wirelessly or by direct electrical connection, and the plurality of processors 65 are linked wirelessly or by direct electrical connection to each irregular shaped module.

Each processor of the plurality of processors 65 has its own individual operating system and assigned resources (e.g., cache memory—not shown). The operating system within each processor of the micro grid apparatus 100 controls the programmatic housekeeping and individual processor availability and assignment of the micro grid, including allocation of random access memory of irregular shape 200 to the processors with common types of operating systems within the micro grid apparatus 100, and other communication interfaces of irregular shape 425. The processors within the apparatus 100 are linked by multiple data buses (not shown) for data transfer and electrical connection to each other where they collectively reside with their individual cache memory and cache controllers in the same physical apparatus. Contemporaneously, there are multiple operating systems actively functioning in the different processors of the same physical micro grid apparatus 100.

An assembled micro grid apparatus structure of the present invention is constructed from two physically different components: (1) the complex shape of the micro grid apparatus 100, which may embody the central processing unit's cell wafer including the associated cache memory, the cache controllers, and the associated electronic circuits of the micro grid apparatus 100; and (2) the closely packed modular irregular shaped modules (e.g., 200, 410, 415, 420, 425 for which there are five docking bays provided) and/or bridge modules as discussed infra in conjunction with FIG. 8.

In FIG. 1, the five different irregular shaped modules, which may be selected and assembled for functional use by the micro grid apparatus 100, include: (1) the irregular shape 200 which embodies random access memory (RAM); (2) the irregular shape 425 which embodies communications comprising Transmission Control Protocol/Internet Protocol (TCP/IP) Ethernet, cable, and/or fiber optic communications; (3) the irregular shape 420 which embodies a Global Positioning System (GPS); (4) the irregular shape 415 which embodies micro grid wireless connection points (e.g., 18×802.11s micro grid wireless connection points); and (5) the irregular shape 410 which embodies input and output (I/O) support including data buffers for serial and parallel linked peripheral components and devices.

The irregular shaped modules 200, 410, 415, 420, and 425 are interchangeable and fit any docking bay in the micro grid apparatus 100 as determined by system architectural design. Different combinations, including multiples of one type of irregular shape, are permitted in an assembled apparatus. For example, three RAM modules 200, a micro grid wireless module 415, and a global positioning module 420 would facilitate a mobile micro grid apparatus 100 with a particularly large amount of memory; however it would not have I/O, or physical connectable communication functionality. Each irregular module is coupled by high speed bi-directional data buses available at the connection interface (e.g., 'V' shaped connection interface) 55. The total number of such data buses is equal to the total number of processors of the plurality of processors. For example, if the total number of such processors is 18, then the total number of such data buses is 18. The processors of the plurality of processors 65 contained in the complex shape of the micro grid apparatus 100 communicate individually via each of the available individual data buses (e.g., of 18 data buses) to the irregular shaped module 415, connected by the 'V' shaped connection interface 55.

The plurality of processors 65 includes a unique processor 60 having its unique operating system and is included among the associated micro grid of processors 65, and may include associated internal cache memory and cache memory control, main random access memory 200 for storing data and instructions while running application programs, a mass-data-storage device, such as a disk drive for more permanent storage of data and instructions, peripheral components such as monitors, keyboard, pointing devices, sensors and actuators which connect to the I/O module 410, data and control buses for coupling the unique processor 60 and its operating system to the micro grid processors and components of the computer system, and a connection bus 55 for coupling the micro grid processors and components of the computer system. FIG. 8, described infra, depicts an exemplary data processing apparatus in which any processor of the present invention may function.

The present invention utilizes one or more operating systems residing in single processors, and multiple operating systems residing in multiple processors, such as may be embodied on the same wafer, can be constructed with known software design tools and manufacturing methods.

The computer system 50 provides the following functionalities:

1. Containment of the micro grid apparatus 100 and its I/O capability for detecting local alerts and peripheral device interfacing with I/O module 410, its communications capability for receiving alerts via communications module 425, its global positioning system module 420 for detecting location and change of location when mobile, its multiple wireless communications ability for data interchange via the micro grid wireless module 415, and its system memory storage via RAM module 200, embodied in a single apparatus incorporating a single complex shape, and coupled to selectable and interchangeable modules of irregular shape (e.g., module 415) is provided for.

2. Enablement to heat dissipation of the complex shape of the micro grid apparatus 100 is provided for by two surfaces being available without obstruction by connection pins. Thus in one embodiment, no connection pins are connected to either or both of a top surface and a bottom surfaces of the central area 115. This physical method of forming the apparatus doubles the available surface area for heat dissipation capability and enhances known heat dissipation techniques for micro processors. The underside connection pins of the complex shape may be provided only on the radial arms to functionally facilitate dual heat dissipation contact devices on the top and underside of the complex shape. Thus in one embodiment, connection pins are connected to a bottom surface of at least one radial arm of the radial arms 110 and not to a top surface any radial arm 110. A suitable hole in the mountable multi-layered printed circuit board under the complex shape will accommodate the underside heat dissipation device.

3. Enablement of modularity in micro computer structural design of the computer system 50 is provided by selecting all or any multiple combinations of available irregular shaped modules (e.g., 200, 410, 415, 420, and/or 425) and other 'interconnecting modules'. The method of the present invention forms a modular design with flexibility that provides for generalized micro grid functionality, as well as specialized micro grid functionality, and provides customized design functionality for larger and more complex grid computing systems constructed from a plurality of interconnected micro grids.

4. Enablement of scaleable designs of the micro grid apparatus (by use and interconnection of multiple complex shapes) is provided for grid computing.

5. Enablement of micro grid hardware design change and working system reconfiguration of a micro grid's functionality is provided. Irregular shaped modules (e.g., 200, 410, 415, 420, and/or 425) can be mechanically extracted from the complex shape and other irregular shaped modules selected and mechanically inserted in the resultant vacant docking bay as a design change preference to alter the micro grid functional design. A change of the irregular shaped modules 200, 410, 415, 420, and/or 425 provides for system software diversity by reconfiguration for a micro grid's functionality.

6. Enablement of robotic micro grid maintenance and remote design change is provided. The irregular shaped modules are designed for ease of extraction and replacement. This feature enhances techniques for microprocessor maintenance by system engineers and facilitates robotic intervention for hardware fault elimination of irregular shaped modules in remote or dangerous locations (e.g., spacecraft probes in hostile atmospheres).

7. Enablement of dynamic change of the operating system software functioning in each micro grid processor, by instruction from the unique processor 60, to function within the embodiment of a single apparatus as a macro grid processor with it's assigned micro grid processors, independently generated and wirelessly connected. The macro grid processor connects wirelessly the wireless module 415 to other adjacent macro grid processors forming a macro grid across which a transient and mobile artificial intelligence resides.

FIG. 2A is a diagram depicting the micro grid apparatus 100 of FIG. 1, in accordance with embodiments of the present invention. The micro grid apparatus 100 comprises a central area 115 and five radial arms 110, wherein the radial arms 110 are external to and integral with the central area 115. A micro grid apparatus generally comprises a plurality of radial arms. For example, the number of radial arms may consist of 2, 3, 4, 5, 6, 7, 8, 9, 10, 11, 12, etc. or at least 2, 3, 4, 5, 6, 7, 8, 9, 10, 11, 12, etc. The central area 115 of the micro grid apparatus 100 provides hardware containment of a basic micro grid of 9 processors 65 each with its own operating system. The unique processor 60 has a unique operating system that differs from the operating system of each of the other processors. The unique processor 60 governs all other processors of the plurality of processors 65. The docking bays 450 are defined by adjacent radial arms 110 and accommodate irregular shaped modules such as irregular shaped modules 200, 410, 415, 420, and/or 425 discussed supra in conjunction with FIG. 1.

The processors are linked to each other via a system bus (not shown), a micro grid bus (not shown) and a macro grid bus (not shown). Known existing (and future designed) application software, operational system software, communications software, and other software including drivers, interpreters and compilers for micro processor systems may function within the embodiments of the present invention. Any irregular shaped module is able to connect to any of the five docking bays available in the complex ceramic chip structure in any combination, including the arrangement of five bridge modules attached to one complex ceramic chip structure. In one embodiment, Terrestrial and 802.11g Wireless Communication protocols and standards may be employed for use in the present invention. In one embodiment, the Mesh Wireless Communication 802.11s standard may be employed for use in the present invention. Circumstances (e.g., manufacturing, research, etc.) determine standards (e.g., 802.11g, 802.11s, and other existing wireless standards and future standards) that may be used in different embodiments or in different combinations in the same embodiment (e.g., inclusion of communication techniques such as 'Bluetooth').

In one embodiment, the outer curved edge 105 of the radial arm 110 is physically manufactured to the shape of a circle, resulting in the outer curved edge 105 of the radial arms 110 being at a radial distance (e.g., of 5 cm in this example) from a radial center 112 of the circle (i.e., the circle has a diameter of 10 cm in this example) within the central area 115 of the micro grid apparatus 100. Each radial arm 110 extends radially outward from the central area 115 and has an outer curved edge 105 disposed at a constant radial distance from the radial center 112. Thus, the outer curved edges 105 of the radial arms 110 collectively define a shape of a circle centered at the constant radial distance from the radial center 112. The circle has a diameter exceeding a maximum linear dimension of the central area 115. Each pair of adjacent radial arms 110 defines at least one docking bay 450 into which an irregular shaped module can be inserted. The total number of docking bays 450 is equal to the total number of radial arms 110. In one embodiment, one or more irregular shaped modules are inserted into respective docking bays 450 defined by adjacent radial arms 110. In one embodiment, the radial arms 110 are uniformly distributed in azimuthal angle $\phi$ about the radial center 112. In one embodiment, the radial arms 110 are non-uniformly distributed in azimuthal angle $\phi$ about the radial center 112, which may be employed to accommodate different sized irregular shaped modules with corresponding radial arms 110 that present different sizes and shapes of their 'V' interface.

The central area 115 of the micro grid apparatus 100 comprises a plurality of processors 65 that are electrically linked together and are electrically linked to each irregular shaped module that is inserted into a respective docking bay 450 defined by adjacent radial arms 110. The central area 115 has a polygonal shape (i.e., a shape of a polygon 113) whose number of sides is twice the number of radial arms 110. The dashed lines of the polygon 113 do not represent physical structure but are shown to clarify the polygonal shape of the polygon 113. In FIG. 2A, the polygon 113 has 10 sides which corresponds to the 5 radial arms 110. The polygon of the polygonal shape of the micro grid apparatus 100 may be a regular polygon (i.e., the sides of the polygon have the same length and the internal angles of the polygon are equal to each other) or an irregular polygon (i.e., not a regular polygon). The radial arms 110 may be uniformly distributed in azimuthal angle $\phi$ about the radial center 112. The radial arms 110 being uniformly distributed in azimuthal angle $\phi$ about the radial center 112 is a necessary but not sufficient condition for the polygon of the polygonal shape of the micro grid apparatus 100 to be a regular polygon. Accordingly, the radial arms 110 may be uniformly distributed in azimuthal angle $\phi$ about the radial center 112 such that the polygon is not a regular polygon. In one embodiment, the radial arms 110 are non-uniformly distributed in azimuthal angle $\phi$ about the radial center 112.

The central area 115 is structurally devoid of connection pins on the top and underside surfaces, enabling direct contact with heat dissipation devices on both surfaces. The radial arms 110 have connection pins on the underside (i.e., bottom) surface.

Five docking bays 450 for the irregular shaped modules (200, 410, 415, 420, 425) are provided between the radial arms 110. Each radial arm 110 has parallel sides 111 oriented in a radial direction and are 1.4 cm wide in this example. The arc at the outer curved edge 105 of the radial arm 110 has a chord of 2.7 cm in this example.

The connection interface 55 provides an electrical connection 'V' point for a system bus between the complex structure and the irregular shaped modules and is available along the edge of the docking bay 450 of the pentagonal shape of the central area 115 of the complex shape. The bus comprises individual bi-directional data buses (e.g., 18 data buses) capable of connecting the micro grid processors (e.g., 18 processors) with their own operating systems to their own individual wireless devices contained in the irregular shaped module 415 for micro grid wireless connection points. The mechanical connection is achieved by the irregular shaped module 415 press fitting its wedged connection point edge into a 'V' edged protrusion along the length of the complex shape; i.e., the docking bay's pentagonal edge.

Figure 2B:
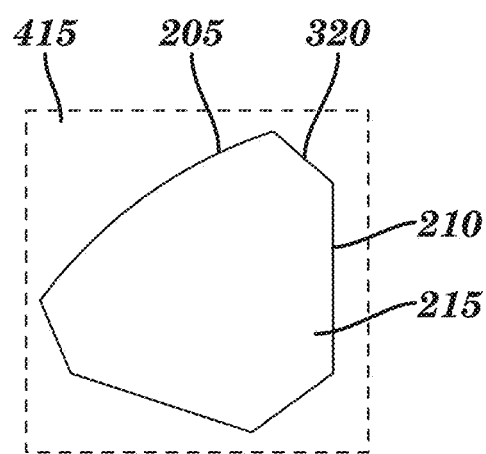
FIG. 2B is a diagram showing an irregular shaped module, in accordance with embodiments of the present invention.

FIG. 2B is a diagram showing an irregular shaped module 415, in accordance with embodiments of the present invention. The irregular shaped module 415 in FIG. 2B may alternatively be any other irregular shaped module such as the irregular shaped module 200, 410, 420, or 425. The irregular shaped module in FIG. 2B contains chip structure to provide hardware containment of the micro grid wireless interfaces and is ensconced in place with downward pressure on the curved edge 205 within the embrace of the docking bay after their electrical connection 'V' shaped receptacle edge has been positioned correctly and is in contact with the electrical connections of the complex shape's 'V' protrusion edge. The curved edge 205 in FIG. 2B is analogous to the curved edge 105 in FIG. 2A.

The latching mechanism on the radial arms 110 of the complex shape in FIG. 2A is provided as a raised and rounded protrusion of about 1.5 mm height×about 3.5 mm length along the edge 320 of both sides of the irregular module shape 415 in this example. This protrusion fits a receptacle with the same characteristics to receive the complex shape, on all the radial arm edges of the complex shape. In one embodiment, the irregular shaped modules are manufactured from a slightly softer molded material to provide the mechanical contraction against the harder ceramic form of the complex shaped module, thus enabling the latching mechanism to work. In one embodiment, the manufacturing is configured to create a relatively softer complex shaped module to accept relatively harder irregular shaped modules.

The irregular shapes are manufactured to fit perfectly within the docking bay 450 (see FIG. 2A), with less than 0.1 mm of gap tolerance around the non contact edges in this example. The gap tolerance (0.1 mm or otherwise) is determined by the mechanics of the protrusion and receptacle mechanical latching mechanism described supra. The chord of the curved edge 205 is 3.5 cm and the non-contact side 210 of the irregular shaped module is 2.2 cm in length in this example. Connection pins are not present on the irregular shaped module, and similar to the complex shape, both top surfaces 215 and underside surfaces are available for contact with heat dissipation devices. External system devices such as a disk drive (not shown) for more permanent storage of data and instructions, and peripheral components such as monitors, keyboard, pointing devices, sensors and actuators, connect via the underside pins on the radial arms of the complex shape to the I/O irregular shaped module 410.

Similarly, the global positioning irregular shaped module 420 and the communications irregular shaped module 425 connect to their external associated hardware (i.e., physical antenna, cable and fiber connections) via the underside pins on the radial arms of the complex shape. The RAM irregular shaped module 200) and micro grid wireless module 415 do not necessarily require the use of connection pins under the complex shape as they are self contained and do not have any associated external hardware.

In accordance with the present invention, each individual processor can participate as a member of the micro grid apparatus 100 and may be conscripted for functional use from within the micro grid apparatus 100 by one uniquely assigned processor (e.g., by processor 60) with its individual operating system. Each processor of the plurality of processors 65 has its own individual operating system and assigned resources (e.g., cache memory—not shown) and is available to participate either by direct connection and/or wirelessly (802.11g), either individually and/or collectively, on demand, from within the embodiment of the micro grid apparatus 100 to an external dynamically expanding and contracting wireless macro grid, comprised of conscripted and participating processors, from a plurality of participating micro grids according to embodiments of the present invention. Each processor of common processors within the micro grid apparatus 100 with the same type of individual operating system and assigned resources is available for functional use as a wirelessly connected participant of one or more macro grids.

A macro grid comprises a set of processors conscripted from one or more micro grid apparatuses to become macro grid processors within the macro grid. A macro grid may also include other computational resources which do not function as a macro grid processors, such as other micro grid processors of the one or more micro grid apparatuses.

A macro grid may dynamically change as a function of time. The macro grid has a geographical footprint, which is spatial contour defined by the macro grid processors in a macro grid. The spatial contour of the geographical footprint may be generated by fitting a curve to the geographical locations of the macro grid processors in a macro grid at a given instant of time. The geographical footprint (i.e., the spatial contour) of a macro grid expands or contracts dynamically as macro grid processors are added or removed, respectively, from the macro grid and also as the spatial location of one or more macro grid processors in the macro grid change as a function of time.

Conscripted micro grid processors that are participants in a macro grid could be physically contained within the confines of a moving vehicle, a flying airplane, a sailing ship, a walking person, etc. Thus, the mobility of macro grid processors contributes to dynamic changes in the macro grid.

An artificial intelligence of the present invention is intelligent software implemented by a macro grid (i.e., by the macro grid processors in a macro grid) to perform a task or a set of tasks in real time in response to detection of an alert pertaining to an event. The alert may be detected by a unique processor 60 residing in the plurality of processors in the complex shape of the micro grid apparatus 100. In one embodiment, the artificial intelligence (i.e., the intelligent software) of a macro grid is located in a single macro grid processor of the macro grid. In one embodiment, the artificial intelligence is distributed among a plurality of macro grid processors of the macro grid (i.e., different portions of the software comprised by the artificial intelligence are stored in different macro grid processors of the macro grid). In one embodiment, the artificial intelligence is distributed and stored among all of the macro grid processors of the macro grid. The location of the artificial intelligence in the macro grid may be static (i.e., unchanging) or may dynamically change in accordance with a transient evolution of the macro grid as the response to the alert develops over time and eventually reduces and terminates as the specific event associated with the alert diminishes and is quenched. In addition, the mobility macro grid processors of a macro grid may be accompanied by locational changes in the artificial intelligence associated with the macro grid.

The scope of logic, decision making, and any other intelligent functionality in an artificial intelligence of the present invention includes the current state of knowledge, and enablement of that knowledge for practical utilization, known to a person of ordinary skill in the field of artificial intelligence at any time that the present invention is practiced. Thus, it is contemplated that an artificial intelligence of the present invention will be utilized with increasing capabilities and levels of sophistication as corresponding capabilities and levels of sophistication are developed in the field of artificial intelligence.

An artificial intelligence is generated (i.e., created), by hardware and/or software in any manner known to a person of ordinary skill in the field of artificial intelligence. For example, a set of artificial intelligences may pre-exist in a storage medium and a particular stored artificial intelligence that is capable of responding to the event associated with the alert may be activated for use by the macro grid. As another example, an artificial intelligence may generated by software in a manner that tailors the artificial intelligence to the specific event associated with the alert.

The unique processor 60 is used to create and dynamically change macro grids and to generate artificial intelligences to govern (i.e., control and manage) operation of the macro grids in response to a real time alert. A software conscription request may be received (or generated) by the unique assigned processor 60 in the micro grid apparatus 100 from (or to) uniquely assigned processors of other micro grids, that are wirelessly adjacent and available, to the alert sensing (or alert transmitting) micro grid apparatus 100. In one embodiment, once an alert is acknowledged by the unique processors in two or more micro grids, a macro grid is formed and expands by further conscription demand of other adjacent wirelessly available micro grids to become a large macro grid, comprised of a plurality of selected numbers of individual processors within a plurality of wirelessly connected micro grids. The macro grid processor connects wirelessly the wireless module 415 to other adjacent macro grid processors forming a macro grid across which a transient and mobile artificial intelligence resides. The dynamically constructed macro grid continues to function wirelessly utilizing changing populations of connected individual processors embodied within micro grids. The macro grid is governed by an artificial intelligence.

The macro grids expand and contract their geographic footprint as: (1) participating micro grid processor numbers increase and decrease; (2) the operating system of the micro grid unique processors re-prioritizes individual processor availability; (3) the physical location of the participating processors change as detected via the global positioning interface module 420; (3) the unique application program alert demand, from within the macro grid, adjusts requirements for micro grid processor participation; and/or (4) new alerts are raised for functional use of micro grid processors that are already engaged in functional use by other macro grids. It is noted that different macro grids can use different processors embodied within the same micro grid apparatus.

An artificial intelligence is generated by the unique processor 60, within the wireless configuration of a macro grid, as a result of a program alert to the operating system of the unique processor 60 within the micro grid apparatus 100, from sensor signals and software activity on the I/O interface of irregular shaped module 410. In response to the alert, the artificial intelligence conscripts available physically connected processors from within the described micro grid apparatus, and wirelessly conscripts available processors from different micro grid apparatus's within a prescribed or otherwise detectable range. The artificial intelligence becomes transient and not specifically reliant on the initiating host unique processor's operating system.

The artificial intelligence governs its macro grid via the operating systems of the unique processors of the participating, wirelessly connected micro grid apparatuses, and authoritatively controls the functionality and sustained vitality of its mobile macro grid that has been initiated for it to reside upon, until expiry or offload. In one embodiment, one macro grid supports one artificial intelligence, and one micro grid may have mutually exclusive individual processors under the control of multiple artificial intelligences.

A plurality of transient artificial intelligences can co-exist (each contained within their individual expanding and contracting macro-grids) contemporaneously. The different artificial intelligences utilize different individual wirelessly connected micro grid processors, their common type operating systems, and their assigned resources, available within any single micro grid apparatus.

Figure 2C:
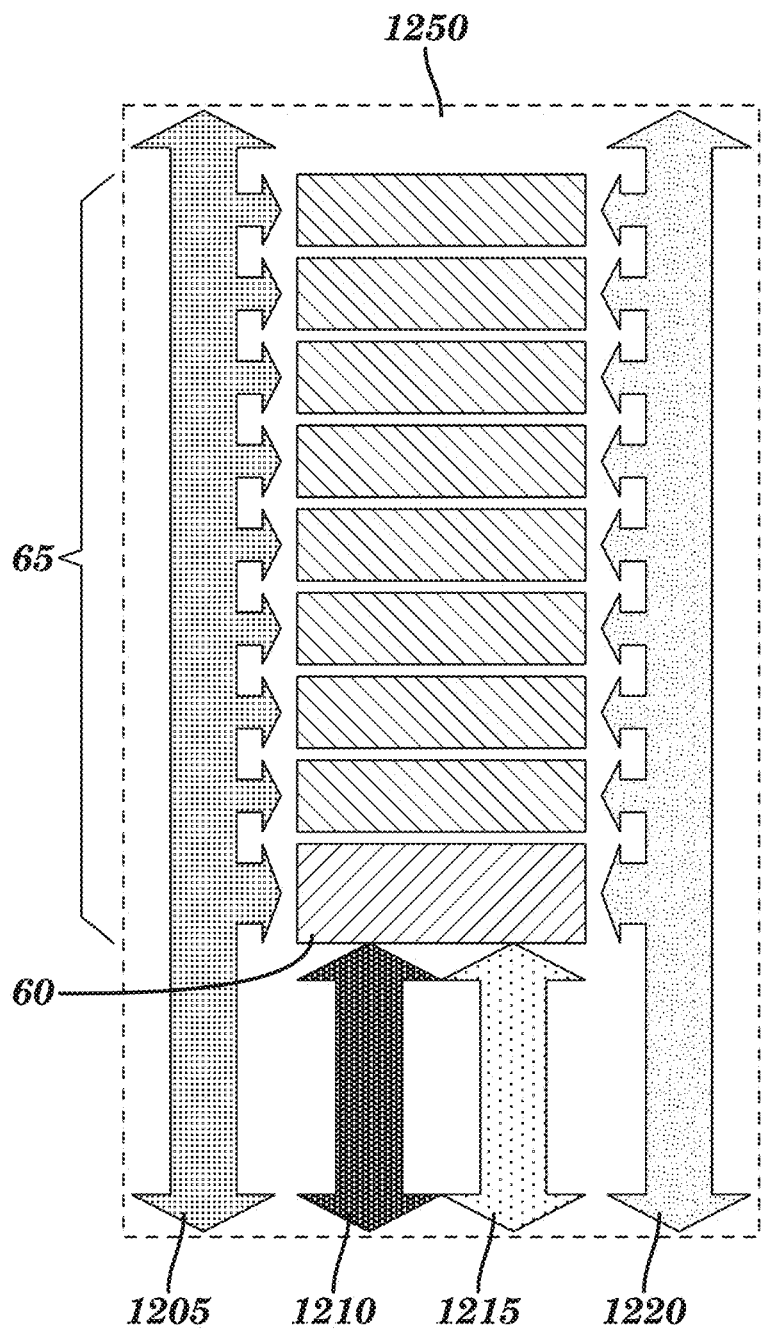
FIG. 2C depicts a micro grid system stack, in accordance with embodiments of the present invention.

FIG. 2C depicts a micro grid system stack 1250, in accordance with embodiments of the present invention. The micro grid system stack 1250 is formed of 9 processors, two standard system data buses (1210, 1215), a micro grid system bus 1205, and a macro grid system bus 1220, to provide data transfer pathways of the micro grid system stack to wireless interfaces, I/O and other software connections of the assembled apparatus. The micro grid system stack 1250 is an example of a micro grid system stack generally. A micro grid system stack is comprised by a micro grid apparatus such as the micro grid apparatus 100 of FIG. 1 or FIG. 2A.

Various activities (e.g., research, manufacturing, etc.) may determine the specific structure of these two standard system data buses (1210, 1215). These standard system data buses (1210, 1215) could be used individually (e.g., one standard system data bus for inbound data, one standard system data bus for outbound data), as a bidirectional address bus, as a bidirectional data bus, or as a high speed 'on wafer' extendable address/data ring similar to token ring and other micro processor connection technologies. Thus, the present invention includes multiple design options in bus structure and interconnections and also includes both parallel and serial methods of data transfer.

The standard system bus (1210, 1215) provides for address and data interchange between the unique system processor 60 and all of the micro grid processors individually. Conscription of a micro grid processor to participate as a macro grid processor, including instruction to a micro grid processor to change its operating system, occurs over this standard system bus (1210, 1215). Micro grid processor status and availability, monitoring of micro grid processor utilization, and micro grid processor prioritization also occurs over this standard system bus (1210, 1215) by the unique processor 60. This standard system bus (1210, 1215) maintains the vitality of the micro grid and its resources.

The standard system bus (1210, 1215) also interconnects all of micro grid processors 65 to the RAM module 200, via memory control and cache memory control.

The standard system bus (1210, 1215) also interconnects the unique processor 60 to the I/O module 410 for detecting local attached alerts and interfacing with standard external peripheral system devices such as a disk drive for more permanent storage of data and instructions, and peripheral components such as monitors, keyboard, pointing devices, attached alert sensors and actuators.

The standard system bus (1210, 1215), also interconnects the unique processor 60 to the GPS module 420 for provision of location information and movement.

The standard system bus (1210, 1215) also interconnects the unique processor 60 to the communications module 425 for receiving wireless alerts from adjacent processors (but yet to be connected as macro grid processors) and cable communicated alerts from fiber optic and Ethernet connected sensors. The communications module 425 is also utilized by the macro grid processors for responding to alerts by instructing actuators to counter the event. The micro grid system bus 1205 provides for data interchange among any two (or groups) of the micro grid processors when assigned by the unique processor 60, to provide additional processing capacity to a macro grid processor. Once the micro grid participating processors are identified and assigned, and are acting as an active collaborating micro grid, the micro grid participating processors reduce their individual use of the standard system bus (1210, 1215) and utilize the micro grid system bus (1205). The present invention reduces data traffic volumes on the standard system bus (1210, 1215) and provides alternate micro grid address and data capacity via the micro grid system bus (1205) and further provides macro grid address and data capacity via the macro grid system bus (1220).

The macro grid system bus 1220 provides for data interchange from each processor of the macro grid processors individually via the wireless module 415 to other adjacent macro grid processors embodied within a macro grid. The artificial intelligence associated with the macro grid processor within the macro grid communicates to all the other macro grid processors within the macro grid.

The two standard system data bus (1210, 1215), the micro grid system bus 1205 and the macro grid system bus 1220, are all available as a system bus 55 at the five connection points of the complex shape with the individual irregular shaped modules. The system bus 55 serves as an embodiment of connection interface 55 (see FIG. 1).

The system bus 55 can be extended beyond the embodiment of one apparatus via a bridge module (i.e., a bi-polygonal irregular shaped module).

Figure 3A:
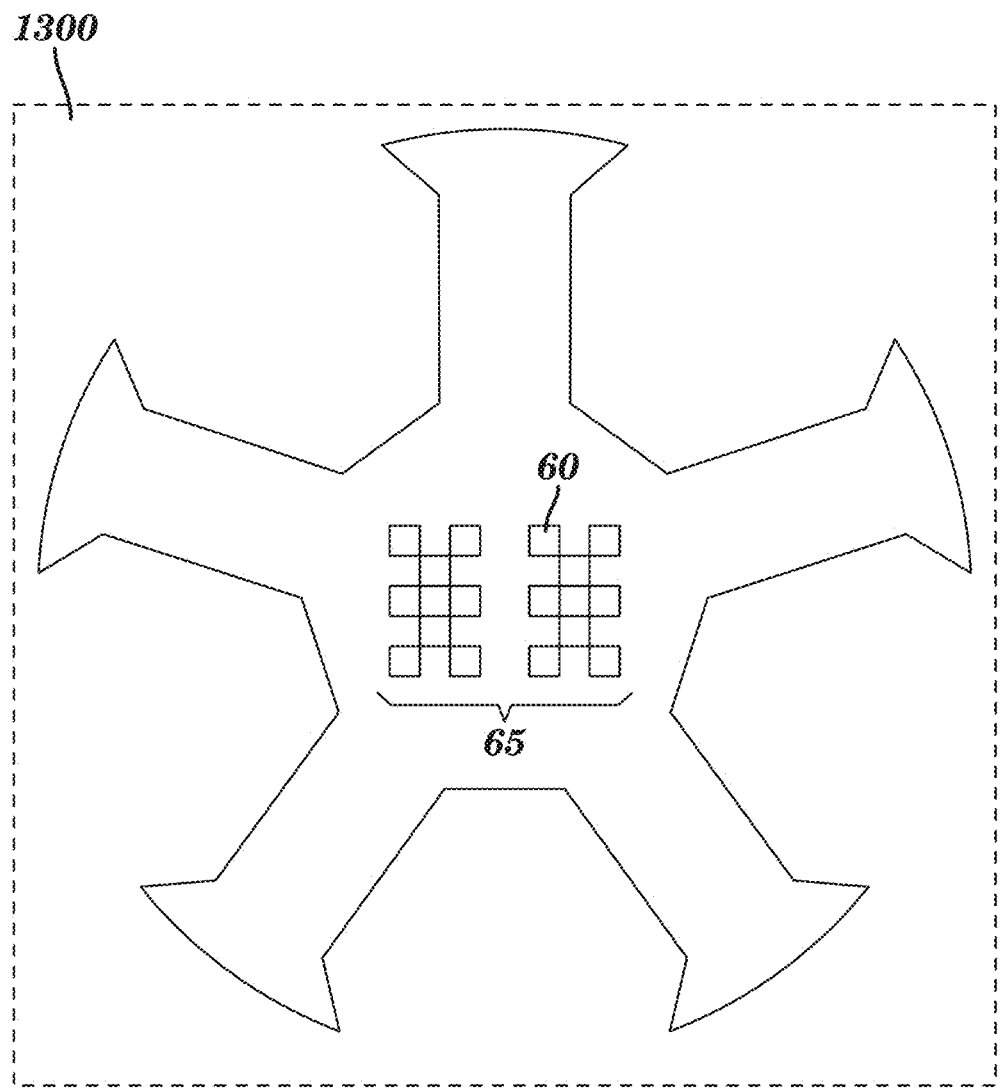
FIG. 3A depicts a micro grid apparatus, in accordance with embodiments of the present invention.

FIG. 3A depicts a micro grid apparatus 1300, in accordance with embodiments of the present invention. The micro grid apparatus 1300, which may in one embodiment comprise a complex ceramic chip apparatus, is for containment of a micro grid of 18 processors 65. The processors 65 each have its own operating system and operate under control of a unique processor 60 and its operating system, and are linked to each other via the system bus (1210, 1215), the micro grid bus 1205, and the macro grid bus 1220 (see FIG. 2B). The micro grid apparatus 1300 is analogous to the micro grid apparatus 100 of FIG. 2A.

Figure 3B:
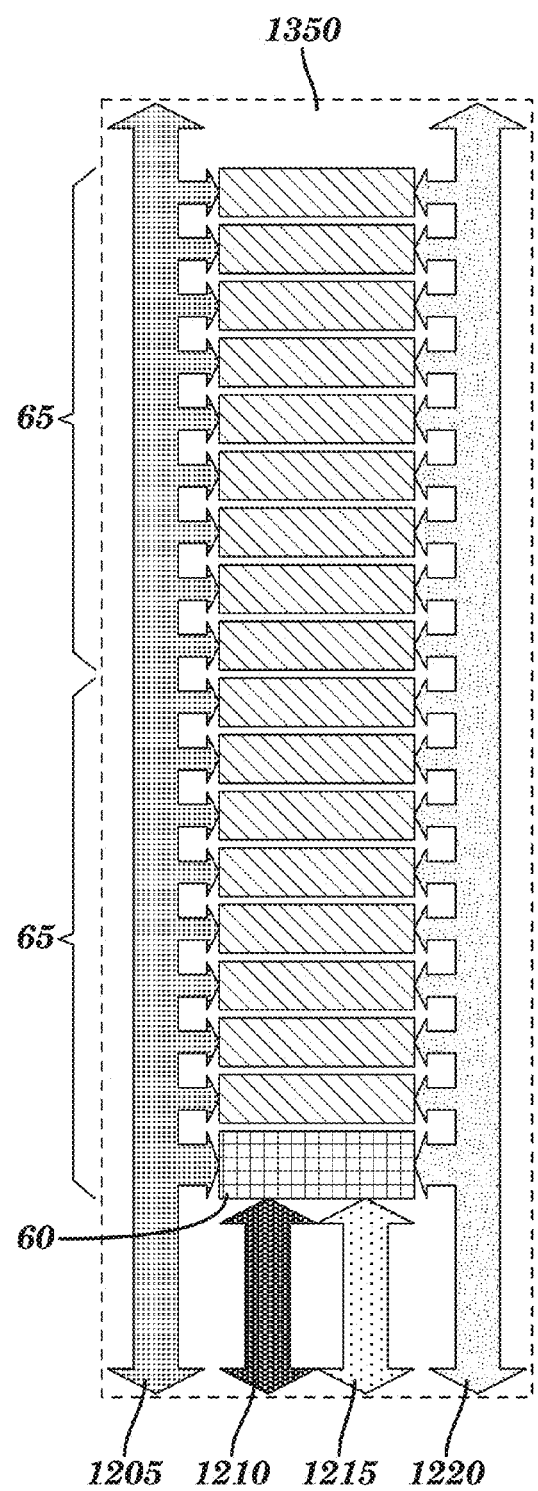
FIG. 3B depicts a micro grid system stack, in accordance with embodiments of the present invention.

FIG. 3B depicts a micro grid system stack 1350 of 18 processors 65, in accordance with embodiments of the present invention. The micro grid system stack 1350 comprises two standard system data buses (1210, 1215), a micro grid system bus 1205, and a macro grid system bus 1220 to provide data transfer pathways of the micro grid system stack to wireless interfaces, I/O and other necessary software connections of the assembled apparatus. The unique processor 60 with its own unique operating system resides at the first position in the micro grid stack of processors 65. The two groups of cell processors 65 are collectively embodied in the stack as a continuous row of available micro grid processors for determination of use, by the unique processor 60.

Figure 4A:
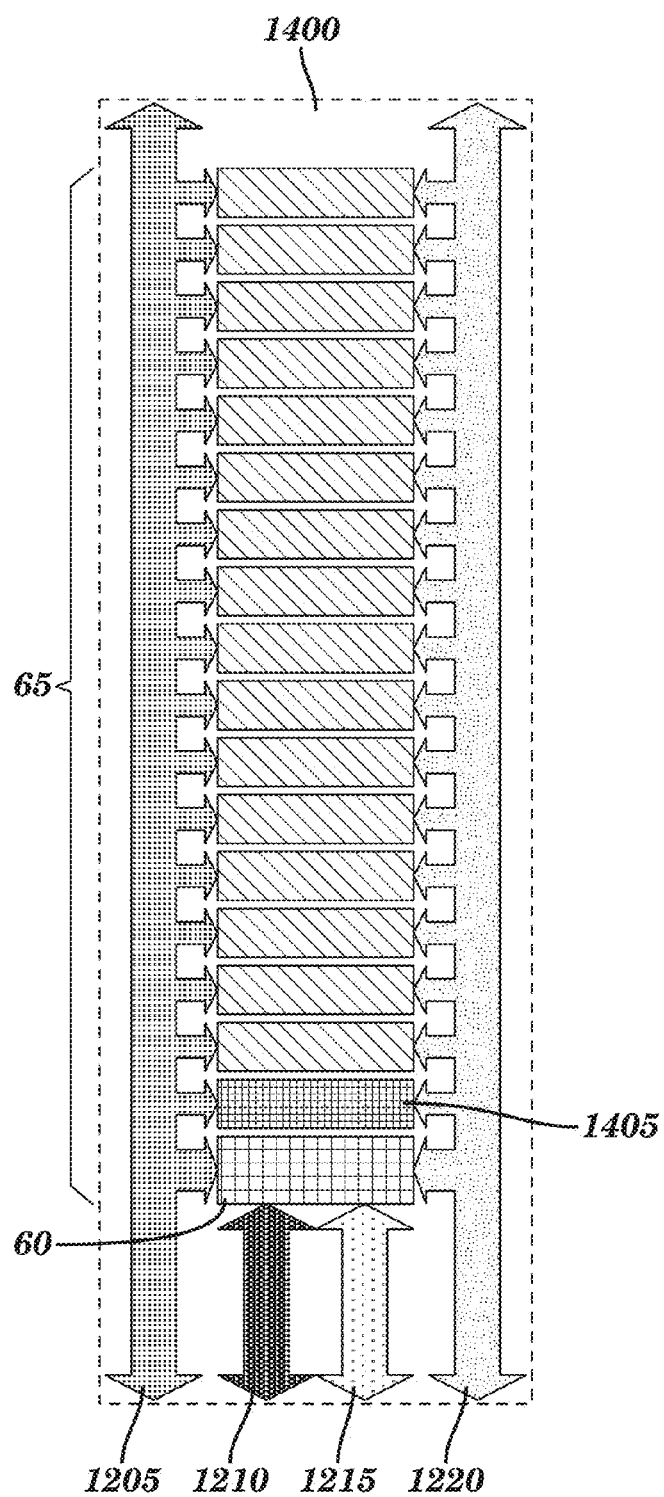
FIG. 4A depicts a micro grid system stack, in accordance with embodiments of the present invention.

FIG. 4A depicts a micro grid system stack 1400 of 18 processors 65, in accordance with embodiments of the present invention. The 18 processors 65 comprise a unique micro grid processor 60, a macro grid processor 1405 for a single artificial intelligence to interface, 16 micro grid processors 65, and micro grid system buses for data transfer and software connections, which include two standard system data buses (1210, 1215), a micro grid system bus 1205, and a macro grid system bus 1220.

An alert to the unique processor 60 may be detected via the I/O module 410 for the local and physically connected sensors to the apparatus; or via the communications module 425 receiving the alert wirelessly for remote sensors linked to the apparatus.

An external macro grid alert to the unique processor 60 (e.g., as received from the communication module 425's wireless connection to an adjacent macro grid processor) may contain an externally computed value of scale (S), wherein S is a function of a magnitude of the event (E), an urgency level for responding to the event (U), and a quash time for extinguishing the event (Q). The magnitude of the event (E) that triggered the alert is a numerical value within a predefined range of numerical values (e.g., a continuous range of values such as 1 to 10, a discrete set of values such as the integers 1, 2, 3, . . . , 10, etc.). The urgency level (U) for responding to the event is a numerical value within a predefined range of numerical values (e.g., a continuous range of values such as 1 to 10, a discrete set of values such as the integers 1, 2, 3, . . . , 10, etc.). The quash time (Q) for extinguishing the event is in units of seconds, minutes, hours, days, etc. In one embodiment, the magnitude of a event (E) is derived from GPS data received by the artificial intelligence from GPS modules (420) attached to participating micro grid apparatuses across the extremity of the geographical footprint of the macro grid. In one embodiment, the urgency level (U) is derived from the TCP/IP sensors alert signal frequency (e.g., one alert signal per second, one alert signal per millisecond, etc.). In one embodiment, $S=(E \times U)/Q$. In one embodiment, E and U are independent of each other. In one embodiment, U is a function of E. For example, if U is a linear function of E, then S is proportional to $E^2/Q$.

The unique processor 60 assigns an internal micro grid processor to modify its operating system and becomes a macro grid processor of a macro grid, after which an artificial intelligence is generated for the macro grid. The macro grid processor created by the unique processor 60 interrogates the alert and determines the number of available micro grid processors 65 (e.g., from information provided by the unique processor in the micro grid stack) to be assigned for countering the event by either: (1) determining the scale of the event to be the scale (S) contained in the alert; or (2) determining the scale of the event by computing a value for the scale (S') of the response necessary to counter the event raised by an alert. The scale (S') is computed by an artificial intelligence of the macro grid; e.g., by using the same formula (e.g., $S'=(E \times U)/Q$ in one embodiment) as used for previously computing the scale S received by the unique processor 60 in the alert, but may differ in value from S due to U and/or Q being different for computing S' than for computing S (e.g., due to a change in U and/or Q having occurred from when S was computed to when S' is computed). In one embodiment, the number of available micro grid processors 65 to be assigned for countering the event is a non-decreasing function of the scale (S or S') of the event.

The artificial intelligence in the macro grid processor then requests other adjacent and wirelessly connectable unique processors to assign a micro grid processor to become a macro grid processor in a similar way. Accordingly, the macro grid begins to grow in footprint size and shape.

The scale (S) of the alert received by the unique processor 60 from an adjacent processor via the communication module's wireless may be predetermined by an artificial intelligence in the adjacent processor requesting assignment of a macro grid processor (including micro grid processing resources) from the unique processor 60.

Figure 4B:
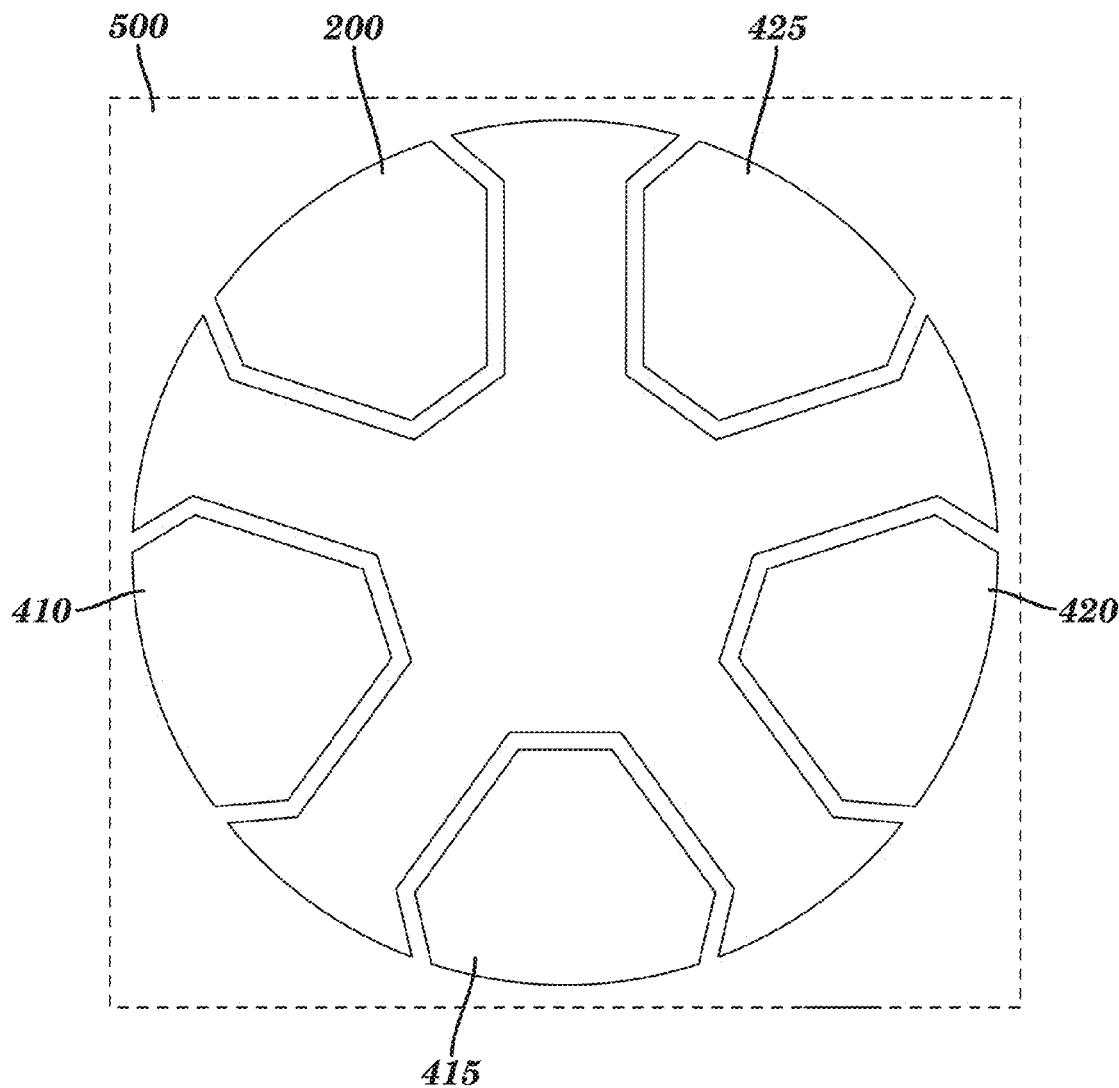
FIG. 4B depicts a micro grid apparatus, in accordance with embodiments of the present invention.

FIG. 4B depicts a micro grid apparatus 500, in accordance with embodiments of the present invention. The micro apparatus 500 contains of the hardware and software of a micro grid system stack in the complex shape of the micro grid apparatus 500. The micro grid apparatus 500 comprises the micro grid's system RAM 200, the micro grid's system communication 425, the micro grid's system GPS 420, the micro grid's system artificial intelligence wireless 415, and the micro grid's system I/O 410.

Figure 4C:
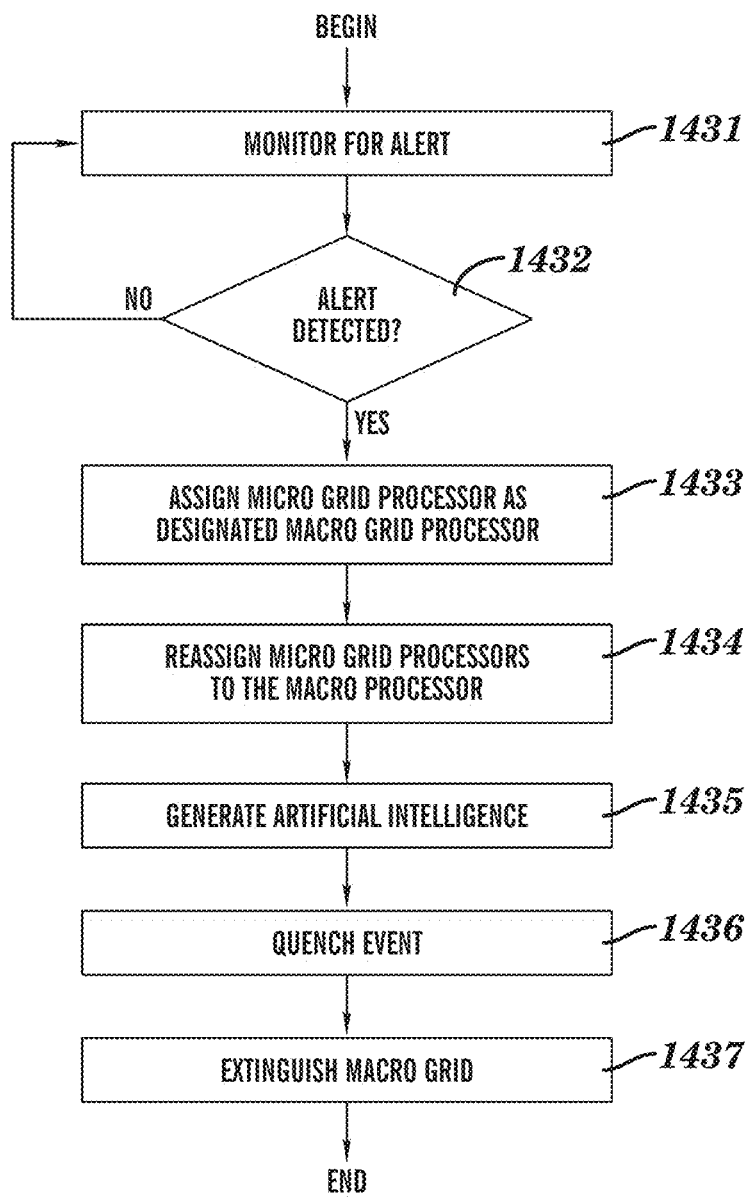
FIG. 4C is a flow chart describing a process for detecting an alert and for responding to the detected alert, in accordance with embodiments of the present invention.

FIG. 4C is a flow chart describing a process for detecting an alert and for responding to the detected alert, in accordance with embodiments of the present invention. The flowchart of FIG. 4C comprises steps 1431-1437.

In step 1431, the unique processor 60 constantly monitors the system bus (1210, 1215) for an 'alert data packet': (1) from any sensor directly connected to the I/O irregular shaped module 410 or to the communications module 425; or (2) from any external micro grid apparatus or any macro grid that is connected wirelessly or by direct electrical connection to the micro grid apparatus 100. An alert data packet comprises an alert pertaining to an event.

The 'alert data packet' may contain a computed value of scale (as defined supra) to assist in determining the number of micro grid resources required to assist with countering the event from the location of the external micro grid apparatus. GPS information from the GPS module 420 may be constantly interrogated to determine a 'location value' for advising the artificial intelligence (generated in step 1435) as to where the event is, and as a consequence, influencing the macro grid operating system to increase or decrease the number of micro grid processing resources participating from within the single apparatus.

Step 1432 determines whether the unique processor 60 has detected a data packet comprising the alert in step 1431. If step 1433 determines that the unique processor 60 has detected a data packet comprising the alert, then step 1433 is next performed; otherwise the process loops back to step 1431 to monitor for an alert.

In step 1433, via the micro grid bus 1205, the unique processor 60 initiates a response to the alert by identifying an available micro grid processor within the micro grid apparatus comprising the unique processor 60, designates the available micro grid processor to be a designated macro grid processor by altering the operating system of the available micro grid processor to a macro grid operating system, and assigns to the designated macro grid processor an alert ownership of a macro grid with an associated responsibility for the operation of the macro grid.

The designated macro grid processor assigns one or more additional processors from the micro grid apparatus comprising the unique processor 60 as micro grid computational resources are required by the macro grid. The total number of the one or more additional processors assigned as computational resources for the micro grid is a function of the scale of the alert. The macro grid operating system comprises software configured, upon being implemented (i.e., performed), to respond to the event associated with the detected alert.

In one embodiment, step 1434 is performed if warranted by the nature of the event and/or scale of the alert. In step 1434, the designated macro grid processor communicates the 'alert data packet' to the unique micro grid processor(s) in one or more different micro grid apparatuses, via the wireless irregular shaped module 415 for connection. The unique micro grid processor in each micro grid apparatus of the one or more different micro grid apparatuses assigns a micro grid processor in its micro grid apparatus to become an additional macro grid processor of the macro grid. The assembled macro grid communicates via the wirelessly connected macro grid system bus 1220. Each macro grid processor of the designated macro grid processors may assign one or more additional processors from its micro grid apparatus as computational resources for the macro grid. In one embodiment, the initially designated macro grid processor directs and oversees the operation of all of the other macro grid processors of the macro grid.

In one embodiment, step 1434 is not performed and the macro grid consequently has exactly one macro grid processor, namely the designated macro grid processor.

In step 1435, an artificial intelligence is generated for the macro grid by the designated macro grid processor. In one embodiment, the artificial intelligence is stored only in one macro grid processor (e.g., the designated macro grid processor) of the macro grid. In one embodiment, a different portion of the artificial intelligence is stored in some but not all macro grid processors of the macro grid. In one embodiment, a different portion of the artificial intelligence is stored in each macro grid processor of the macro grid.

The macro grid may dynamically expand or contract as the event increases or decreases, respectively. If the alert is of a predefined scale (as defined supra) requiring additional computational resources, or if a matched alert is detected in other micro grid apparatus(s) than the micro grid apparatus that detected the alert in step 1432, then micro grid processors within the other apparatus(s) are assigned to the artificial intelligence as computational resources. A "matched alert" is defined as an alert that communicates an enhancement of the event associated with the original alert detected in step 1432. As the event diminishes, macro grid processors and/or micro grid processors assigned as computational resources are removed from the macro grid.

In step 1436, the event associated with the alert is responded to and quenched by the artificial intelligence. The manner in which the macro grid responds to and quenches the event is specific to the event, as illustrated in three hypothetical examples which are described infra.

As the scale of the alert (as defined supra) is reduced such that fewer computational resources are needed to combat the event associated with the alert. Accordingly, the artificial intelligence returns no longer needed macro grid processors back to associated micro grid processors under the control of the unique processor of the micro grid apparatus that comprises each associated micro grid processor.

If a previously occurring matched alert disappears, then the artificial intelligence will commence returning the conscripted additional macro grid processors back to the control of the corresponding unique processor in the micro grid apparatus that is wirelessly connected the micro grid apparatus 100. Eventually the designated macro grid processor itself is returned as a micro grid processor to the micro grid apparatus 100, resulting in the artificial intelligence vacating the macro grid and the macro grid disappearing, thus extinguishing the macro grid and all of its included macro processors, along with the artificial intelligence, in step 1437.

Figure 4D:
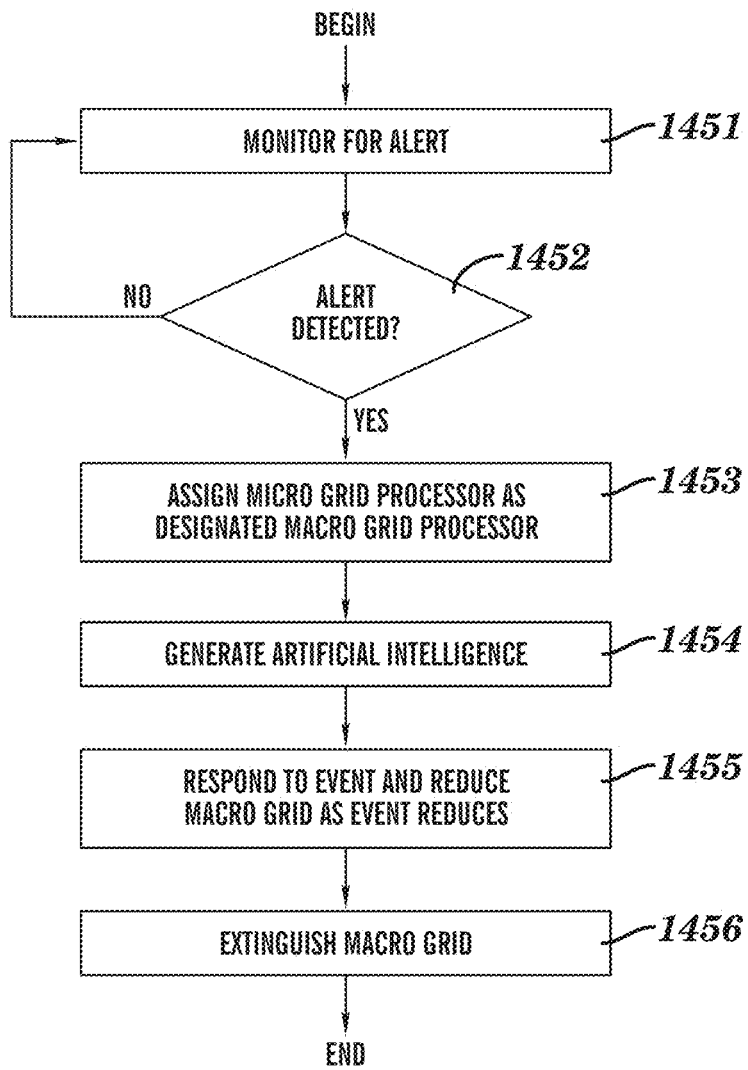
FIG. 4D is a flow chart describing a process for detecting an alert and for responding to the detected alert, in accordance with embodiments of the present invention.

FIG. 4D is a flow chart describing a process for detecting and for responding to the detected alert, in accordance with embodiments of the present invention. The flow chart of FIG. 4D comprises steps 1451-1456.

In step 1451, the unique processor 60 constantly monitors the system bus (1210, 1215), via the communications module 425 of the micro grid apparatus 100, for an 'alert data packet': (1) from any sensor directly connected to the I/O irregular shaped module 410 or to the communications module 425; or (2) from any external micro grid apparatus or any macro grid that is connected wirelessly or by direct electrical connection to the micro grid apparatus 100. An alert data packet comprises an alert pertaining to an event.

The 'alert data packet' may contain a computed value of scale (as defined supra) to assist in determining the number of micro grid resources required to assist with countering the event from the location of the external micro grid apparatus. GPS information from the GPS module 420 may be constantly interrogated to determine a 'location value' for advising the artificial intelligence (generated in step 1454) as to where the event is, and as a consequence, influencing the macro grid operating system to increase or decrease the number of micro grid processing resources participating from within the single apparatus.

Step 1452 determines whether the unique processor 60 has detected a data packet comprising the alert in step 1451. If step 1452 determines that the unique processor 60 has detected a data packet comprising the alert then step 1453 is next performed; otherwise the process loops back to step 1451.

In step 1453, via the micro grid bus 1205, the unique processor 60 initiates a response to the alert by identifying an available micro grid processor within the micro grid apparatus comprising the unique processor 60, designates the available micro grid processor as a macro grid processor by altering the operating system of the available micro grid processor to a macro grid operating system, and assigns to the designated macro grid processor an alert ownership of a macro grid with an associated responsibility for the operation of the macro grid.

In step 1454, an artificial intelligence is generated for the macro grid, under control of the unique processor 60, and is stored in the designated macro grid processor. The artificial intelligence stored in the designated macro grid processor, upon being implemented, may assign one or more additional processors from its micro grid apparatus as computational resources are for the macro grid.

In one embodiment, the artificial intelligence stored in the designated macro grid processor may trigger generation of other macro grid processors if warranted by the nature of the event and/or scale of the alert. Specifically, the artificial intelligence stored in the designated macro grid communicates with the unique micro grid processor in one or more different micro grid apparatuses to direct the unique micro grid processor in each micro grid apparatus of the one or more different micro grid apparatuses to assign a micro grid processor in its micro grid apparatus to become an additional macro grid processor of the macro grid. In one embodiment, the artificial intelligence stored in the designated macro grid processor may affirm or negate the choice of the additional macro grid processor by the unique micro grid processor in each micro grid apparatus.

In one embodiment, the artificial intelligence does not trigger generation of other macro grid processors and the macro grid consequently has exactly one macro grid processor, namely the designated macro grid processor.

If generation of other macro grid processors is triggered, the artificial intelligence stored in the designated macro grid processor may generate, or trigger the generation of, other artificial intelligences to generate or develop a resultant artificial intelligence. In one embodiment, the artificial intelligence is stored only in one macro grid processor (e.g., the designated macro grid processor) of the macro grid. In one embodiment, a different portion of the artificial intelligence is stored in some but not all macro grid processors of the macro grid. In one embodiment, a different portion of the artificial intelligence is stored in each macro grid processor of the macro grid.

If the alert is of a predefined scale (as defined supra) requiring additional computational resources, or if a matched alert (as defined supra) is detected in other micro grid apparatus(s) than the micro grid apparatus that detected the alert in step 1452, then micro grid processors within the other apparatus(s) are assigned to the artificial intelligence as computational resources.

In step 1455, the event is responded to by the artificial intelligence. The manner in which the macro grid and artificial intelligence responds to and quenches the event is specific to the event, as illustrated in three hypothetical examples which are described infra.

As the scale of the alert (as defined supra) is reduced such that fewer computational resources are needed to combat the event associated with the alert. Accordingly, the artificial intelligence returns no longer needed macro grid processors back to associated micro grid processors under the control of the unique processor of the micro grid apparatus that comprises each associated micro grid processor.

If a previously occurring matched alert disappears, then the artificial intelligence will commence returning the conscripted additional macro grid processors back to the control of the corresponding unique processor in the micro grid apparatus that is wirelessly connected the micro grid apparatus 100. Eventually the designated macro grid processor itself is returned as a micro grid processor to the micro grid apparatus 100, resulting in the artificial intelligence vacating the macro grid and the macro grid disappearing, thus extinguishing the macro grid and all of its included macro processors, along with the artificial intelligence, in step 1456.

Figure 4E:
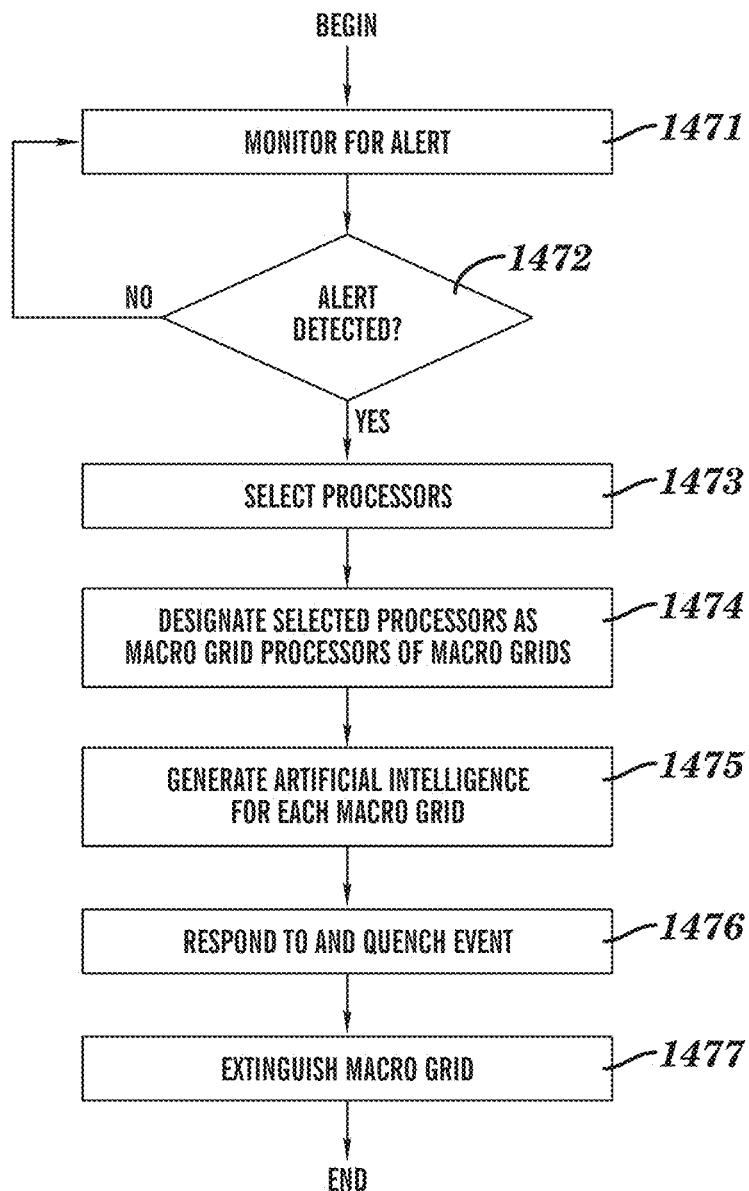
FIG. 4E is a flow chart describing a process for detecting an alert and for responding to the detected alert, in accordance with embodiments of the present invention.

FIG. 4E is a flow chart describing a process for detecting an alert and for responding to the detected alert, in accordance with embodiments of the present invention. The flow chart of FIG. 4E comprises steps 1471-1477.

In step 1471, the unique processor 60 constantly monitors the system bus (1210, 1215), via the communications module 425 of the micro grid apparatus 100, for an 'alert data packet': (1) from any sensor directly connected to the I/O irregular shaped module 410 or to the communications module 425; or (2) from any external micro grid apparatus or any macro grid that is connected wirelessly or by direct electrical connection to the micro grid apparatus 100. An alert data packet comprises an alert pertaining to an event.

The 'alert data packet' may contain a computed value of scale (as defined supra) to assist in determining the number of micro grid resources required to assist with countering the event from the location of the external micro grid apparatus. GPS information from the GPS module 420 may be constantly interrogated to determine a 'location value' for advising the artificial intelligence (generated in step 1475) as to where the event is, and as a consequence, influencing the macro grid operating system to increase or decrease the number of micro grid processing resources participating from within the single apparatus.

Step 1472 determines whether the unique processor 60 has detected a data packet comprising the alert in step 1471. If step 1472 determines that the unique processor 60 has detected a data packet comprising the alert then step 1473 is next performed; otherwise the process loops back to step 1471.

In step 1473, after detecting the alert data packet in step 1472, each unique processor selects at least one processor from each micro grid apparatus.

In step 1474, each selected processor is designated as a macro grid processor of a respective macro grid by altering an operating system of each selected processor to a macro grid operating system and by assigning to each selected processor a responsibility for operation of its respective macro grid.

In step 1475, an artificial intelligence is generated for each macro grid.

In step 1476, the event is responded to and quenched by executing the artificial intelligence of each macro grid.

In step 1477 after the event has been quenched, the macro grids are extinguished.

In one embodiment, at least one micro grid apparatus comprises a plurality of micro grid apparatuses, wherein step 1474 results in the respective macro grids comprising a plurality of macro grids, and wherein executing the artificial intelligence of each macro grid in step 1476 comprises contemporaneously executing the artificial intelligence of each macro grid to perform said responding to and quenching the event.

In one embodiment for each macro grid, one or more processors in each micro grid apparatus, other than the selected processors in each micro grid apparatus, are assigned as computational resources for each macro grid.

In one embodiment, at least two macro grids include a different macro grid processor selected from a same micro grid apparatus.

In one embodiment, the process geographically relocates at least one macro grid processor of a first macro grid, which results in the first macro grid having its geographical footprint increased or decreased.

In one embodiment, the alert data packet includes an identification of a scale (S), wherein S is a function of a magnitude of the event (E), an urgency level for responding to the event (U), and a quash time for extinguishing the event (Q). The scale (S) identified in the alert data packet may be used to determine a total number of processors of the at least one processor to be selected from each micro grid apparatus during said selecting the at least one processor from each micro grid apparatus in step 1473. In one embodiment, S=(E×U)/Q.

In one embodiment, the artificial intelligence for a first macro grid of the plurality of macro grids ascertains that the scale is increased relative to the scale identified in the alert data packet which triggers adding at least one macro grid processor to the first macro grid, resulting in the first macro grid having its geographical footprint increased In one embodiment, the artificial intelligence for a first macro grid of the plurality of macro grids ascertains that the scale is decreased relative to the scale identified in the alert data packet which triggers removing at least one macro grid processor from the first macro grid, resulting in the first macro grid having its geographical footprint decreased.

Other embodiments, as described supra in conjunction with the process of FIG. 4C and/or FIG. 4D, are likewise applicable to the process of FIG. 4E.

Figure 5A:
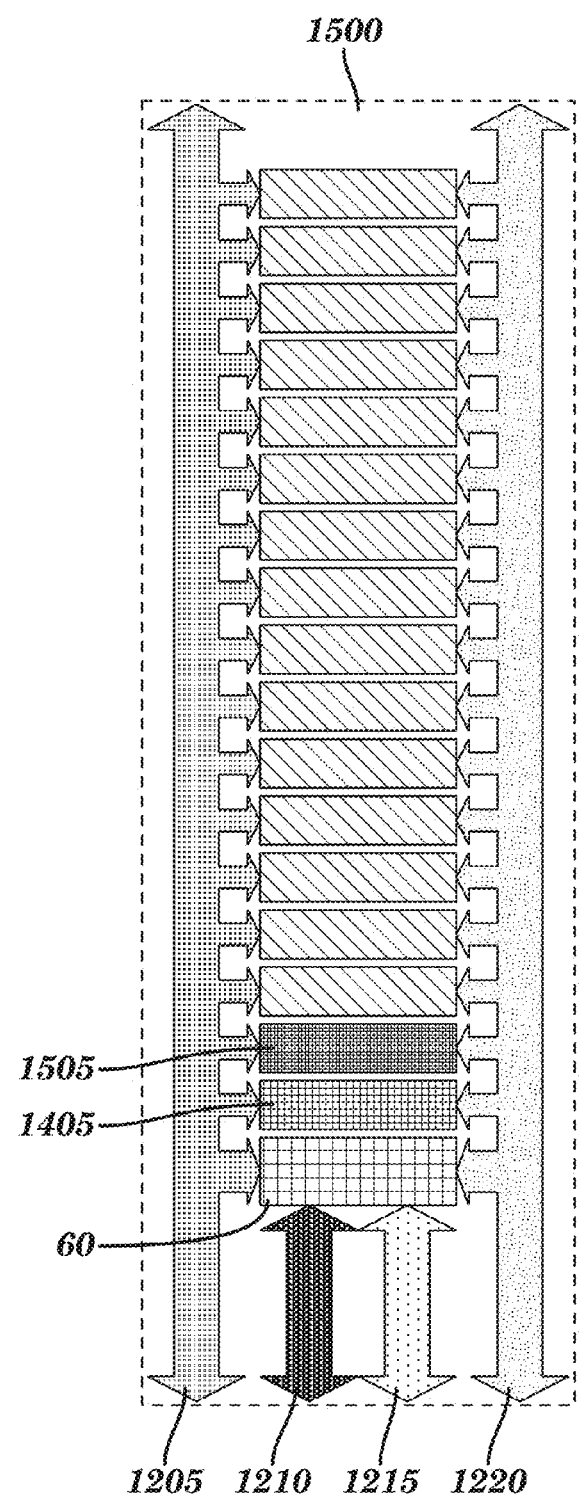
FIG. 5A depicts a micro grid system stack of 18 processors, in accordance with embodiments of the present invention.

FIG. 5A depicts a micro grid system stack 1500 of 18 processors, in accordance with embodiments of the present invention. The micro grid system stack 1500 comprises a unique micro grid processor 60, two designated macro grid processors (1405, 1505) of two corresponding macro grids, and 15 micro grid processors (as additional processing resources, some or all of which being allocated to the two designated macro grid processors (1405, 1505)). The two corresponding macro grids exist contemporaneously and have two corresponding artificial intelligences co-existing in the same micro grid apparatus (i.e., in the same micro grid system stack 1500).

Figure 5B:
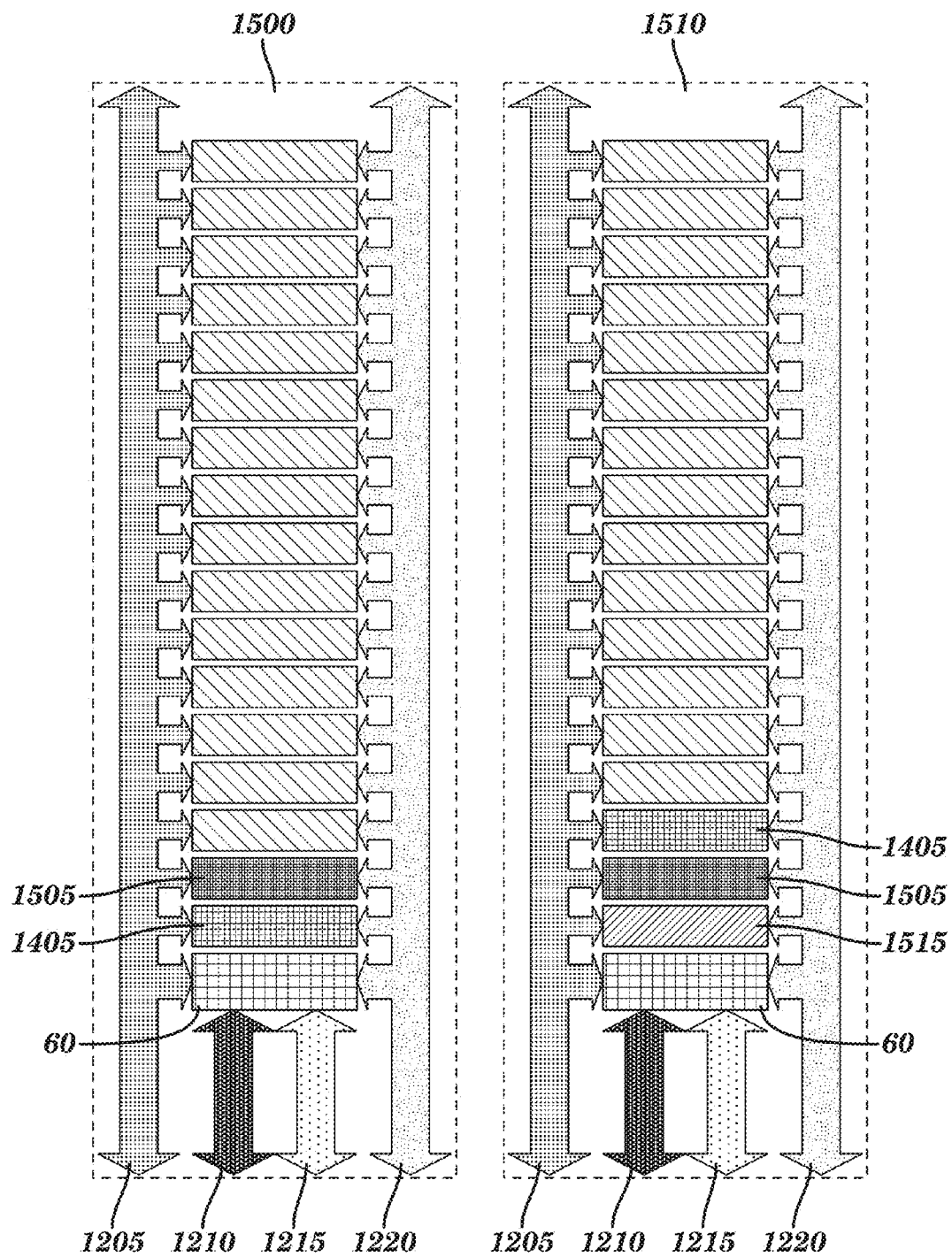
FIG. 5B depicts two micro grid system stacks, each stack comprising 18 processors, in accordance with embodiments of the present invention.

FIG. 5B depicts two micro grid system stacks (1500, 1510), each stack comprising 18 processors, in accordance with embodiments of the present invention. Each stack is in a different micro grid apparatus. The 18 processors in each stack are adjacent to one another and are directly connected electrically or wirelessly connected to each other within a micro grid apparatus. The stack 1500 comprises a unique micro grid processor 60, two designated macro grid processors (1405, 1505) of two corresponding macro grids, and 15 micro grid processors (as additional processing resources, some or all of which being allocated to the two designated macro grid processors (1405, 1505)). The stack 1510 comprises a unique micro grid processor 60, three designated macro grid processors (1515, 1505, 1405) of three corresponding macro grids, and 14 micro grid processors (as additional processing resources, some or all of which being allocated to the three designated macro grid processors (1515, 1505, 1405)).

In FIG. 5B, a first macro grid comprises macro grid processor 1405 of stack 1500 and macro grid processor 1405 of stack 1510, said first macro grid having a first artificial intelligence. A second macro grid comprises macro grid processor 1505 of stack 1500 and macro grid processor 1505 of stack 1510, said second macro grid having a second artificial intelligence. A third macro grid comprises macro grid processor 1515 of stack 1510, said third macro grid having a third artificial intelligence. Each macro grid in FIG. 5B is formed by the process depicted in FIG. 4C or FIG. 4D.

Figure 5C:
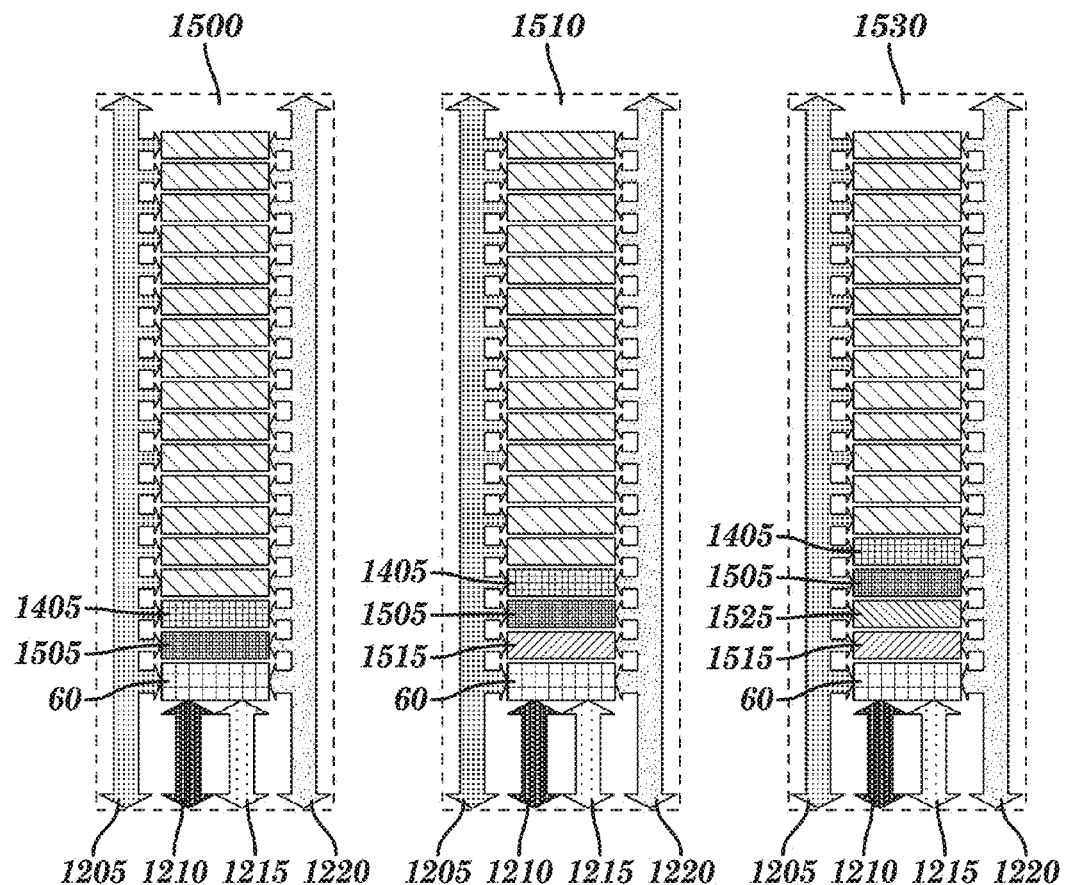
FIG. 5C depicts three micro grid system stacks, each stack comprising 18 processors, in accordance with embodiments of the present invention.

FIG. 5C depicts three micro grid system stacks (1500, 1510, 1530), each stack comprising 18 processors, in accordance with embodiments of the present invention. Each stack is in a different micro grid apparatus. The 18 processors in each stack are adjacent to one another and are directly connected electrically or wirelessly connected to each other within a micro grid apparatus. The stack 1510 is disposed between stacks 1500 and 1530. The stack 1500 comprises a unique micro grid processor 60, two designated macro grid processors (1505, 1405) of two corresponding macro grids, and 15 micro grid processors (as additional processing resources, some or all of which being allocated to the two designated macro grid processors (1505, 1405)). The stack 1510 comprises a unique micro grid processor 60, three designated macro grid processors (1515, 1505, 1405) of three corresponding macro grids, and 14 micro grid processors (as additional processing resources, some or all of which being allocated to the three designated macro grid processors (1515, 1505, 1405)). The stack 1530 comprises a unique micro grid processor 60, four designated macro grid processors (1515, 1525, 1505, 1405) of four corresponding macro grids, and 13 micro grid processors (as additional processing resources, some or all of which being allocated to the four designated macro grid processors (1515, 1525, 1505, 1405)).

In FIG. 5C, a first macro grid comprises macro grid processor 1405 of stack 1500, macro grid processor 1405 of stack 1510, and macro grid processor 1405 of stack 1530, said first macro grid having a first artificial intelligence. A second macro grid comprises macro grid processor 1505 of stack 1500, macro grid processor 1505 of stack 1510, and macro grid processor 1505 of stack 1530, said second macro grid having a second artificial intelligence. A third macro grid comprises macro grid processor 1515 of stack 1510 and macro grid processor 1515 of stack 1530, said third macro grid having a third artificial intelligence. A fourth macro grid comprises macro grid processor 1525 of stack 1530, said fourth macro grid having a fourth artificial intelligence.

In FIG. 5C: (1) each of the three micro grid system stacks (1500, 1510, 1530) has a unique processor 60; (2) one of the micro grid system stacks (1530) has a macro grid processor (1525) not found in the other two adjacent physical apparatus's (1500, 1510); (3) two of the micro grid system stacks (1510, 1530) have a macro grid processor (1515) participating in the same third macro grid; (4) all three of the micro grid system stacks (1500, 1510, 1530) have two macro grid processors (1405, 1505) participating in the first and second macro grid, respectively; and (5) a total of four macro grids are present in the three micro grid system stacks (1500, 1510, 1530), and are functioning contemporaneously, each controlled by their own individual artificial intelligence.

Figure 5D:
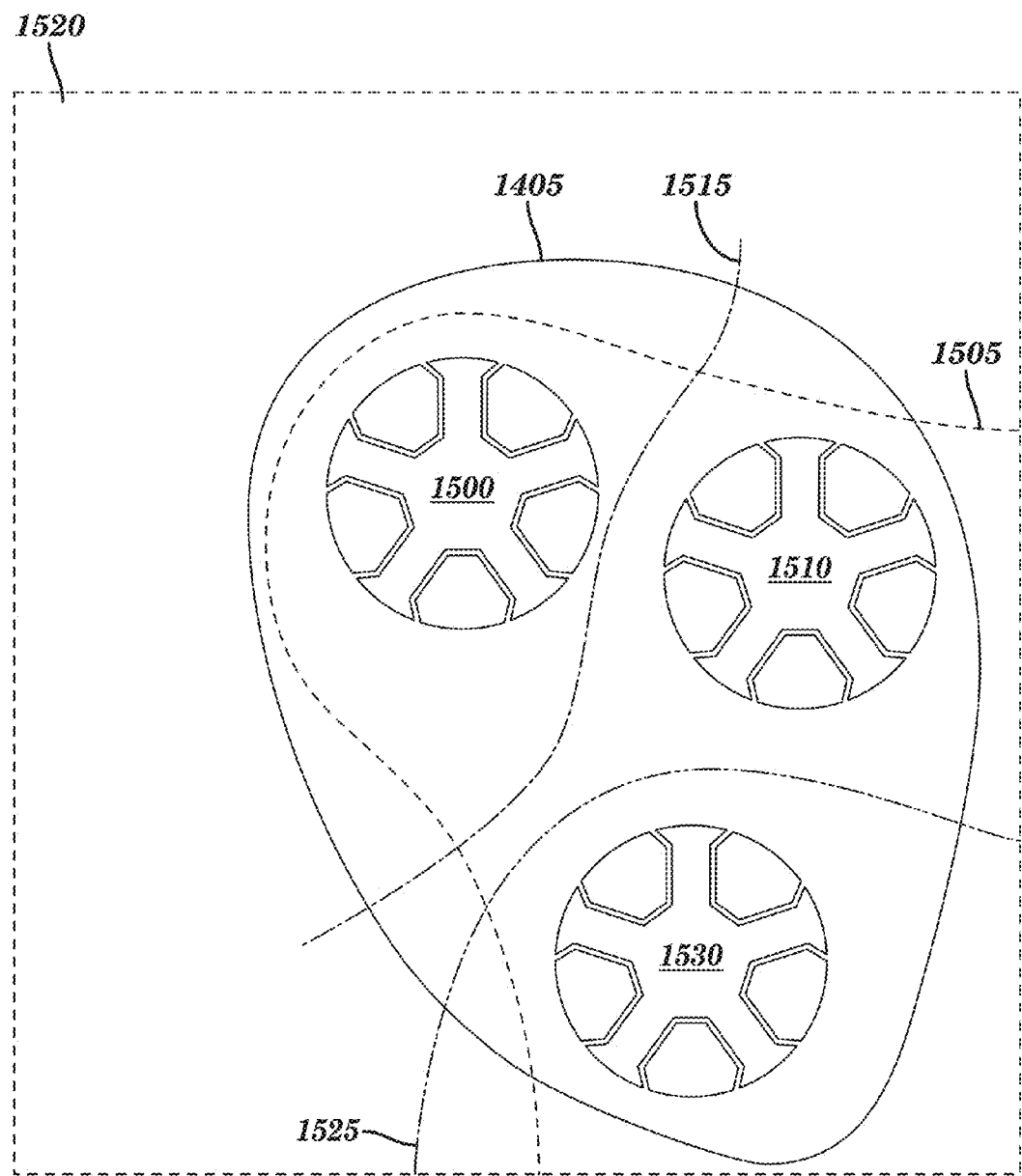
FIG. 5D is a diagram of a geographic area comprising the four macro grids associated with the three micro grid system stacks of FIG. 5C, in accordance with embodiments of the present invention.

FIG. 5D is a diagram of a geographic area 1520 comprising the four macro grids associated with the three micro grid system stacks (1500, 1510, 1530) of FIG. 5C, in accordance with embodiments of the present invention. FIG. 5D depicts the micro grid apparatuses that comprise the three micro grid system stacks (1500, 1510, 1530). The three mobile micro grid system stacks (1500, 1510, 1530) are adjacent to each other and wirelessly connected to each other in the manner described supra in conjunction with FIG. 5C. Each micro grid system stack contains different combinations of macro grid processors, which are illustrated by the shape and boundaries of the respective geographical footprint of the macro grids. Each geographical footprint in FIG. 5D is identified by the macro grid processor (1405, 1505, 1515, 1525) included in its respective macro grid. Each macro grid is governed by its own artificial intelligence. In one embodiment, the geographic area 1520 is several hundred meters across.

Figure 6A:
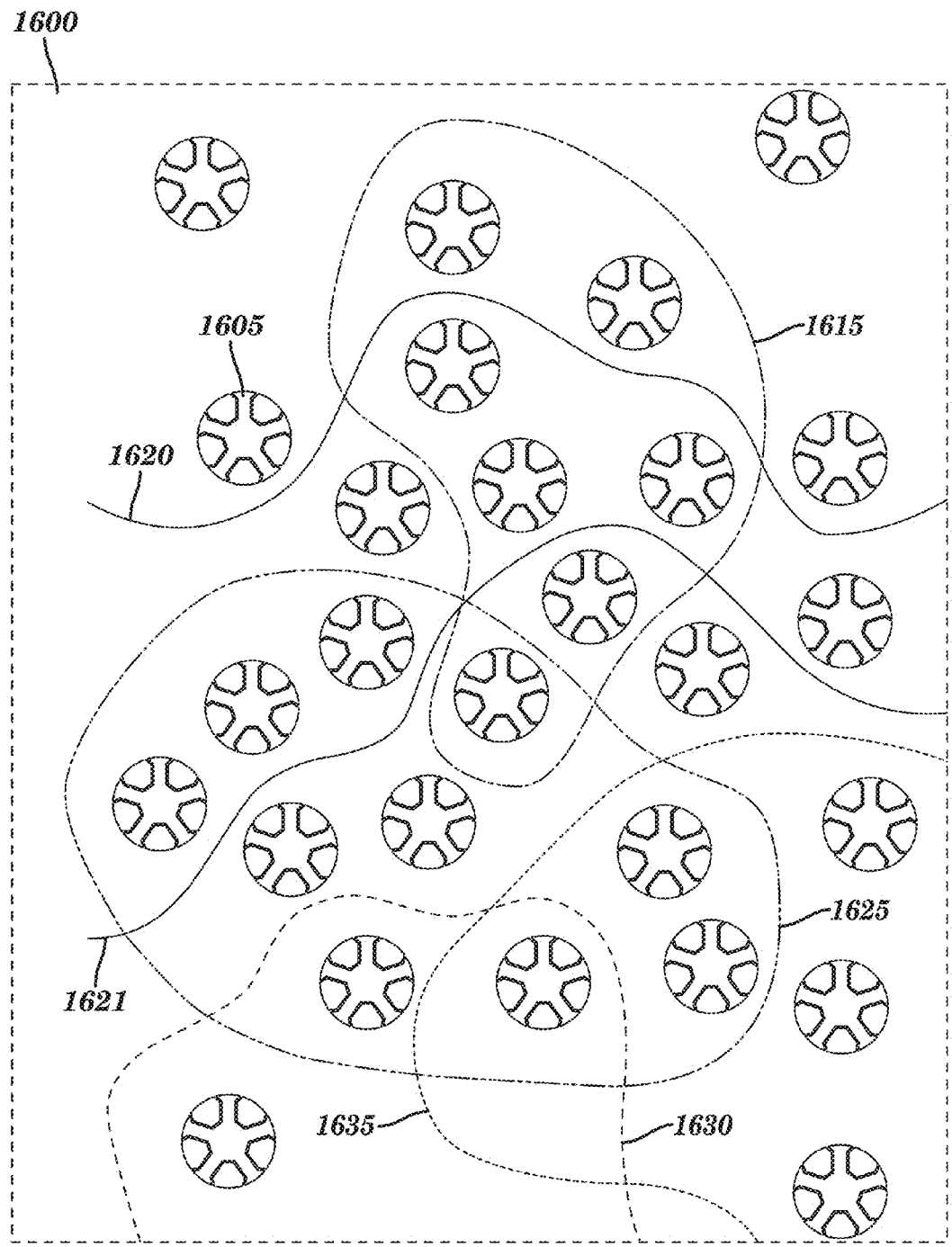
FIG. 6A is a diagram of a geographic area comprising 5 macro grids and 27 micro grid apparatuses, in accordance with embodiments of the present invention.

FIG. 6A is a diagram of a geographic area 1600 comprising 5 macro grids and 27 micro grid apparatuses, in accordance with embodiments of the present invention. FIG. 6A depicts a distribution of micro grid apparatuses within the 5 macro grids. Each micro grid apparatus in FIG. 6A comprises its micro grid system stack, as explained supra. Some or all of the 27 micro grid system stacks are wirelessly connected to each other. Each micro grid system stack contains combinations of macro grid processors, which are illustrated by the shape and boundaries of the geographical footprint of the macro grids respectively. Some such combinations of macro grid processors may differ from each other. Each geographical footprint in FIG. 6A is identified by the macro grid processor (1615, 1620, 1625, 1630, 1635) included in its respective macro grid. The two portions of the footprint of the macro grid 1620 depicted in FIG. 6A are connected to each other outside of the geographic area 1600 and thus collectively form a single continuous footprint. Each macro grid is governed by its own artificial intelligence. In one embodiment, the geographic area 1600 is one kilometer across. At least one micro grid apparatus (denoted by its micro grid system stack 1605) is not connected or participant to any of the macro grids.

Figure 6B:
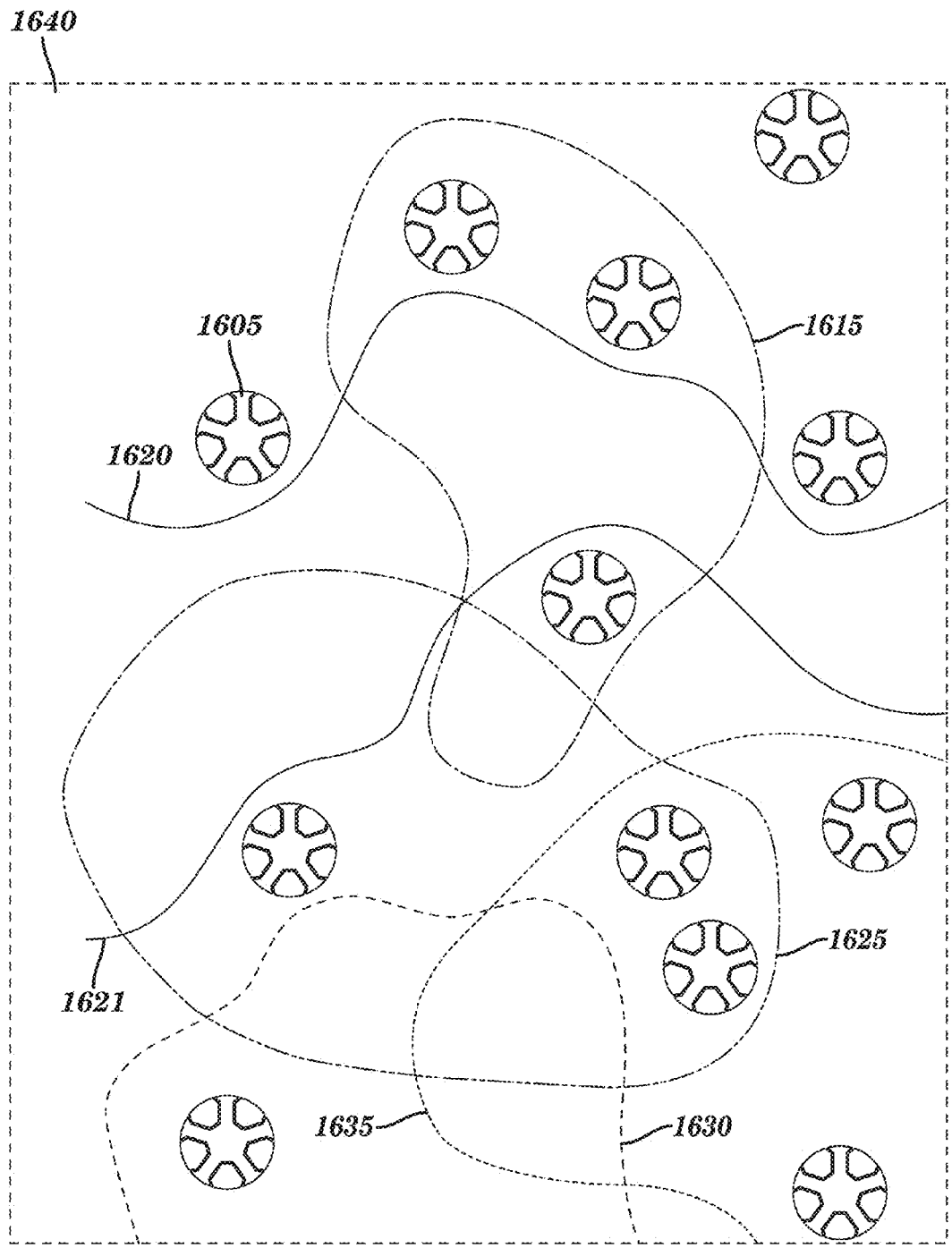
FIG. 6B is a diagram of a geographic area comprising 5 macro grids and 12 micro grid apparatuses and being later in time than the geographic area in FIG. 6A, in accordance with embodiments of the present invention.

FIG. 6B is a diagram of a geographic area 1640 comprising the 5 macro grids of FIG. 6A and 12 micro grid apparatuses, in accordance with embodiments of the present invention. FIG. 6B depicts a distribution of micro grid apparatuses within the 5 macro grids. The 12 micro grid apparatuses in FIG. 6B is a subset of the 27 micro grid apparatuses in FIG. 6A. The geographical area 1640 of FIG. 6B is later in time than is the geographical area 1600 of FIG. 6A and either encompasses or is a subset of the geographical area 1600. Each micro grid apparatus in FIG. 6B comprises its micro grid system stack, as explained supra. Some or all of the 12 micro grid system stacks are wirelessly connected to each other. Each micro grid system stack contains combinations of macro grid processors, which are illustrated by the shape and boundaries of the geographical footprint of the macro grids respectively. Some such combinations of macro grid processors may differ from each other. Each geographical footprint in FIG. 6B is identified by the macro grid processor (1615, 1620, 1625, 1630, 1635) included in its respective macro grid. Each macro grid is governed by its own artificial intelligence. In one embodiment, the geographic area 1640 is one kilometer across. At least one micro grid apparatus (denoted by its micro grid system stack 1605) is not connected or participant to any of the macro grids. One of the macro grid macro grids (1620) has experienced a decaying artificial intelligence and is disappearing due to removal of all of its participating macro grid processors. The geographical footprints of the other macro grids are reducing in size as their alert scale value reduces. The distribution of micro grid apparatuses within the 5 macro grids of FIG. 6B differ from the distribution of micro grid apparatuses within the same 5 macro grids of FIG. 6A due to the dynamic evolution the 5 macro grids from the time associated with FIG. 6A to the time associated with FIG. 6B.

Figure 6C:
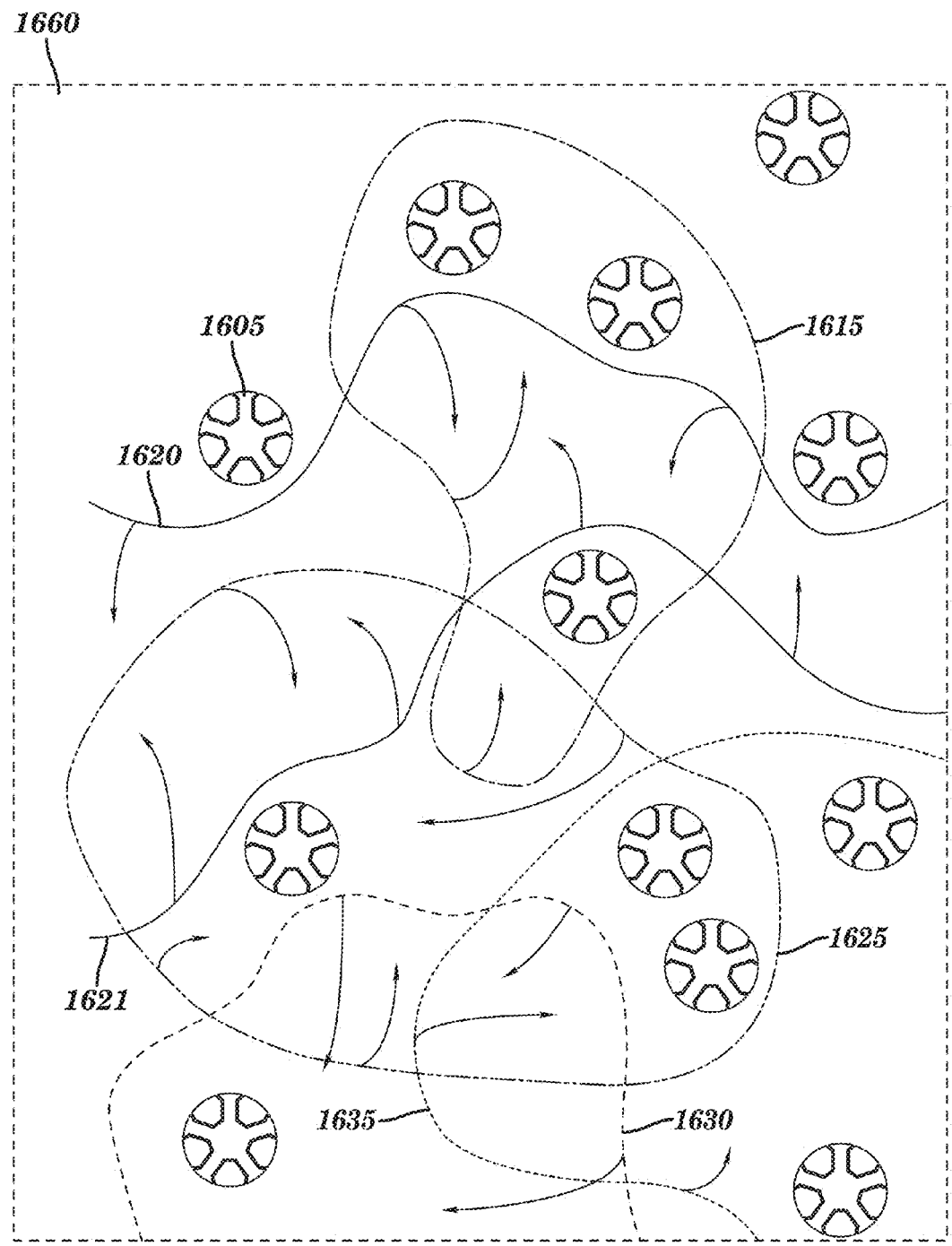
FIG. 6C is a diagram of a geographic area comprising 5 macro grids and 12 micro grid apparatuses and being later in time than the geographic area in FIG. 6B, in accordance with embodiments of the present invention.

FIG. 6C is a diagram of a geographic area 1660 comprising 5 macro grids and 12 micro grid apparatuses, in accordance with embodiments of the present invention. FIG. 6C depicts a distribution of micro grid apparatuses within the 5 macro grids. The 12 micro grid apparatuses in FIG. 6C are the same micro grid apparatuses as the 12 micro grid apparatuses in FIG. 6B. The geographical area 1660 of FIG. 6C is later in time than is the geographical area 1640 of FIG. 6B and either encompasses or is a subset of the geographical area 1640. Each micro grid apparatus in FIG. 6C comprises its micro grid system stack, as explained supra. Some or all of the 12 micro grid system stacks are wirelessly connected to each other. Each micro grid system stack contains combinations of macro grid processors, which are illustrated by the shape and boundaries of the geographical footprint of the macro grids respectively. Some such combinations of macro grid processors may differ from each other. Each geographical footprint in FIG. 6C is identified by the macro grid processor (1615, 1620, 1625, 1630, 1635) included in its respective macro grid. Each macro grid is governed by its own artificial intelligence. In one embodiment, the geographic area 1660 is one kilometer across. At least one micro grid apparatus (denoted by its micro grid system stack 1605) is not connected or participant to any of the macro grids. One of the macro grids (1620) has experienced a decaying artificial intelligence and is disappearing due to removal of all of its participating macro grid processors. The geographical footprints of the other macro grids are reducing in size as their alert scale value reduces. Directional arrows illustrate an instantaneous direction in which portions of each of geographical footprints is dynamically moving, which may represent an expansion or contraction of each macro grid. The distribution of micro grid apparatuses within the 5 macro grids of FIG. 6C have not changed from the distribution of micro grid apparatuses within the same 5 macro grids of FIG. 6C during the period of time from the time associated with FIG. 6B to the time associated with FIG. 6C.

Figure 6D:
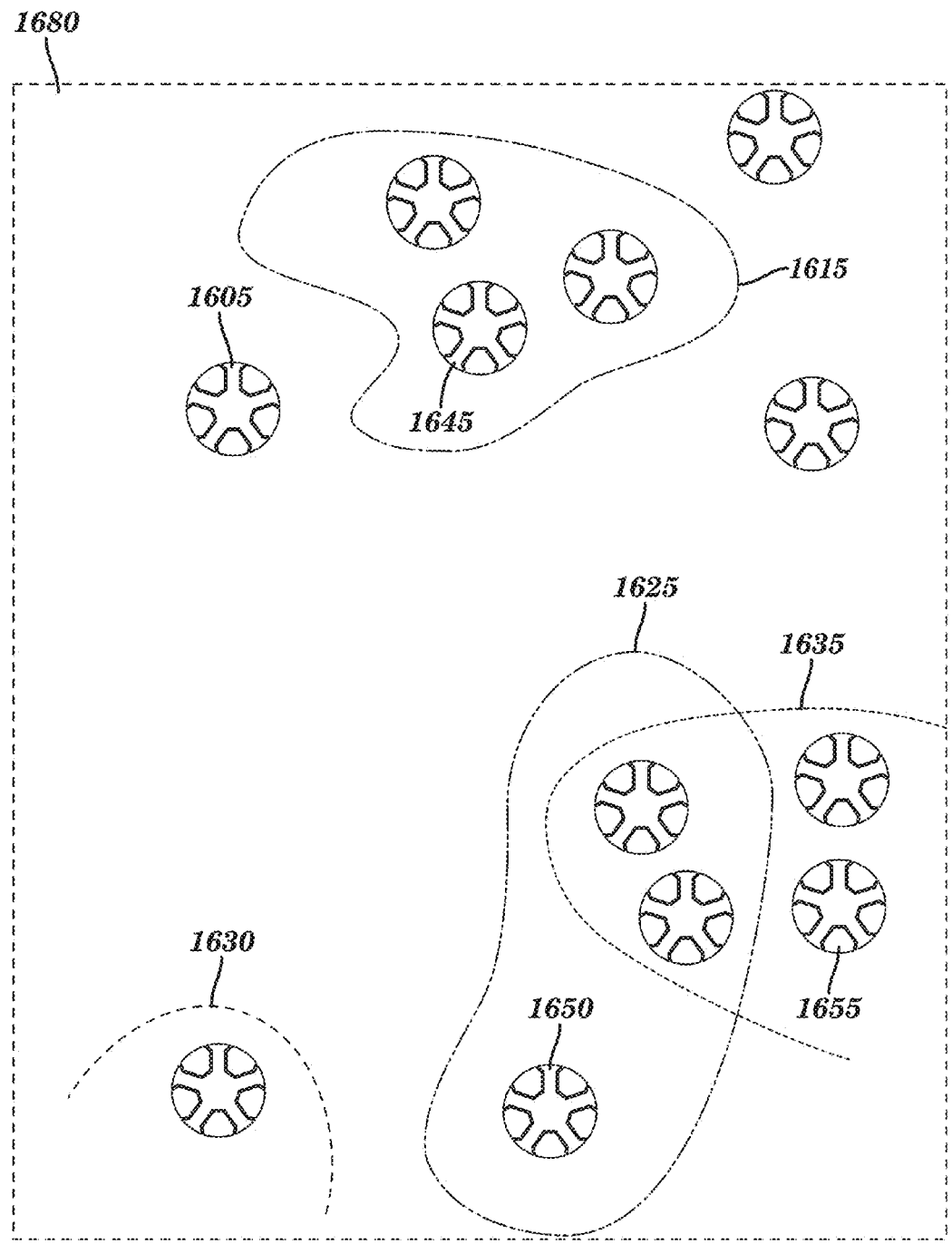
FIG. 6D is a diagram of a geographic area comprising 5 macro grids and 12 micro grid apparatuses and being later in time than the geographic area in FIG. 6C, in accordance with embodiments of the present invention.

FIG. 6D is a diagram of a geographic area 1680 comprising 5 macro grids and 12 micro grid apparatuses, in accordance with embodiments of the present invention. FIG. 6D depicts a distribution of micro grid apparatuses within the 5 macro grids. The geographical area 1680 of FIG. 6D is later in time than is the geographical area 1660 of FIG. 6C and either encompasses or is a subset of the geographical area 1660. The 5 macro grids in the geographic area 1680 in FIG. 6D are associated with a subset of the 12 micro grid apparatuses and consist of the 5 macro grids of FIG. 6C. Each micro grid apparatus in FIG. 6D comprises its micro grid system stack, as explained supra. Some or all of the 12 micro grid system stacks are wirelessly connected to each other. Each micro grid system stack contains combinations of macro grid processors, which are illustrated by the shape and boundaries of the geographical footprint of the macro grids respectively. Some such combinations of macro grid processors may differ from each other. Each geographical footprint in FIG. 6D is identified by the macro grid processor (1615, 1625, 1630, 1635) included in its respective macro grid. Each macro grid is governed by its own artificial intelligence. In one embodiment, the geographic area 1680 is one kilometer across. At least one micro grid apparatus (denoted by its micro grid system stack 1605) is not connected or participant to any of the macro grids. One of the macro grids (1620) has experienced a decaying artificial intelligence and is disappearing due to removal of all of its participating macro grid processors. At the time associated with FIG. 6D, the macro grid 1620 includes micro grid apparatuses only outside of geographical area 1680 and is therefore not explicitly identified in FIG. 6D. The geographical footprints of the other macro grids are reducing in size as their alert scale value reduces. Only 4 macro grids of the 5 macro grids in FIG. 6C remain in FIG. 6D and have been reduced in size and continue to be reduced in size as their alert scale values are being reduced, namely the 4 macro grids identified by the respective macro grid processors 1615, 1625, 1630, 1635. Three micro grid apparatuses (1645, 1650, 1655) are mobile (e.g., in vehicles) that do not appear in FIG. 3C, and their GPS systems indicate a change in 'location value' that is recognized by their governing artificial intelligences to maintain their wireless connections and macro grid participation. Similar to FIG. 6B, the distribution of micro grid apparatuses within the 5 macro grids of FIG. 6D differ from the distribution of micro grid apparatuses within the same 5 macro grids of FIG. 6A and include new micro grid apparatuses (e.g., 1645, 1650, 1655) due to the dynamic evolution and spatial migration of the 5 macro grids from the time associated with FIG. 6C to the time associated with FIG. 6D.

The expansion and contraction of artificial intelligence footprints is generally dynamic and changing.

Each macro grid in FIG. 5D, FIG. 6A, FIG. 6B, FIG. 6C, FIG. 6D, and/or any other macro grid described herein, is formed by the process depicted in FIG. 4C, FIG. 4D, FIG. E, or combinations thereof.

Figure 7A:
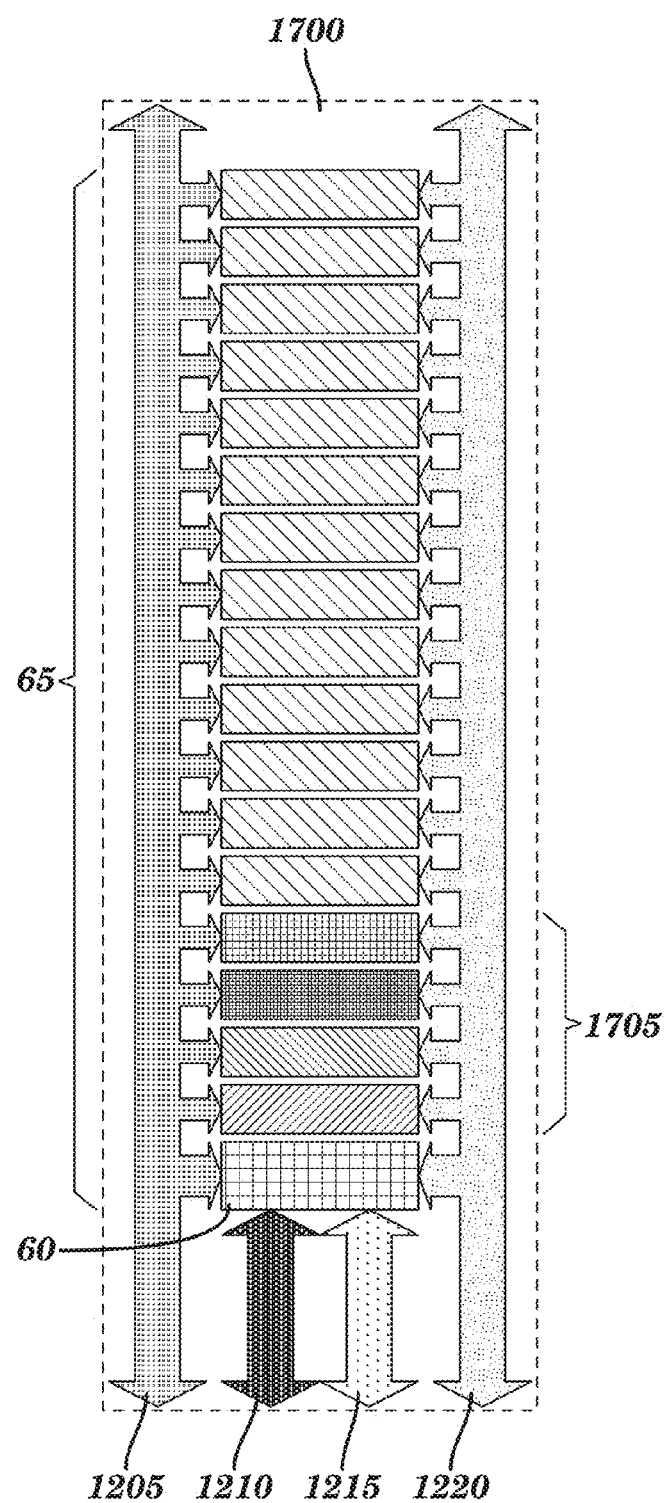
FIG. 7A depicts a micro grid system stack of 18 processors, in accordance with embodiments of the present invention.

FIG. 7A depicts a micro grid system stack 1700 of 18 processors, in accordance with embodiments of the present invention. The micro grid system stack 1700 comprises a unique micro grid processor 60, four designated macro grid processors (1705) of four corresponding macro grids, and 13 micro grid processors 65 (as additional processing resources, some or all of which may be allocated to the four designated macro grid processors (1705)). The four corresponding macro grids exist contemporaneously and have four corresponding artificial intelligences co-existing in the same micro grid apparatus (i.e., the same micro grid system stack 1700). Also shown are the buses (micro grid system bus 1205, standard system buses 1210 and 1215, macro grid system bus 1220) for data transfer and software connections. The unique micro grid processor 60 maintains an orderly macro stack of macro grid processors by selecting the next available micro grid processor in the linear micro grid stack for operating system change to a macro grid processor. A process of 'stack house keeping' by the unique processor 60 ensures stack efficiency and micro grid processor availability for assignment of micro grid processing resources 65 to alert requests.

Figure 7B:
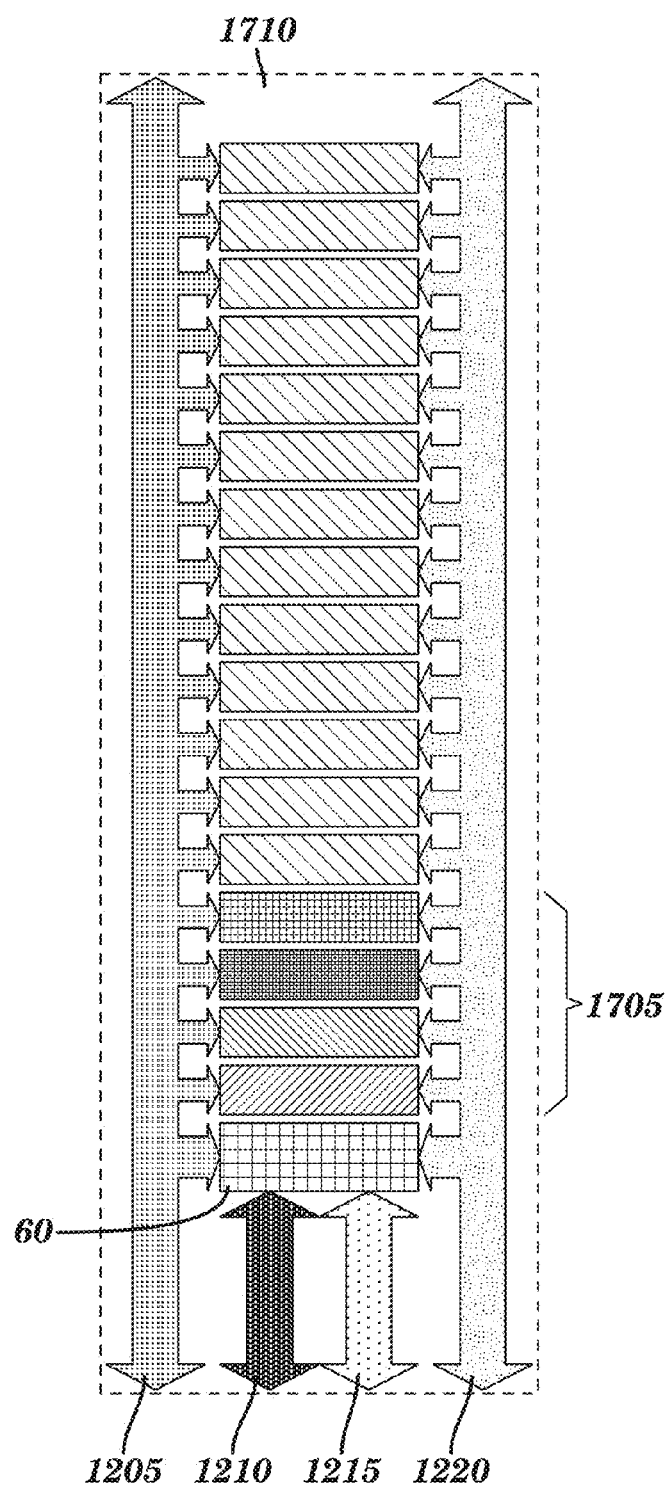
FIG. 7B is a diagram showing a micro grid system stack of 18 processors, displaying an extension capability of buses, in accordance with embodiments of the present invention.

FIG. 7B is a diagram showing a micro grid system stack 1710 of 18 processors, displaying the extension capability of the buses, in accordance with embodiments of the present invention. The micro grid system stack 1710 comprises a unique micro grid processor 60, four designated macro grid processors (1705) of four corresponding macro grids, and 13 micro grid processors 65 (as additional processing resources, some or all of which may be allocated to the four designated macro grid processors (1705)). The four corresponding macro grids exist contemporaneously and have four corresponding artificial intelligences co-existing in the same micro grid apparatus (i.e., the same micro grid system stack 1700). Also shown are the buses (micro grid system bus 1205, standard system buses 1210 and 1215, macro grid system bus 1220) for data transfer and software connections. The unique micro grid processor 60 is embodied at the base (in position zero) of the micro grid system stack 1710. The micro grid system bus 1205 and macro grid system bus 1220 can be extended to provide their bus functionality from 9 to 18 or more micro grid processors with their own individual operating systems. The combined standard system buses 1210 and 1215, micro grid system bus 1205 and macro grid system bus 1220 can be extended to a plurality of other micro grid processor stacks by an irregular shaped module or 'bridge', physically connecting other micro grid apparatuses together.

Figure 7C:
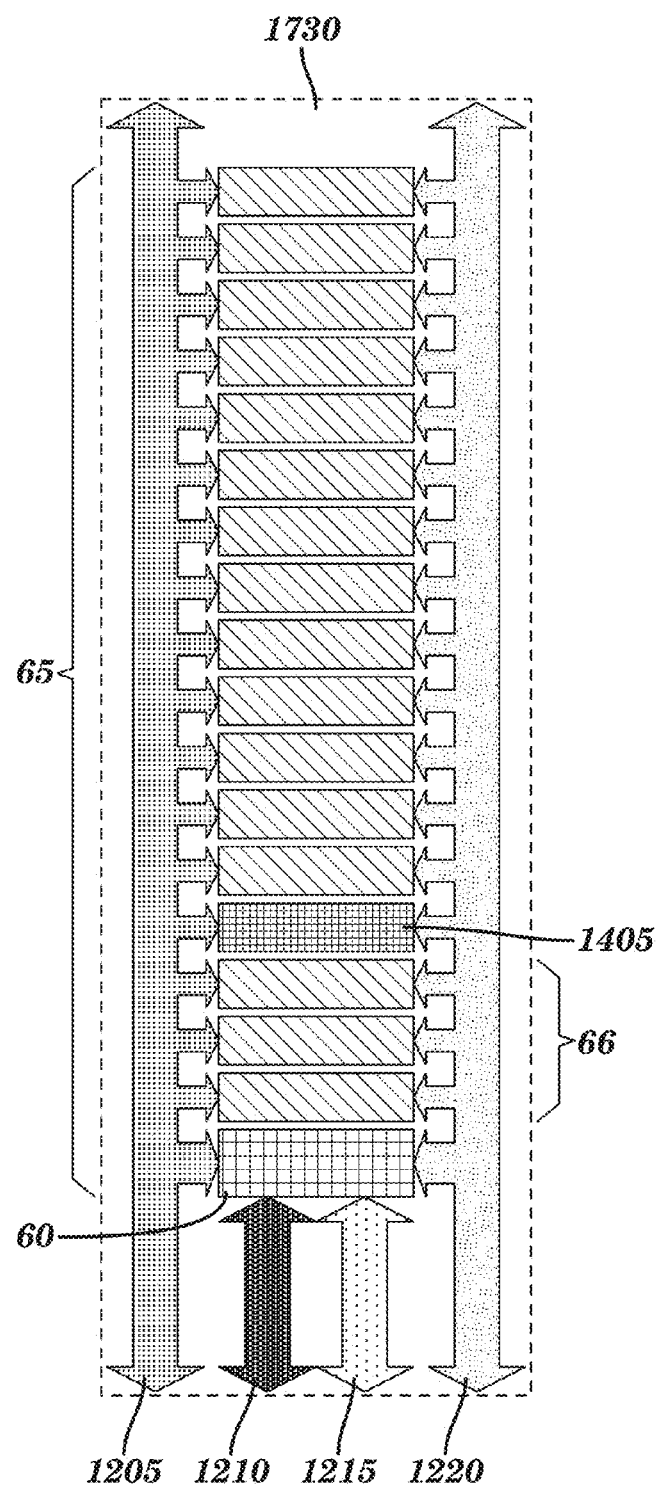
FIG. 7C is a diagram showing a micro grid system stack of 18 processors, displaying operating system change and re-assignment as artificial intelligence requirements of an apparatus are extinguished within a single apparatus, in accordance with embodiments of the present invention.

FIG. 7C is a diagram showing a micro grid system stack 1730 of 18 processors, displaying operating system change and re-assignment as artificial intelligence requirements of the apparatus are extinguished within a single apparatus, in accordance with embodiments of the present invention. The micro grid system stack 1730 comprises a unique micro grid processor 60, a designated macro grid processor 1405 of a corresponding macro grid, 3 micro grid processors 66, and 13 micro grid processors 65. Also shown are the buses (micro grid system bus 1205, standard system buses 1210 and 1215, macro grid system bus 1220) for data transfer and software connections. The unique processor 60 constantly monitors alert data interrogated from its attached local and remote sensors, as well as the alert data issued by the macro grid artificial intelligence it is participating in. The unique processor 60 constantly receives alert values of scale from a plurality of sources. The alert value of scale for the macro grid processor 1405 indicates it is still required to participate in providing processing resources for the artificial intelligence within that macro grid. However, the 3 macro grid processors 66 have been returned to micro grid operating systems as their artificial intelligences have been extinguished. The next step is for the unique processor 60 in the micro grid system stack to apply further 'housekeeping' and relocate the operating system of the macro grid processor 1405 at stack position four to stack position one. The three freshly re-assigned micro grid processors 66 are then coalesced with the other 13 micro grid processors 65 by the unique processor 60's instruction, resulting in a linear and uninterrupted stack of 16 micro grid processors (not shown), ready for the next alert.

The scale (S) of an alert is computed by the artificial intelligence from interrogation of alert data either detected directly via the unique processor 60 within the structure 500 (see FIG. 4B) from the connected local sensors and/or remote sensors via the micro grid's I/O module 410 and communications module 425 (see FIG. 4B), or received (see step 1455 of FIG. 4D) from an external micro grid apparatus or a macro grid that is wirelessly connected to the micro grid apparatus 100.

Adjacent wirelessly connectable physical apparatuses respond to the received (1450 to 1470) alert and join the macro grid along with processing resources as required by the artificial intelligence. The communicational data may be in the TCP/IP packet format.

The scale (S) of an alert is computed and used by the artificial intelligence to constantly indicate an alert value to all participating wirelessly connected micro grid unique processors (60) responsible for assigning macro grid processors and managing micro grid processors and resources. The scale (S) indicates, to the unique processor 60, a requirement to conscript more micro grid processors for the artificial intelligence, maintain the status quo, or reduce resource participation, which facilitates scalability of the dynamic functional use of the micro grid systems.

The artificial intelligence processes the data to counter the event with physical action and activity against the cause of the alert. This is undertaken by instruction to the available intelligent actuators (not shown) controlled by the unique operating system of the unique processor 60 in each micro grid apparatus. Alert interrogation provides the necessary feedback to the artificial intelligence to assess the effectiveness of the counter, which is then adjusted accordingly. This counter action and feedback mechanism may occur within a short period (e.g., milliseconds).

There are many examples for using the present invention, wherein micro grid and macro grid alert processing can be provided for artificial intelligence to take pro-active control of situations, initiated by the raising of alarms and alerts. Micro grid and macro grid technology could be deployed everywhere, resolving issues, counteracting events, and controlling remote circumstances that would otherwise require centralized decision making by people, who are not always available 24×7×365.

The following three hypothetical examples illustrate use of the present invention.

1. A huge forest fire erupts overnight in the hills behind Los Angeles (LA). The wind direction and fire intensity indicates an event to some outer LA suburbs within 48 hours. 427 fire trucks and 3 sky-crane helicopters have been dispatched by the greater LA Fire Authority into the area. Micro grids are embedded in all vehicles, and monitor heat, wind, smoke, and location information from their intelligent sensors. A smoke alert is raised by one of the micro grids. Quickly a macro grid is formed between all vehicles and the artificial intelligence takes control of the dangerous event. Each vehicle has interactive voice and video. The artificial intelligence interfaces with these communication devices and issues task assignments to the LA Fire Authority Units. The artificial intelligence provides a constant stream of updated information to central control, police, ambulance, and news media. The forest fire is surrounded by fire fighting efficiency and resource co-ordination. Within 36 hour, the potential disaster is arrested and suffocated. The wireless macro grid decays and separates back to individual micro grid processing. The mayor thanks the LA Fire Authority for another job well done.

2. It is year 2017 and the recently arrived NASA roving vehicles on Titan have been transmitting astounding images and data to Earth central control. A micro meteorite impacts 200 meters from one of the rovers, creating a sudden geological landscape change, unseen by earth controllers that may prove destructive for the $4 billion mission. Large freshly formed terrain fractures are detected by micro grid sensors on the rovers. A macro grid is quickly formed, and the generated artificial intelligence overrides current forward movement instructions and stops the affected rover immediately. This averts a potential rover loss, as communication with earth control is over 16 minutes (turnaround). The artificial intelligence re-evaluates the terrain and provides Earth controllers with Titan ground distance images and new atmospheric temperature, dust, gas and pressure data from the direction of the meteorite impact. The artificial intelligence decays and the individual micro grid unique processor in the command vehicle waits revised mission instructions.

3. It is 6.30 AM on a winter day in year 2012, and 400,000 vehicles are on the Ml motorway in England due to people traveling to work. Micro grid computing has been embedded in vehicles since year 2009 and approximately 15% of the vehicles have the technology. A thick fog rolls in over a 12 mile portion of the Ml motorway. Micro-grid sensors within the vehicles react to the arrival of the thick fog and indicate the density and GPS location to the other collaborating macro grid connected vehicles. Quickly, a fog pattern alert is generated by the artificial intelligence and conveyed to British motorway authorities including weather forecasters, television stations, and radio stations. The collaborating processors in the macro grid dispatch and share an unsolicited alert image on their dashboard LCD screens indicating topographic size and density of the fog. Safely, the vehicles slow down influencing other non-macro-grid vehicle drivers to do the same. Image processing, sensor sampling, and information up-dates are maintained by the artificial intelligence until all vehicles have passed through the fog, and the fog itself lifts for another fine day.

B. Governance

Governance relates to the structure and function of a macro grid configured to respond to an alert and may comprise, inter alia, processor stack control, operating system software, house keeping within stacks, control growth, decay, and operation of the unique processors of the macro grid, communication between or among the unique processors of the macro grid, etc.

The present invention utilizes the following governance structures that may exist in a macro grid: Council, Executive, Parliament, and Government, in conjunction with a simple micro grid apparatus and/or a complex micro grid apparatus (also called a "connectivity structure").

A simple micro grid apparatus is defined as a micro grid apparatus that comprises one and only one plurality of processors, said one and only one plurality of processors including one and only one unique processor having a unique operating system that differs from the operating system of each other processor in the plurality of processors of the simple micro grid apparatus.

A complex micro grid apparatus (or connectivity structure) is defined as a micro grid apparatus that comprises at least two pluralities of processors, wherein the at least two plurality of processors are physically connected within the complex micro grid apparatus such that each plurality of processors includes one and only one unique processor having a unique operating system that differs from the operating system of each other processor in each plurality of processors of the complex micro grid apparatus.

A Council is defined as a unique processor in a macro grid such that the unique processor is comprised by a plurality of processors and is wirelessly connected to at least one other unique processor in the macro grid, wherein each unique processor in the macro grid has a unique operating system that differs from the operating system of each other unique processor in the plurality of processors of a micro grid apparatus.

An Executive within a macro grid is defined as a Council in a simple micro grid apparatus (e.g., a mobile micro grid apparatus), wherein the Council is wirelessly connected to at least one other unique processor in the macro grid that is external to the simple micro grid apparatus and is not physically connected to any other unique processor of the macro grid. Each Executive in a macro grid is a Council consisting of a unique processor in a different plurality of processors of at least one plurality of processors. For example, the unique processor 60 within the simple micro grid apparatus 100 of FIG. 1, if comprised by a macro grid, is an Executive in the macro grid, if the unique processor 60 in FIG. 1 is wirelessly connected to at least one other unique processor in the macro grid. It is noted that the unique processor 60 in FIG. 1 is not physically connected to any other unique processor of the macro grid.

A Parliament within a macro grid is defined as a plurality of unique processors (Councils) within a connective structure in which the unique processors of the plurality of unique processors are physically connected within the connective structure, wherein the unique processors of the plurality of unique processors in the Parliament are each wirelessly connected to at least one other unique processor of the macro grid that is external to the connective structure. Each unique processor of the plurality of unique processors in the Parliament is comprised by a plurality of processors within the connective structure.

A Government within a macro grid is defined as a plurality of governmental components such that each governmental component is either an Executive or a Parliament. Each such governmental component within a Government can communicate with at least one other governmental component within the Government. Such communication is effectuated via any Council or a designated resource processor in each governmental component. The present invention provides a structure and mechanism for the unique processors of the governmental components within a Government to communicate effectively with each other.

Thus, a Government, a Parliament, an Executive, and a Council are each a governance structure. A Government comprises a plurality of Executives, a plurality of Parliaments, or at least one Executive and at least one Parliament. An Executive, which comprises a Council, is a governmental component of a Government. A Parliament, which comprises a plurality of Councils, is another governmental component of a Government. A Council is the smallest indivisible governance structure within a Government.

As discussed supra, a unique processor of a macro grid is comprised by a plurality of processors in a micro grid apparatus.

A plurality of Governments can contemporaneously exist at any time within a corresponding plurality of macro grids or within a single macro grid.

A Government may created initially for (and on demand by) an artificial intelligence for the macro grid. Alternatively, a Government or a governance substructure within a Government may create or activate an artificial intelligence for the macro grid.

Two Governments, one government having a relatively lower artificial intelligence and the other government having a relatively higher artificial intelligence, can merge such that the relatively lower artificial intelligence transfers the alert responsibility and ownership to the relatively higher artificial intelligence in accordance with specified rules. An example of such a rule for transferring the alert responsibility may be: upon recognition by two artificial intelligences that they have been generated for the same alert originally responded to by their respective unique processors in different geographical locations and within different micro grid structures or apparatuses, the Government of unique processors then enables access to the multiple alert sensors (and response actuators) of the relatively higher artificial intelligence. Relatively lower and higher artificial intelligence is determined or measured by specified intelligence level rules for artificial intelligences.

A Government can split into a plurality of smaller Governments in accordance with specified rules, (e.g., the footprint of a mobile relatively higher artificial intelligence owning multiple alerts becomes stretched to a 'snap' point and becomes wirelessly 'out of range' forming multiple new smaller footprints). Each resultant artificial intelligence may not necessarily have the same number of alerts to remedy and may re-merge into a single Government (with a single artificial intelligence) again if the wireless connection is re-established.

A Government exists and may expand/or decay for the life of a wirelessly transient artificial Intelligence of its associated macro grid. A Government can decay into Parliaments, and/or Councils as its associated macro grid decays with the connectivity structure remaining intact.

A Parliament can be transformed into Executives and smaller Parliaments by physical fragmentation of the connectivity structure in which the Parliament is contained.

A Parliament exists for the life of the assembled bridge structure within the macro grid until decayed from the macro grid.

The following working flow relates to the use of governance structures by the present invention.

An alert is sensed by a unique processor (60) in a micro grid stack. A macro grid is initiated and an associated artificial intelligence is generated as a reaction to the alert. In one embodiment, the unique processor (60) in the micro grid stack is an Executive. The unique processor (60) in the micro grid stack assigns the artificial intelligence ownership of the alert and converts a micro grid processor in its stack into a macro grid processor (by alteration and addition of operating system software) in which the artificial intelligence can initially reside. The artificial intelligence may, depending on the size of the alert, authoritatively negotiate with a unique processor of a simple or complex micro grid apparatus for more processor resources. If the micro grid apparatus is within a complex micro grid apparatus (i.e., a connectivity structure such as, inter alia, a bridge structure), unique processors within the complex micro grid apparatus amalgamate to form a Parliament of unique processors. In this instance, the artificial intelligence negotiates with the Parliament for additional macro grid processors within the complex micro grid structure. Otherwise, the micro grid apparatus is within a simple micro grid apparatus comprising an Executive and the artificial intelligence negotiates with just the Executive present within the simple micro grid apparatus. The artificial intelligence may not achieve all the processor resources it requires from the Executive or Parliament, and may instruct the Executive or Parliament to locate any adjacent wireless micro grids, and amalgamate them into a Government of wirelessly connected unique micro grid processors (which includes the Executive or Parliament that the artificial intelligence is already negotiating with). The unique processor (60) in the micro grid stack that initiated formation of the macro grid is a Council that either is an Executive in the Government or is within a Parliament in the Government. This process of accumulating wirelessly connected Executives and Parliaments continues, as the artificial intelligence seeks the necessary macro grid processors to undertake its remedy of the alert. The footprint of the Government that the artificial intelligence operates in may grow to an enormous scale in size, or remain localized. The footprint of the Government may expand and contract on demand of the artificial intelligence. As an artificial intelligence decays it relinquishes individual Executives and Parliaments that were wirelessly connected, which may also occur as attrition through mobility, until the artificial intelligence is extinguished and its last macro grid processor is returned by the Council back to the micro grid stack as a micro grid processor. If no other macro grid processors are assigned in the simple micro grid apparatus, the Council reverts to a simple unique processor (60), attentively monitoring its I/O, GPS and communication module sensors, and waiting for another alert to occur.

Figure 8A:
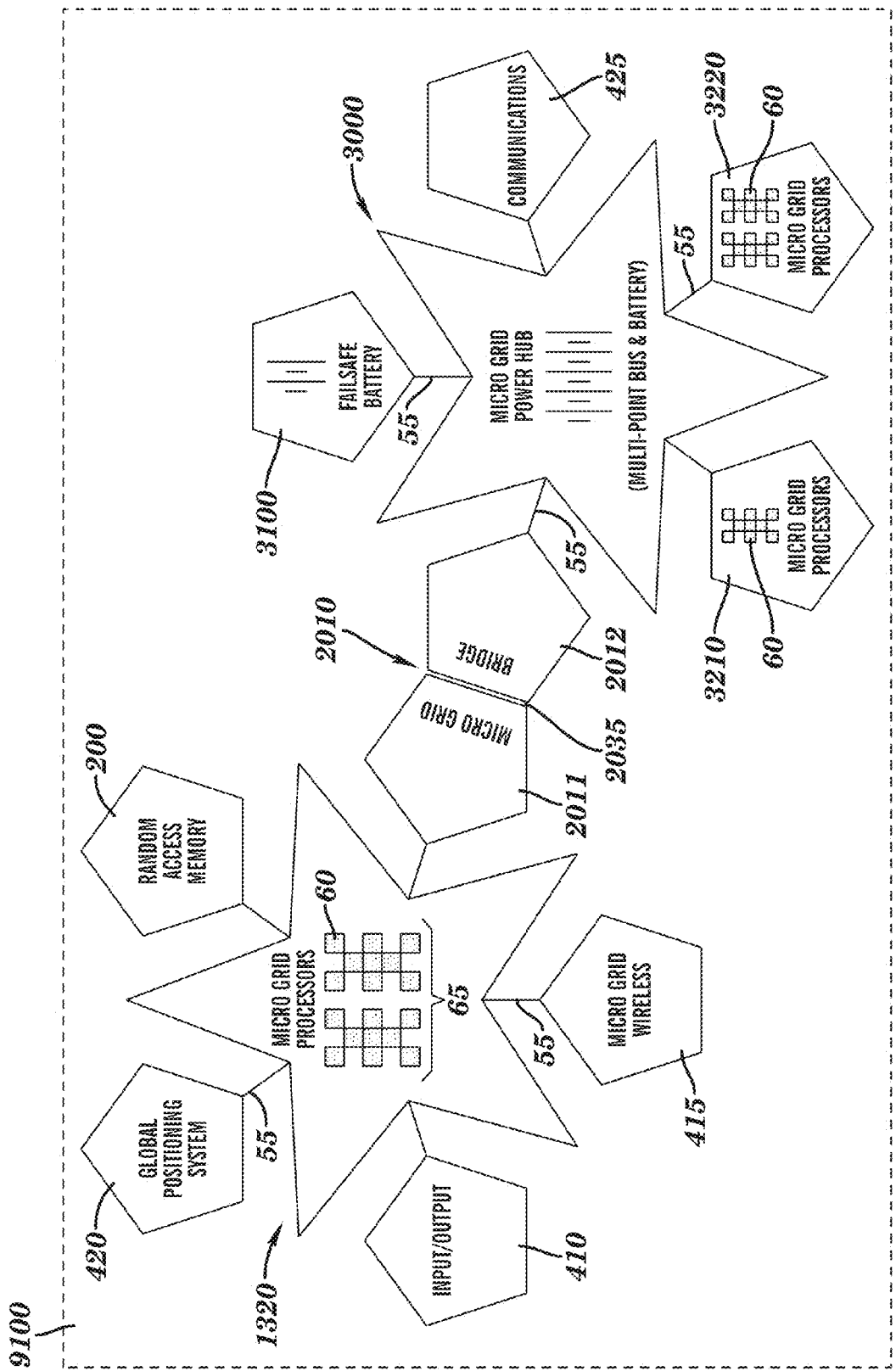
FIG. 8A is a block diagram depicting a connectivity structure with a bridge module physically connecting a micro grid apparatus to a power hub, in accordance with embodiments of the present invention.

FIG. 8A is a block diagram depicting a connectivity structure 9100 with a bridge module 2010 physically connecting a micro grid structure 1320 to a power hub 3000, in accordance with embodiments of the present invention. The bridge module 2010 comprises bridge units 2011 and 2012 connected together by a bridge hinge 2035. The bridge hinge 2035 provides the bridge module 2010 with sufficient physical flexibility to enable the bridge units 2011 and 2012 to dock and be ensconced into respective docking bays of the micro grid structure 1320 and the power hub 3000. Generally, the micro grid apparatus 1320 and the power hub 3000 are embodiments of a first micro grid system and a second micro grid system, respectively.

The micro grid structure 1320 comprises the group of micro grid processors 65 which include a unique processor (Council) 60. The micro grid structure 1320 accommodates, via connection interface 55, the irregular shaped modules 420 (GPS), 200 (RAM), 410 (I/O), 415 (wireless connection), and the bridge unit 2011 of the bridge module 2010.

The power hub 3000 comprises a plurality of rechargable batteries and accommodates, via connection interface 55, the irregular shaped modules 3100 (failsafe battery), 425 (communications), 3210 (micro grid processors that include a unique processor (Council) 60), 3220 (micro grid processors that include a unique processor (Council) 60, and the bridge unit 2012 of the bridge module 2010. The plurality of rechargable batteries in the power hub 3000 provides electrical power for the micro grid processors in the irregular shaped modules (e.g., modules 3210 and 3220). The failsafe battery in the module 3100 provides back up power for the rechargable batteries in the power hub 3000 (if the rechargable batteries should become discharged or otherwise fail) or additional power to supplement the power provided by the rechargable batteries in the power hub 3000. Failsafe battery modules may be connected in any plurality via connection interfaces (55), across all complex micro grid structures and apparatuses, including micro grid power hubs and micro grid power towers, where a plurality of connection interfaces (55) are presented.

The Councils 60 in the connectivity structure 9100 collectively form a Parliament within a macro grid. The Parliament comprises the unique processor 60 in the micro grid structure 1320, the unique processor 60 of the micro grid processors 3210, and unique processor 60 of the micro grid processors 3220.

The connectivity structure 9100 is more specifically a bridge structure. A bridge structure comprises a plurality of micro grid systems linked together by one or more bridge modules. Each bridge module of a bridge structure physically links together two micro grid systems of the plurality of micro grid systems. Each of micro grid system of the plurality of systems comprises at least one micro grid apparatus having a plurality of processors 65 that includes a unique processor 60. Thus, a bridge structure comprises a plurality of unique processors 60 disposed within the plurality of micro grid systems which are coupled together by the bridge module(s) in the bridge structure.

A Parliament comprises physically connected Councils, each Council with jurisdiction over its own plurality of (wafer contained) processors. The Parliament comprises software (residing in one or more Councils of the Parliament) that queries the Councils for processor resource availability and assignment, and interfaces wirelessly to potential requests for participation in a Government. The Parliament facilitates its internal and external data communications with utilization of the enhanced TCP/IP model structure (see FIG. 13A infra), and packet structure (see FIG. 13B infra), and provides full peer-to-peer facilitation (including governance and artificial intelligence) within its interconnected structure.

Macro grid modularity allows for removal and addition of Councils, Executives, and Parliaments. Physical connection or removal of Councils from or to a Parliament is provided for by governance operating system software that detects the Council alterations and reconfigures the Parliament appropriately to reflect the change.

Known existing (and future designed) application software, operational system software, communications software, and other software including drivers, interpreters and compilers for micro processor systems may function within the embodiments of the present invention.

The Global Positioning System (GPS) module (420) provides the telemetry and handover data for inclusion in the enhanced TCP/IP data packets originating from any processor in the Parliament. GPS data may be static for non-mobile micro grid Councils or Parliaments, or dynamic for mobile micro grid Executives or Parliaments.

Figure 8B:
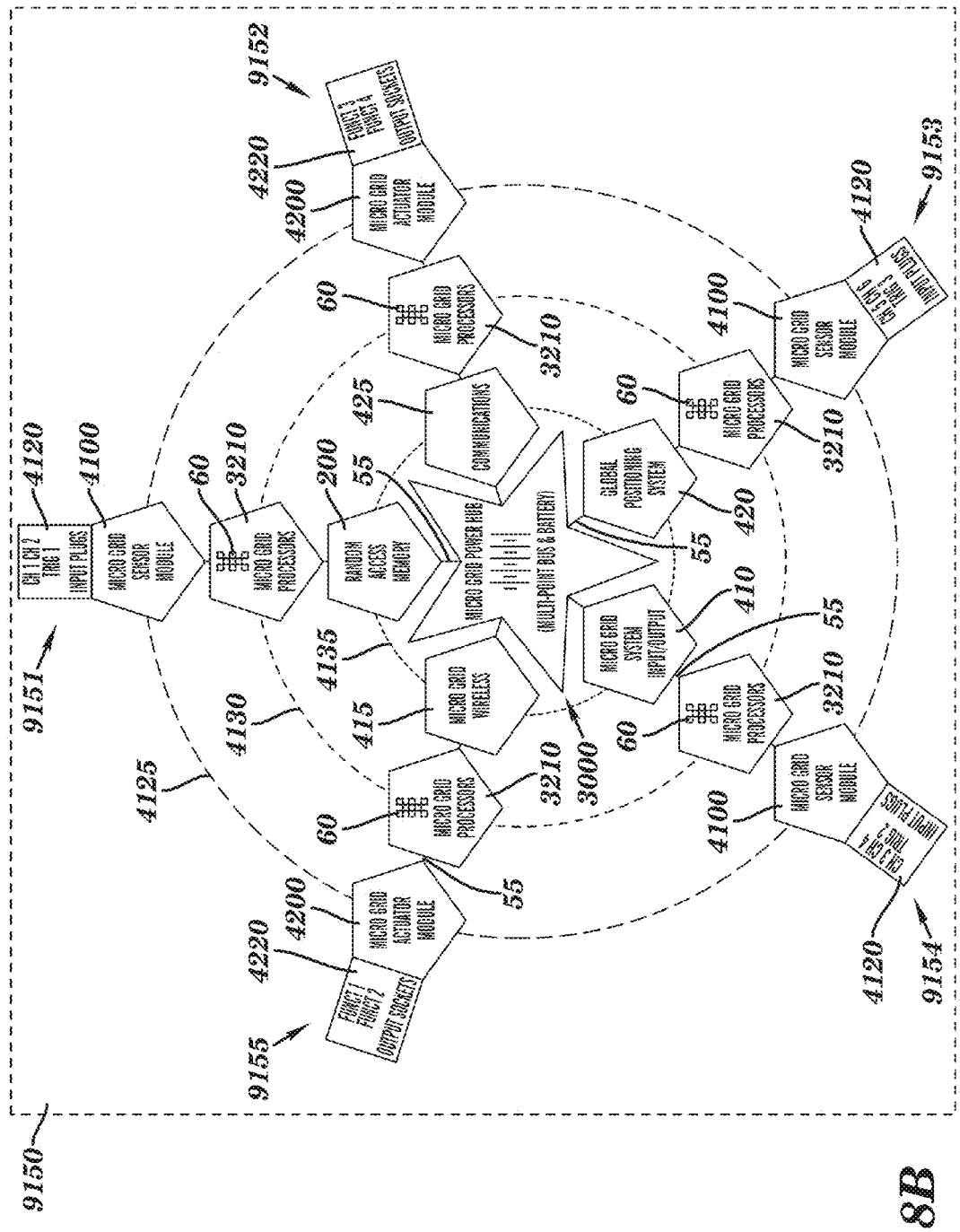
FIG. 8B is a block diagram depicting a connectivity structure in the form of a complex power hub apparatus comprising a central power hub and radial vertical tiers, in accordance with embodiments of the present invention.
Figure 8C:
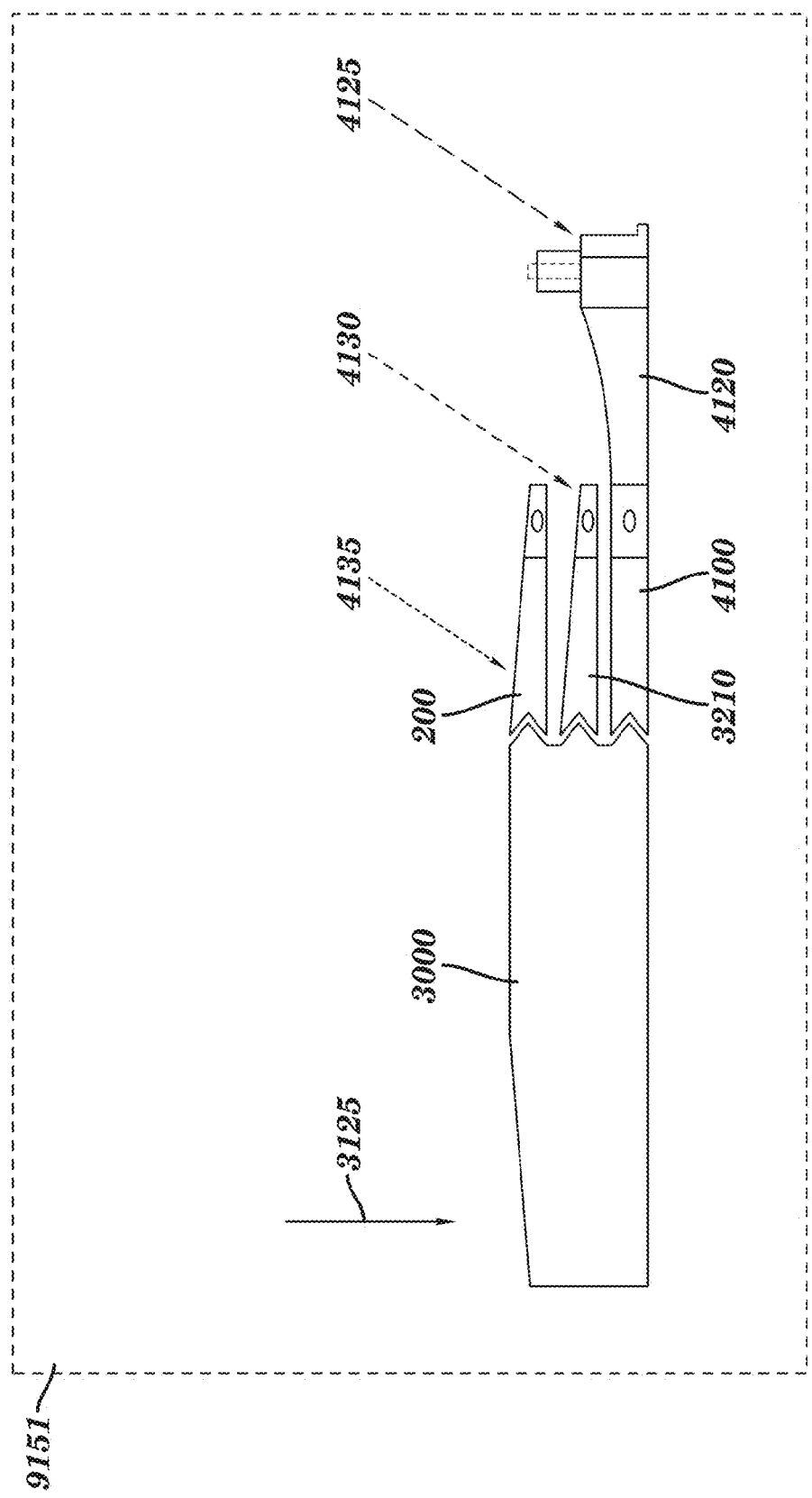
FIG. 8C depicts a radial vertical tier of FIG. 8B, in accordance with embodiments of the present invention

FIG. 8B is a block diagram depicting a connectivity structure in the form of a complex power hub apparatus 9150 comprising a central power hub 3000 and radial vertical tiers (9151-9155), in accordance with embodiments of the present invention. Each radial vertical tier comprises three physically irregular shaped modules, Each irregular shaped module is connected to the power hub 3000 as illustrated in FIG. 8C, described infra.

Generally, a complex power hub apparatus comprises a central power hub, a plurality of connection interfaces (55) and radial vertical tiers (9151, 9152, 9153, 9154, 9155). Each radial vertical tier provides a plurality of physical connections to the central power hub 3000 and comprises irregular shaped modules interconnected with each other via connection interfaces 55. The central power hub 3000 comprises a central area and radial arms external to and integral with the central area to define docking bays such that each radial vertical tier is physically connected to the central power hub 3000 at a respective docking bay at the central area. The central power hub 3000 is analogous to the micro grid apparatus 100 of FIG. 2A with respect to the central area 115, radial arms 110, and docking bay 450 in FIG. 2A. Each radial vertical tier (9151, 9152, 9153, 9154, 9155) in FIG. 8B comprises a plurality of modules consisting of a same number of modules in each radial vertical tier.

The complex power hub apparatus (9150) shown in FIG. 8B is a vertically tall structure comprising three connectivity horizontal layers, illustrated by circles (4125, 4130, 4135), wherein each circle embodies five irregular shaped modules distributed in the five respective radial vertical tiers (9151, 9152, 9153, 9154, 9155). A total of fifteen connection interfaces (55) are presented on this complex power hub structure, for embodying the fifteen irregular shaped modules illustrated.

A complex power hub apparatus is not limited to three horizontal layers and generally comprises a plurality of horizontal layers that could be illustrated as a plurality of circles. Thus, the modules in the radial vertical tiers are collectively distributed on the circles of the plurality of circles. The circles are concentric with a center point (e.g., geometric center, centroid, etc.) in the central power hub such that a total number of circles in the plurality of circles is equal to the same number of modules in each radial vertical tier. Corresponding modules in respective radial vertical tiers are located on a same circle of the plurality of circles.

A complex power hub apparatus may be manufactured in a plurality of configurations, including very tall 'power tower' structures for forming micro grid mainframe apparatuses, with a plurality of horizontal layers, and radial vertical tiers.

Circle 4125 comprises: three micro grid sensor modules 4100 with input plugs 4120 physically connected to the micro grid sensor module 4100, two micro grid actuator modules 4200 with output sockets 4220 physically connected to the micro grid actuator module 4200 to cause generation of output or activate responsive functionality in response to the event that the macro grid is responding to, and each physically connected to the power hub 3000 at the first horizontal layer (illustrated as circle 4125) of available docking bays. Thus, the three micro grid sensor modules 4100 and the two micro grid actuator modules 4200 are corresponding modules in respective radial vertical tiers 9151-9155 such that the corresponding modules are located on the same horizontal layer of a plurality of horizontal layers.

Circle 4130 comprises: five micro grid processor modules 3210 (each micro grid processor module having a unique processor (Council) 60), and each micro grid processor module physically connected to the power hub 3000 at the second horizontal layer (illustrated as circle 4130) of available docking bays. Thus, the five micro grid processor modules 3210 are corresponding modules in respective radial vertical tiers 9151-9155 such that the corresponding modules are located on the same horizontal layer of a plurality of horizontal layers.

Circle 4135 comprises: a RAM module 200, a communications module 425, a GPS module 420, an I/O module 410, and a wireless module 415, each physically connected to the power hub 3000 at the third horizontal layer (illustrated as circle 4135) of available docking bays. Thus, the RAM module 200, the communications module 425, the GPS module 420, the I/O module 410, and the wireless module 415 are corresponding modules in respective radial vertical tiers 9151-9155 such that the corresponding modules are located on the same horizontal layer of a plurality of horizontal layers.

The three connected micro grid sensor modules 4100 each utilize its input plugs 4120 to detect input such as an alert or a communication from another processor either external to (i.e., wirelessly connected to) or within the connectivity structure 9150. Such communication is described infra in terms of an enhanced TCP/IP model structure.

The three connected sensor micro grid sensor modules 4100 in the modular radial vertical tiers 9151, 9153, and 9154 each comprise its own single unique processor (Council) 60 (not shown). The two connected micro grid actuator modules 4200 each comprise its own single unique processor (Council) 60 (not shown). The connectivity structure 9150 comprises ten Councils 60 which collectively form a Parliament within a macro grid. The Parliament comprises ten Councils 60 embodied in the circles 4125, 4130, 4135.

The data from the Global Positioning System (GPS) module 420 in FIG. 8B could be either static or dynamic depending on the micro grid apparatus installation environment and material use.

Whether mobile or fixed, the Parliament facilitates its internal and external data communications with utilization of the enhanced TCP/IP model structure (see FIG. 13A infra), and packet structure (see FIG. 13B infra), and provides full peer-to-peer facilitation (including governance and artificial intelligence) within its interconnected structure.

FIG. 8C depicts a vertical section of the radial vertical tier 9151 of FIG. 8B, in accordance with embodiments of the present invention. FIG. 8C shows a distribution in the vertical direction 3125 of the RAM module 200, the micro grid processors 3210, and the micro grid sensor module 4100. The vertical direction 3125 is perpendicular to the plane of the two-dimensional representation of the complex power hub apparatus 9150 of FIG. 8B. The vertical direction 3125 is also perpendicular to the central area within the central power hub 3000. The modules 200, 3210, and 4100 are physically connected to the central power hub 3000 as shown. The output sockets 4120 are connected to the micro grid sensor module 4100 at a same vertical level. FIG. 8C depicts the circles 4135, 4130, and 4135 at different vertical levels along the direction 3125.

The other radial vertical tiers (9152, 9153, 9154, 9155) of FIG. 8B have vertical sections which are similar in mechanical structure to the vertical section of the radial vertical tier 9151 depicted in FIG. 8C.

Figure 8D:
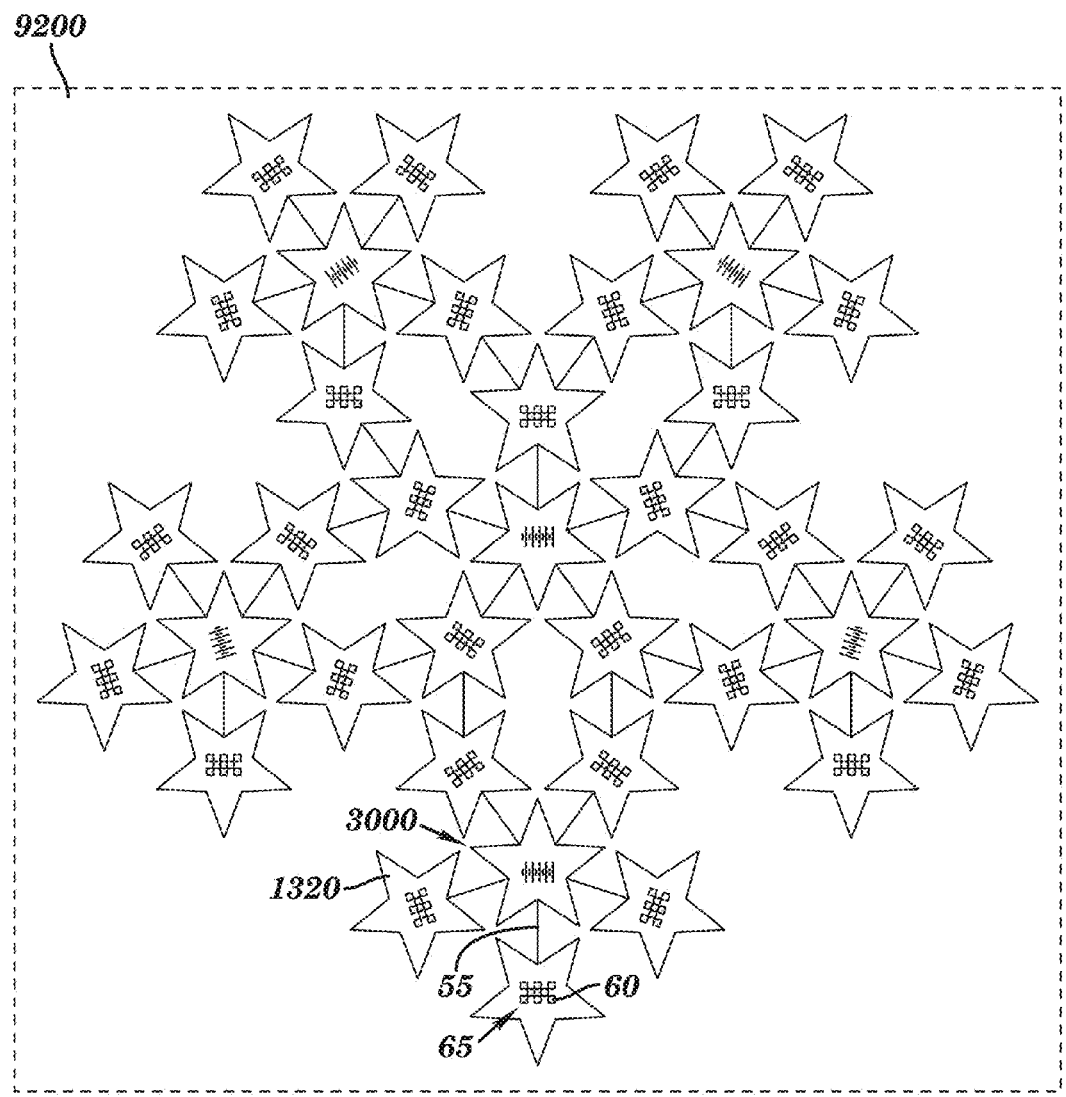
FIG. 8D is a block diagram depicting a connectivity structure in the form of complex mosaic micro grid apparatus including power hubs and micro grid structures, in accordance with embodiments of the present invention.

FIG. 8D is a block diagram depicting a connectivity structure 9200 in the form of complex mosaic micro grid apparatus including power hubs and micro grid structures, in accordance with embodiments of the present invention. The connectivity structure 9200 comprises multiple power hubs 3000 and multiple micro grid structures 1320 physically connected by connection interfaces 55. Each multiple micro grid structure 1320 comprises a plurality of processors 65 that includes a unique processor (Council) 60. The Councils 60 collectively form a Parliament in a macro grid. This Parliament could be located in a Data Centre Server rack, or embodied in a Mainframe (as one of a stack of mosaic micro grid platters). The irregular shaped modules are not depicted in this diagram, but would be present to provide the Parliament with GPS, I/O, RAM, Communications and Wireless functionality.

Generally, a complex mosaic micro grid apparatus comprises a plurality of micro grid structures 1320 and a plurality of power hubs 3000 physically connected by irregular shaped micro grid bridge modules at connection interfaces 55. Each micro grid structure 1320 comprises a singular central area and radial arms external to and integral with the central area to define docking bays for accommodating modules to be inserted in the docking bays. The central area comprises a first plurality of processors that include a Council.

Figure 8E:
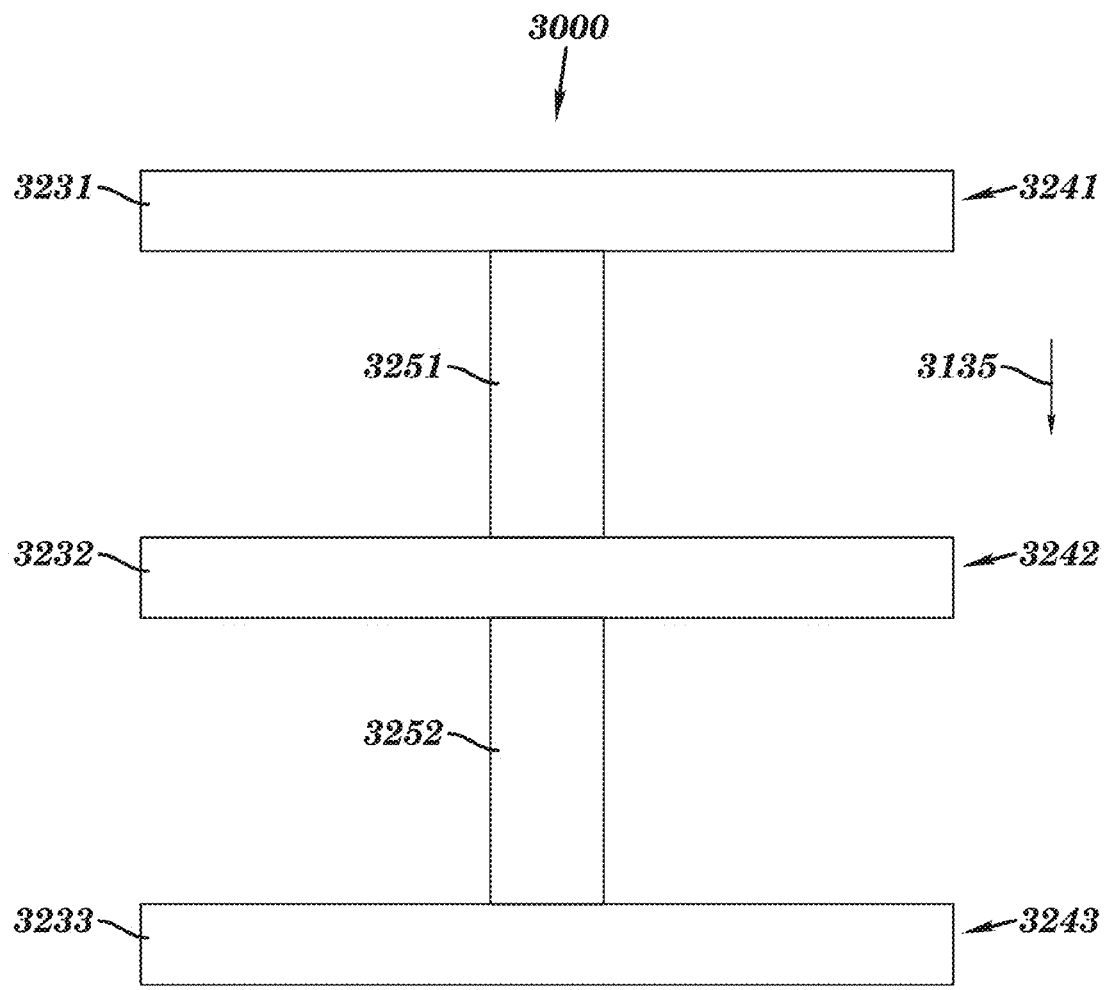
FIG. 8E is a vertical cross-sectional view of a power hub of FIG. 8D, in accordance with embodiments of the present invention.

FIG. 8E is a vertical cross-sectional view of a power hub 3000 of FIG. 3D, in accordance with embodiments of the present invention. The power hub 3000 comprises a plurality of central areas (3231, 3232, 3233) that coalesce to define internal structural space 3251 and 3252 configured to accommodate re-chargeable batteries and radial arms external to and integral with each central area to define horizontal layer docking bays for accommodating irregular shaped modules to be inserted in the horizontal layer docking bays pertaining to each central area. Each central area comprises rechargeable batteries. The central areas (3231, 3232, 3233) coalesce in the vertical direction 3135 which is perpendicular to the two-dimensional plane representing the complex mosaic micro grid apparatus 9200 of FIG. 8D.

Figure 9:
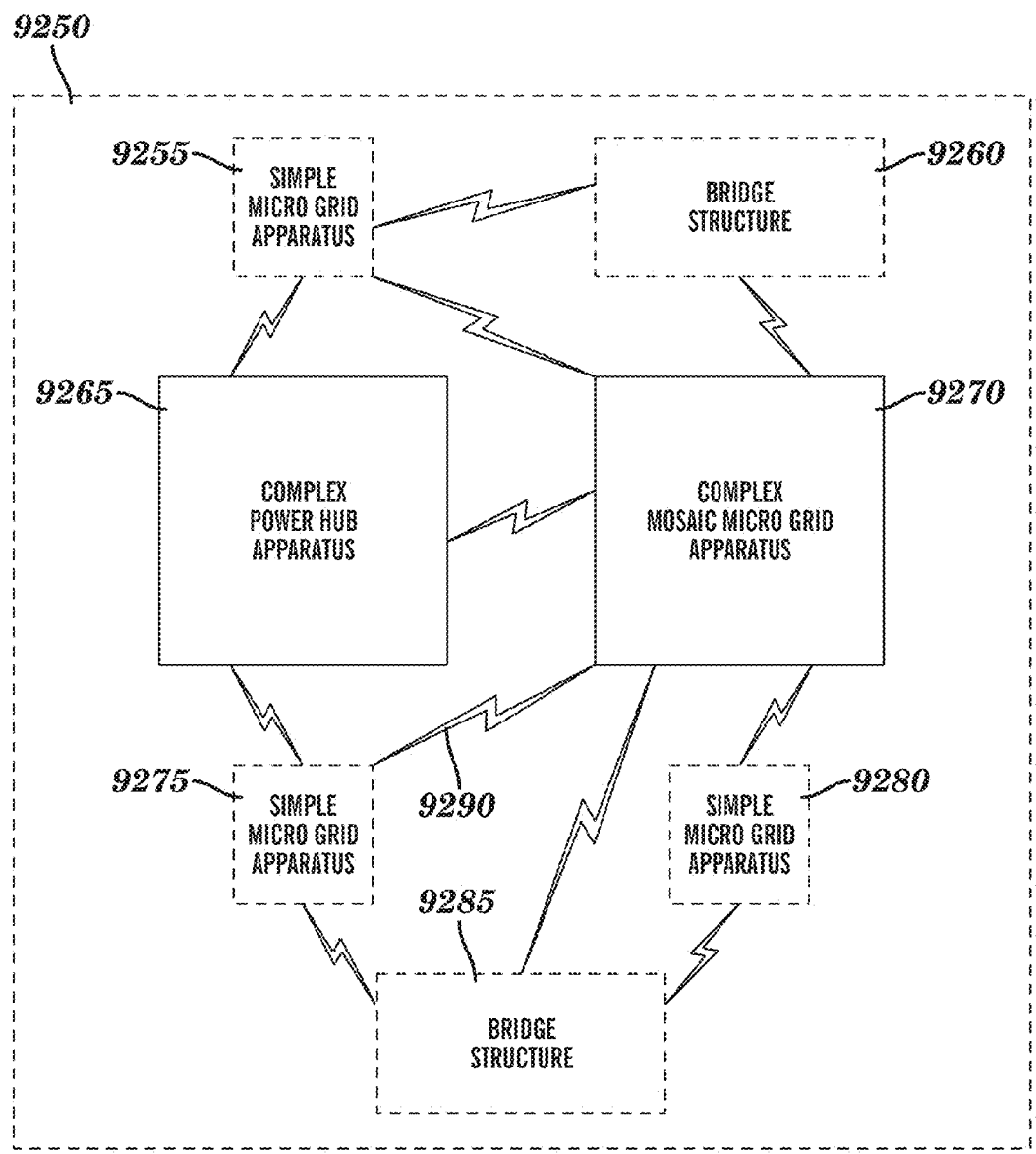
FIG. 9 is a block diagram of a configuration comprising wirelessly connected structures, in accordance with embodiments of the present invention.

Thus in the embodiment illustrated in FIG. 9, the plurality of central areas in each power hub 3000 consists of the three central areas 3231, 3232, and 3233. The central area 3231 defines first horizontal layer docking bays for accommodating irregular shaped modules to be inserted in the first horizontal layer docking bays. The central area 3232 defines second horizontal layer docking bays for accommodating irregular shaped modules to be inserted in the second horizontal layer docking bays. The central area 3233 defines third horizontal layer docking bays for accommodating irregular shaped modules to be inserted in the third horizontal layer docking bays.

The power hubs 3000 are tall rechargeable battery power towers distributed throughout the complex mosaic micro grid apparatus of FIG. 8D for providing horizontal power connection, provisioning direct-current (DC) power, voltage noise filtering, and close proximity current source distribution directly within the mainframe structure, to the micro grids positioned in situ. Each power hub 3000 comprises a plurality of central areas coalesced for including rechargeable batteries that provide electrical power for the Council in each micro grid structure 1320.

Each Power hub 3000 comprises vertical tier and horizontal layer data buses internally, to provide interconnection of all connection interfaces (55) on a plurality of vertical tiers and horizontal layers externally.

The Parliament in the complex mosaic micro grid apparatus comprises the Councils in the totality of micro grid structures 1320.

Even as a Server, or a component to a Mainframe, the Parliament in the complex mosaic micro grid apparatus 9200 facilitates its internal and external data communications with utilization of the enhanced TCP/IP model structure (see FIG. 13A infra), and packet structure (see FIG. 13B infra), and provides full peer-to-peer facilitation (including governance and artificial intelligence) within its interconnected structure.

Figure 8F:
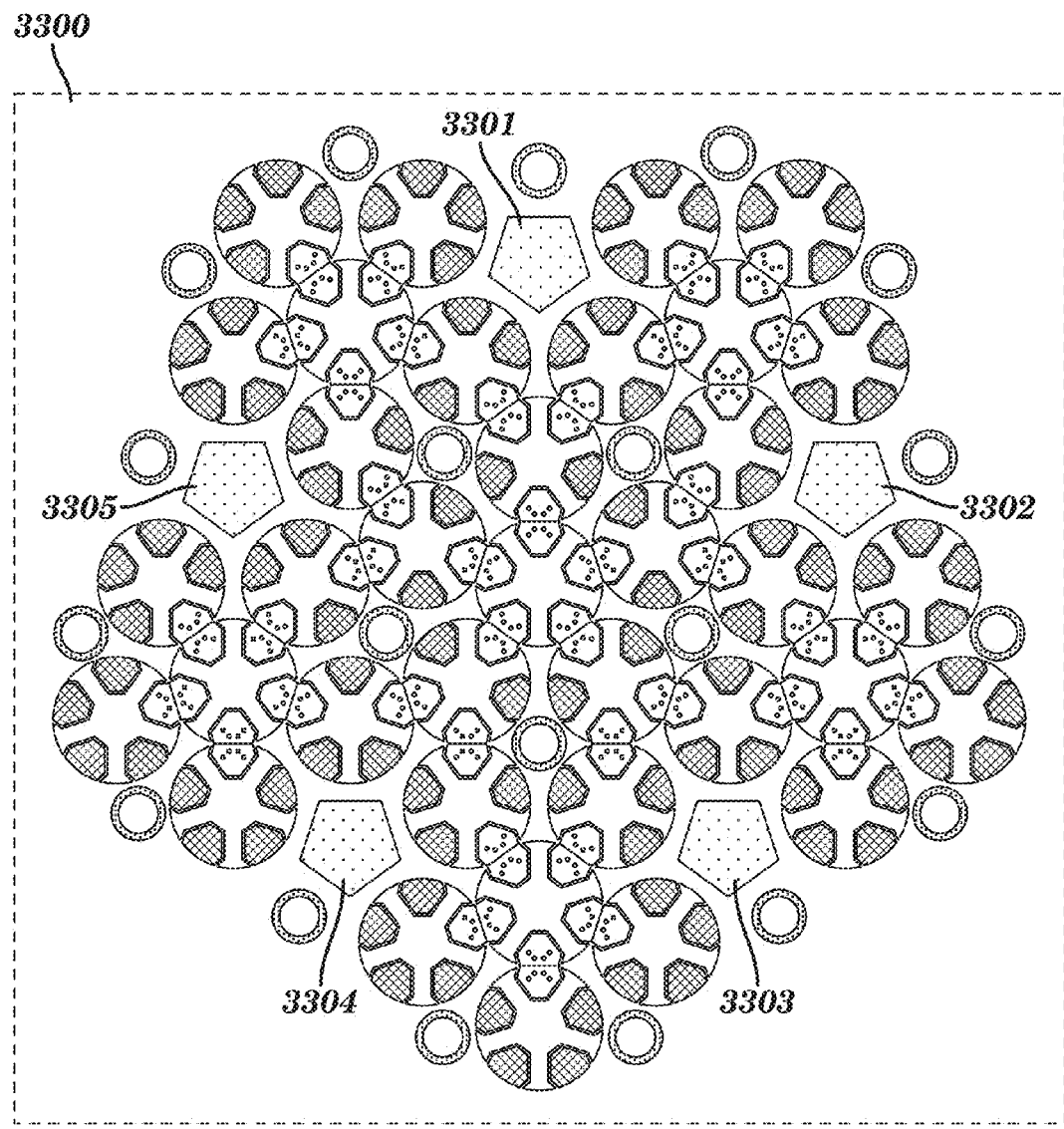
FIG. 8F depicts a complex mosaic micro grid circuit board with five multi-socket connection blocks, in accordance with embodiments of the present invention.

FIG. 8F depicts a complex mosaic micro grid circuit board 3300 with five multi-socket connection blocks (3301-3305), in accordance with embodiments of the present invention. The multi-socket connection blocks (3301-3305) are disposed amongst a plurality of micro grid apparatus's and power hubs (intruding through large accommodating holes in the circuit board). Connection pins (not shown) beneath the multi-socket connection blocks present to a similar complex mosaic circuit board directly underneath to connect the data buses and to physically form a more complex structure by aggregation of the connector blocks to form segmented backplanes.

Figure 8G:
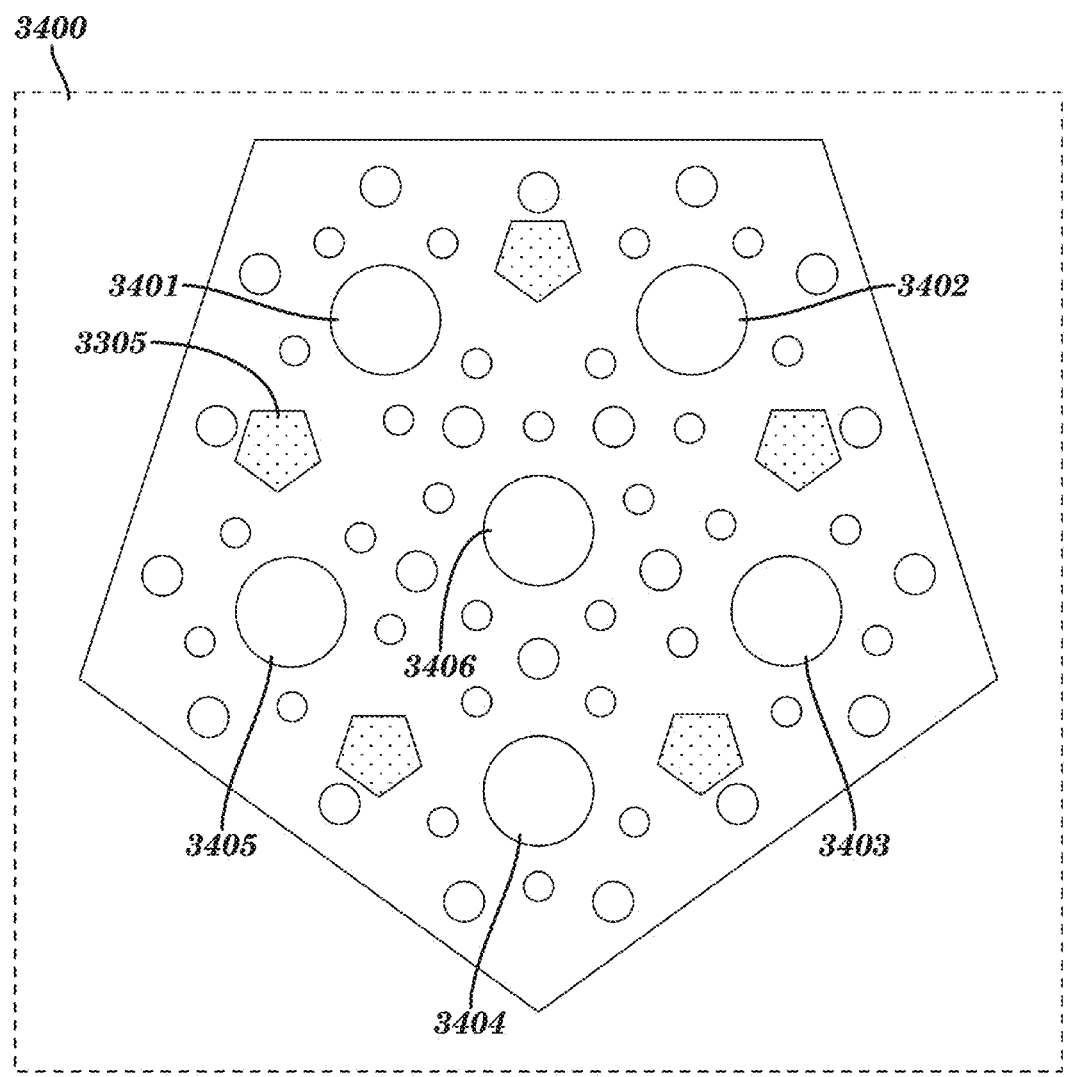
FIG. 8G depicts a complex mosaic micro grid circuit board with six large holes, in accordance with embodiments of the present invention.

FIG. 8G depicts a complex mosaic micro grid circuit board 3400 with six large holes (3401-3406), in accordance with embodiments of the present invention. The six large holes (3401-3406) are configured to accommodate the penetration of re-chargeable battery power towers intrusively through the assembled structure of a micro grid mainframe, provisioning direct-current (DC) power, voltage noise filtering, and close proximity current source distribution directly within the mainframe structure. A plurality of holes of a plurality of shapes and sizes may be manufactured for a plurality of power tower types and penetration formats for power disbursement. Positions of other structural holes and components (e.g., connector block 3305) are illustrated.

FIG. 9 is a block diagram of a configuration comprising wirelessly connected structures 9255, 9275, 9280, 9260, 9285, 9265, and 9270, in accordance with embodiments of the present invention.

The structures 9255, 9275, and 9280 are each essentially the micro grid apparatus 100 of FIG. 1 and each comprises an Executive as described supra.

The structures 9260 and 9285 are essentially the connectivity structure 9100 of FIG. 8A and each is a bridge structure that comprises a Parliament as described supra.

The structure 9265 is essentially the connectivity structure 9150 of FIG. 8B and is a complex power hub apparatus that comprises a Parliament as described supra.

The structure 9270 is essentially the connectivity structure 9150 of FIG. 8C and is a complex mosaic micro grid apparatus that comprises a Parliament as described supra.

A Government in a macro grid is formed by wirelessly congregating the three Executive in structures 9255, 9275, and 9280 and the four Parliaments in structures 9260, 9285, 9265, and 9270. The functionality of this Government is implemented though use of peer-to-peer governance software and peer-to-peer intelligence software, to embody a unique artificial intelligence.

Thus, the present invention provides a governance apparatus comprising a Government and a plurality of micro grid apparatuses.

The Government of the governance apparatus comprises a plurality of governmental components. The governmental components collectively comprising a plurality of Councils such that a macro grid comprising an artificial intelligence and the Government is configured to respond to an alert pertaining to an event through use of the artificial intelligence and the Government. Each governmental component is an either an Executive or a Parliament.

Each micro grid apparatus of the governance apparatus is either a simple micro grid apparatus or a complex micro grid apparatus. Each complex micro grid apparatus is a connectivity structure. Each micro grid apparatus is wirelessly connected to another micro grid apparatus of the plurality of micro grid apparatuses. Each micro grid apparatus comprises a unique governmental component of the plurality of governmental components. Each Executive consists of a unique processor of a plurality of processors disposed in a unique simple micro grid apparatus of the plurality of micro grid apparatuses. Each Parliament comprises a unique processor of each plurality of processors of at least two pluralities of processors disposed in a unique complex micro grid apparatus of the plurality of micro grid apparatuses. Each processor of each plurality of processors of each micro grid apparatus has its own operating system. Each unique processor in each Executive or Parliament in the Government is a Council of the plurality of Councils and has a unique operating system differing from the operating system of each other processor in the plurality of processors that comprises said each unique processor.

C. Macro Grid Communication

The artificial intelligence when generated by a Council in a micro grid (as a result of a detected alert or event) is provided with a fresh Class E (see FIG. 14B infra) Internet Protocol (IP) address. Consequentially each micro grid processor assigned as a resource to the artificial intelligence (or macro grid) has its own individual IP address linked as a sub-IP address to the primary Class E IP Address of the artificial intelligence. In this way, IP addressing links all Council assigned micro grid processor resources to a single macro grid Government (enhanced TCP/IP Governance layer) and the embodied Intelligence (enhanced TCP/IP Intelligence layer), for the life and requirement of the artificial intelligence, in one embodiment.

Transience for the artificial intelligence is provided by the governance layer software (i.e. governance software in the Governance Layer) to enable the relocation of the artificial intelligence that is at the Council allocated primary Class E IP address, from a macro grid processor under isolation or extinguishment, in one embodiment.

Thus, if the artificial intelligence that is residing in a primary Council having the primary Class E IP address (and having an artificial intelligence responsibility for implementing the artificial intelligence) is under isolation or extinguishment, then governance software in the Governance Layer may relocate the artificial intelligence to another Council in the Government.

Influenced by the increasing structural size of a macro grid, governance software will seek a Parliament (or an Executive) to assign a micro grid processor (or processors) as a mirror backup processor(s) (i.e., Council(s)) to the primary Council, in the event that the macro grid processor embodying the primary Class E IP address (i.e., the primary Council) is unexpectedly and catastrophically lost (i.e., cannot be located). In response to ascertaining that the primary Council cannot be located, the backup macro grid processor would become a replacement primary Council by immediately assuming artificial intelligence responsibility (and inheriting the primary Class E IP address) and seek its own mirror micro grid processor backup from its interface with the presiding Governance software in order to trigger assignment of a second mirror backup Council to the replacement primary Council.

Mirror backup macro grid processors facilitate maintaining macro grid cohesion. The lost processor would automatically re-assume its own unique IP address, and in isolation gravitate back to a disconnected and unassigned micro grid resource, governed by a Council (the unique processor in its micro grid), in one embodiment.

As the size of the macro grid increases further, multiple macro grid processors may be used to embody the artificial intelligence. To achieve this, the Class E IP address is shared in a similar method to the sharing of an IP address on an Internet Local Area Network (LAN), and a process of IP address translation occurs within the embodiment of the enhanced TCP/IP stack, in one embodiment.

Artificial intelligence governance layer software (i.e. the governance software in the Governance Layer) provides a process for the enhanced TCP/IP packet header information to be filtered through data security and data integrity algorithms, both to and from the intelligence layer software, to protect the artificial intelligence from attack (e.g., vicious attack). Artificial intelligence firewalls may be constructed, in one embodiment.

Figure 10A:
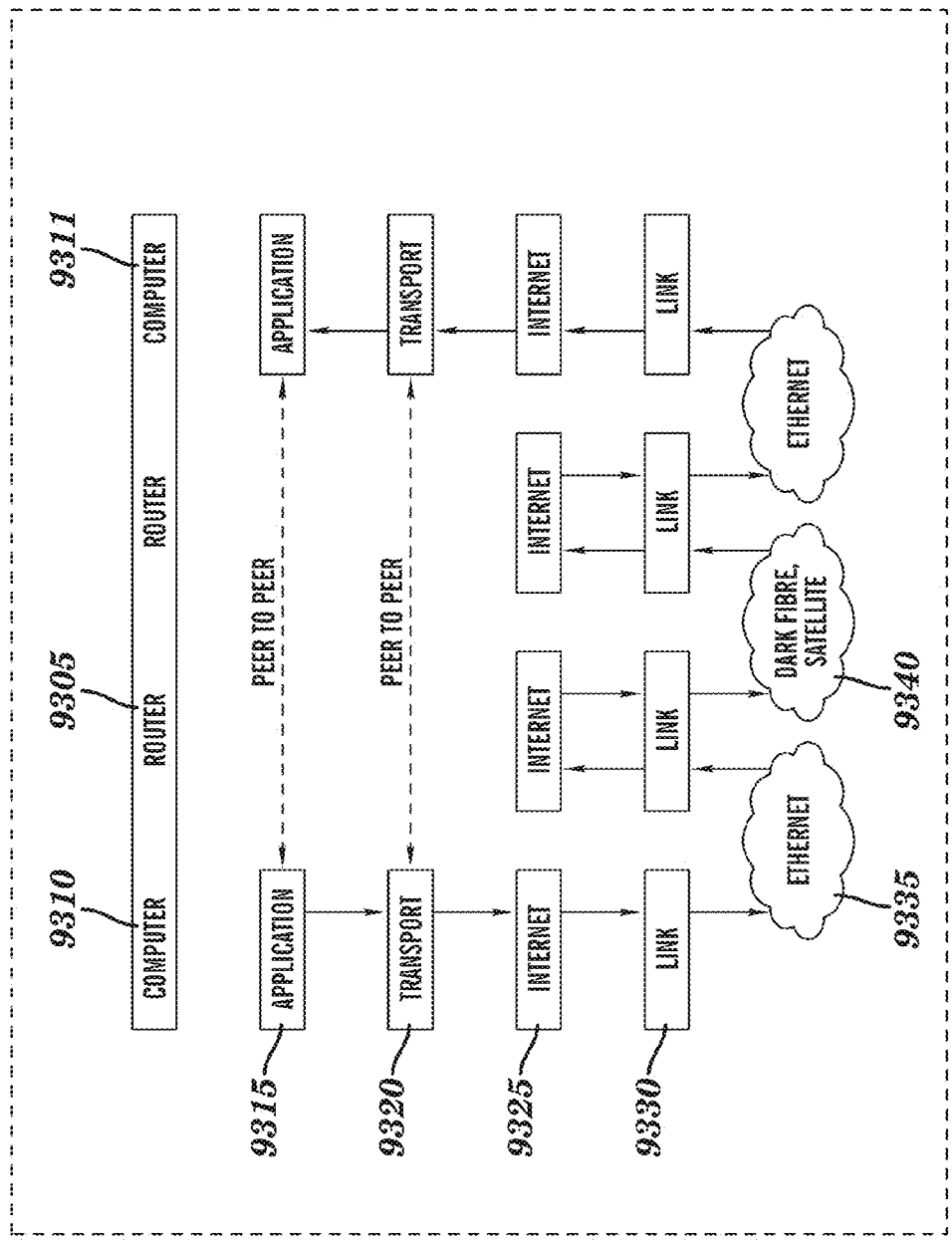
FIG. 10A is a data flow diagram depicting the current Internet communications structure between two computers, as a Transmission Control Protocol/Internet Protocol (TCP/IP) data communication model, in accordance with embodiments of the present invention.

FIG. 10A is a data flow diagram depicting the current Internet communications structure between two computers 9310 and 9311, as a Transmission Control Protocol/Internet Protocol (TCP/IP) data communication model, in accordance with embodiments of the present invention. The TCP/IP communication model comprises a five layered TCP/IP communications stack.

Layer 1 (9335) of the TCP/IP communications stack includes the physical use of Ethernet data cabling between the computer 9310 and its communication router 9305. Optical fiber and satellite 9340 are physical conduits utilized for the direct connection 9705 (see FIG. 12A infra) to another router and its Ethernet cable (cloud) connected computer 9311.

Layer 2 (9330) of the TCP/IP communications stack is the Link Layer, and carries the full TCP/IP data packet in data bits. The data packet is transmitted electronically from a computer 9310 via two routers to the computer 9311, encapsulated with a Frame header 9714 and a Frame footer 9715 as depicted infra in FIG. 12A for the Link Layer data packet structure.

Layer 3 (9325) of the TCP/IP communications stack is the Internet Layer, and carries the TCP/IP data packet without requirement for the Link Layer frame header and Frame footer. Layer 3 is the highest layer in the TCP/IP stack containing information required by the routers. Data for layers above the Internet Layer are delivered to those computational layers as peer-to-peer information, without interpretation of the packet data by the router.

Figure 12A:
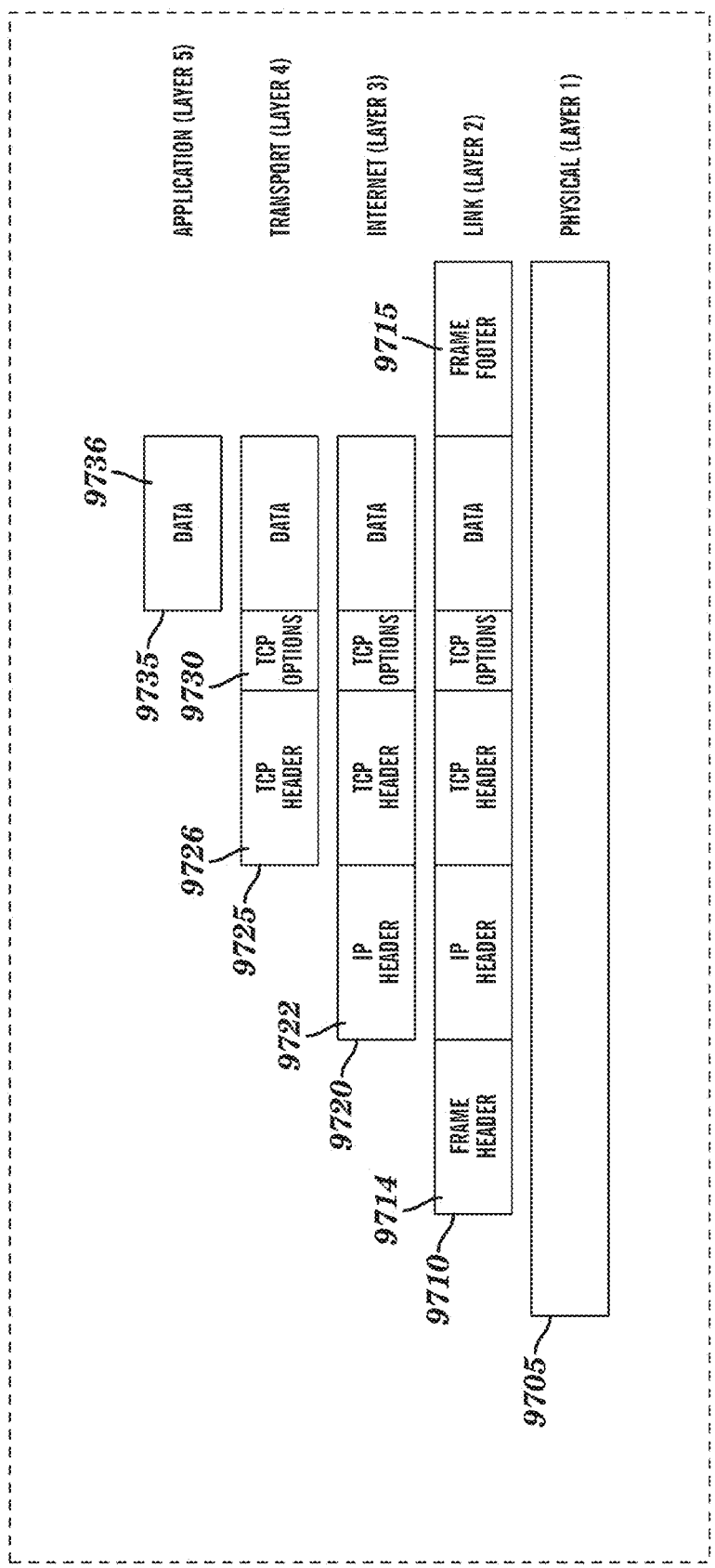
FIG. 12A is a structure diagram depicting the TCP/IP packet content on each layer of a five layered Transmission Control Protocol/Internet Protocol (TCP/IP) data communication model, for computers on the Internet in accordance with embodiments of the present invention.

Layer 4 (9320) of the TCP/IP communications stack is the Transport Layer, and carries the TCP packet without requirement for the IP header 9720 (see FIG. 12A infra).

Layer 5 (9315) of the TCP/IP communications stack is the Application Layer, and delivers the TCP packet data to the application software requiring it.

Figure 10B:
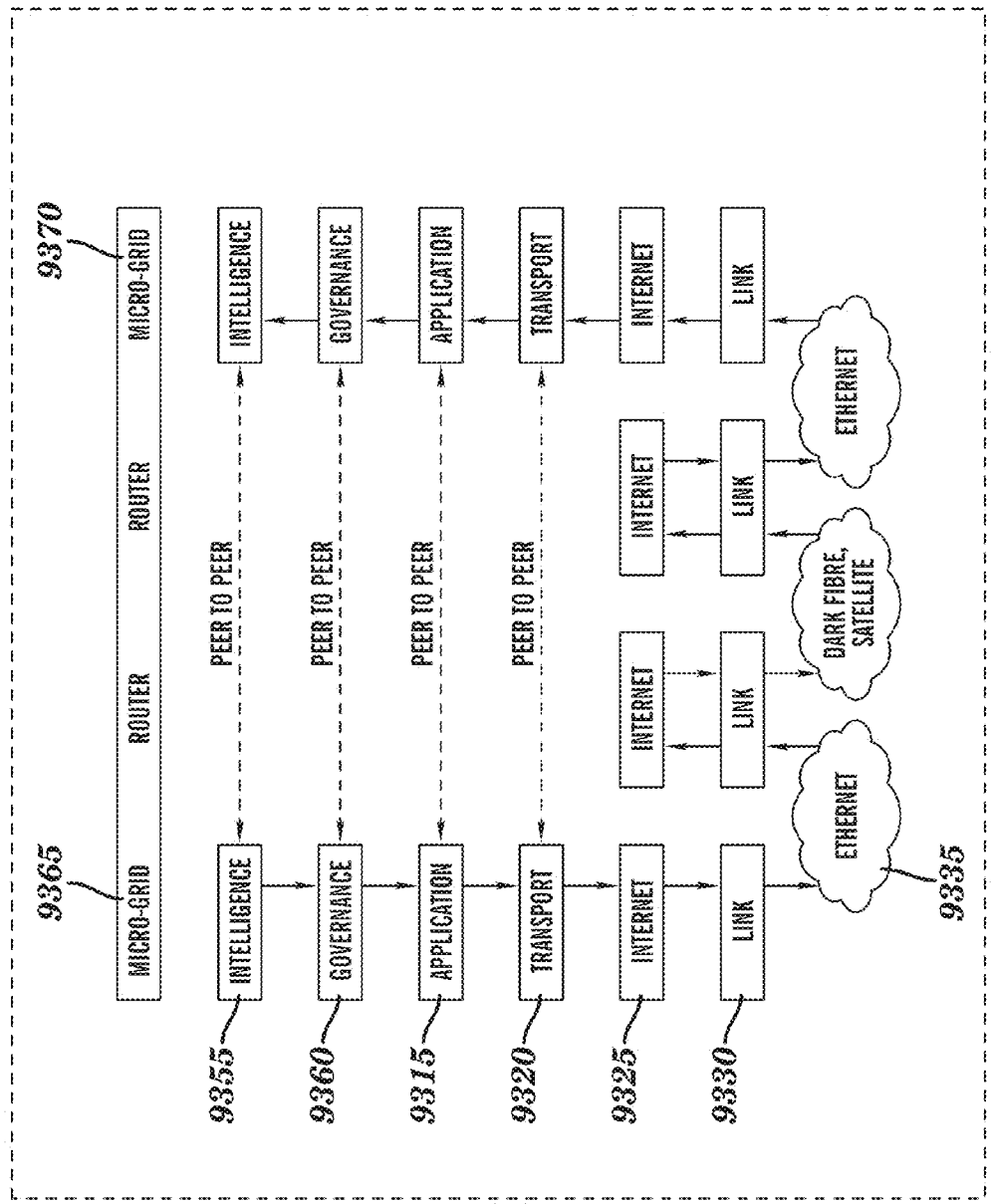
FIG. 10B is a data flow diagram depicting an enhanced Internet communications structure of a Government between two Councils, as a seven layered Transmission Control Protocol/Internet Protocol data communication model, by enhancement of the TCP/IP five layered model, to embody a Governance Layer and an Intelligence Layer, in accordance with embodiments of the present invention.

FIG. 10B is a data flow diagram depicting an enhanced Internet communications structure of a Government between two Councils, as a seven layered Transmission Control Protocol/Internet Protocol data communication model (in terms of an enhanced TCP/IP communication stack having seven layers), by enhancement of the TCP/IP five layered model, to embody a Governance Layer and an Intelligence Layer, in accordance with embodiments of the present invention.

The computers 9310 and 9311 in the TCP/IP five layered model of FIG. 10A are replaced in FIG. 10B with processors 9365 and 9370, respectively, which are Councils.

A sixth Governance Layer 9360 and a seventh Intelligence Layer 9355 have been included in the enhanced TCP/IP model, in accordance with embodiments of the present invention.

The Intelligence Layer 9355 comprises intelligence software configured to, inter alia, process data pertaining to the event, data pertaining to the alert, and data pertaining to the Government.

The Governance Layer comprises governance software which, inter alia, filters data in the TCP/IP packet header structure through data security and data integrity algorithms, both to and from the intelligence software in the Intelligence Layer, to protect the artificial intelligence from attack.

The micro grid unique processor 9370 acts as the recipient of the application software data, and peer-to-peer Governance and Intelligence control information is delivered by a known data packet delivery mechanism.

Figure 10C:
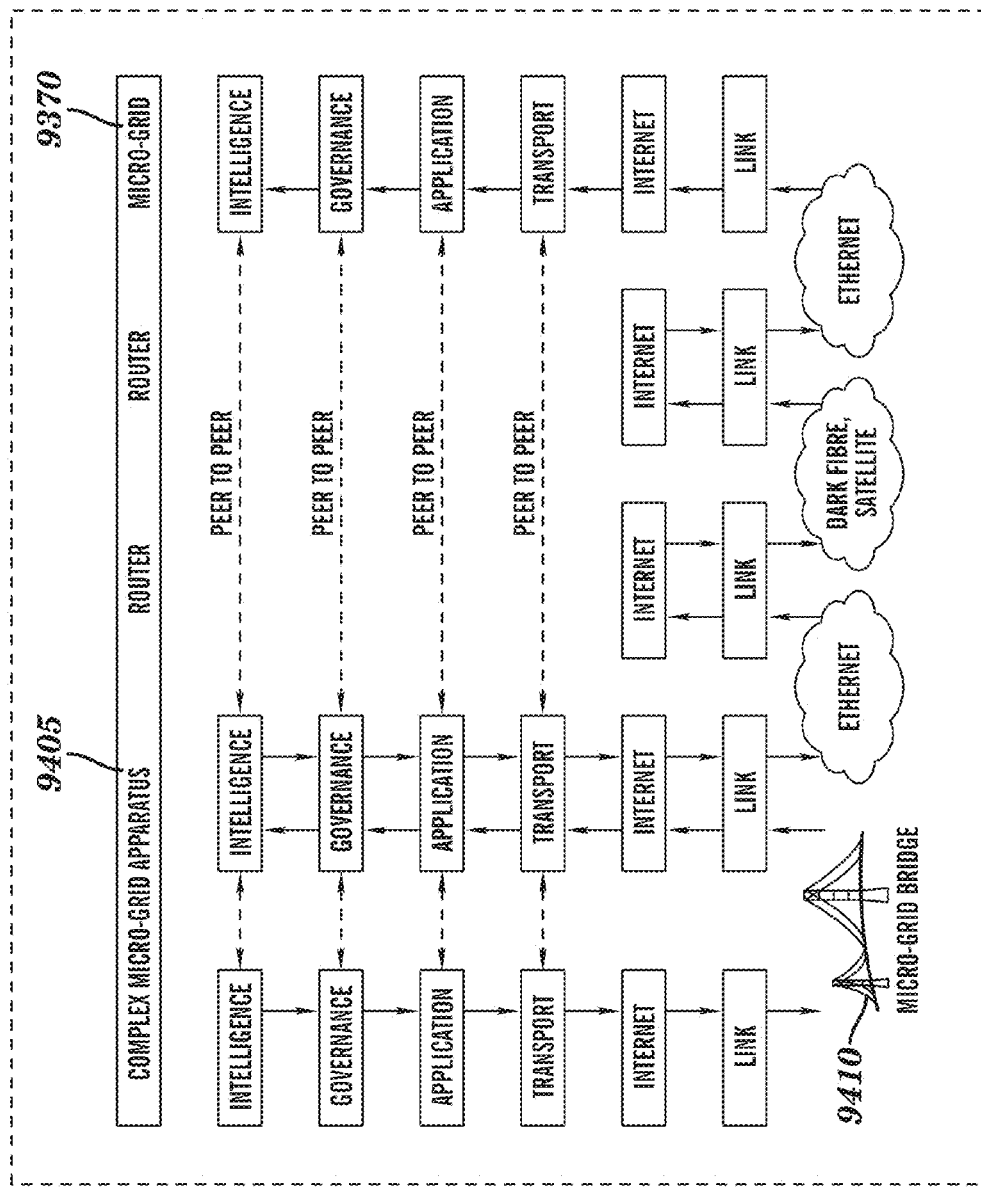
FIG. 10C is a data flow diagram depicting an enhanced Internet communications structure of a macro grid Government embodying a Parliament and a Council, as a seven layered Transmission Control Protocol/Internet Protocol (TCP/IP) data communication model, in accordance with embodiments of the present invention.

FIG. 10C is a data flow diagram depicting an enhanced Internet communications structure of a macro grid Government embodying a Parliament and a Council, as a seven layered Transmission Control Protocol/Internet Protocol (TCP/IP) data communication model, in accordance with embodiments of the present invention.

A connectivity structure in the form of complex micro grid apparatus 9405, with its Councils physically connected or bridged by a physical connectivity link (e.g., bridge) 9410 to create a Parliament, communicates with the recipient micro grid unique processor 9370 with information being provided peer-to-peer across the enhanced TCP/IP layers.

Peer-to-peer data interchange occurs within the complex micro grid apparatus, as well as across the Internet cloud.

Figure 10D:
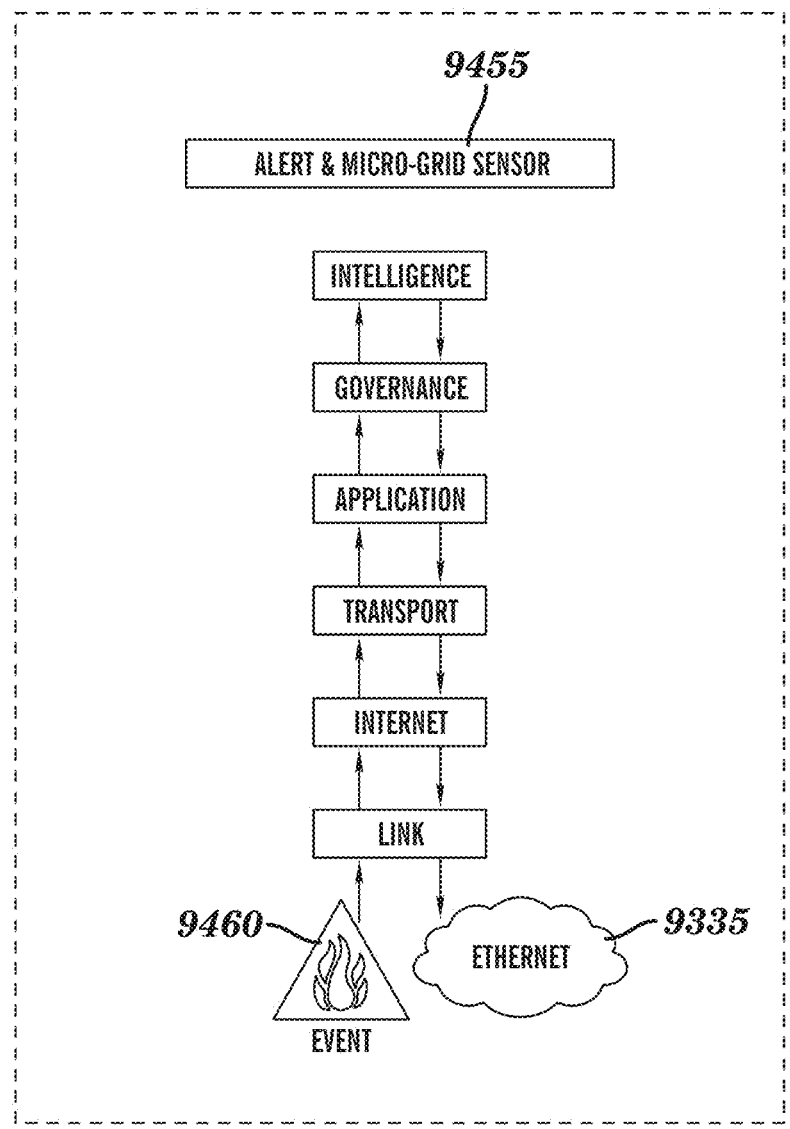
FIG. 10D is a data flow diagram depicting an enhanced Internet communications structure from a micro grid sensor to the Internet (Ethernet) cloud, as a seven layered Transmission Control Protocol/Internet Protocol (TCP/IP) data communication model, in accordance with embodiments of the present invention.

FIG. 10D is a data flow diagram depicting an enhanced Internet communications structure from a micro grid sensor 9455 to the Internet (Ethernet) cloud, as a seven layered Transmission Control Protocol/Internet Protocol (TCP/IP) data communication model, in accordance with embodiments of the present invention.

The diagram in FIG. 10D depicts the micro grid sensor apparatus (irregular shaped module) 9455 which includes a single unique micro processor also being its own Council, with operational software to enable alert sensing and conveyance of events and requests 9460, and embodiment of Governance and Intelligence communication over the seven layered TCP/IP model into the Ethernet network cloud 9335, in accordance with embodiments of the present invention.

Figure 10E:
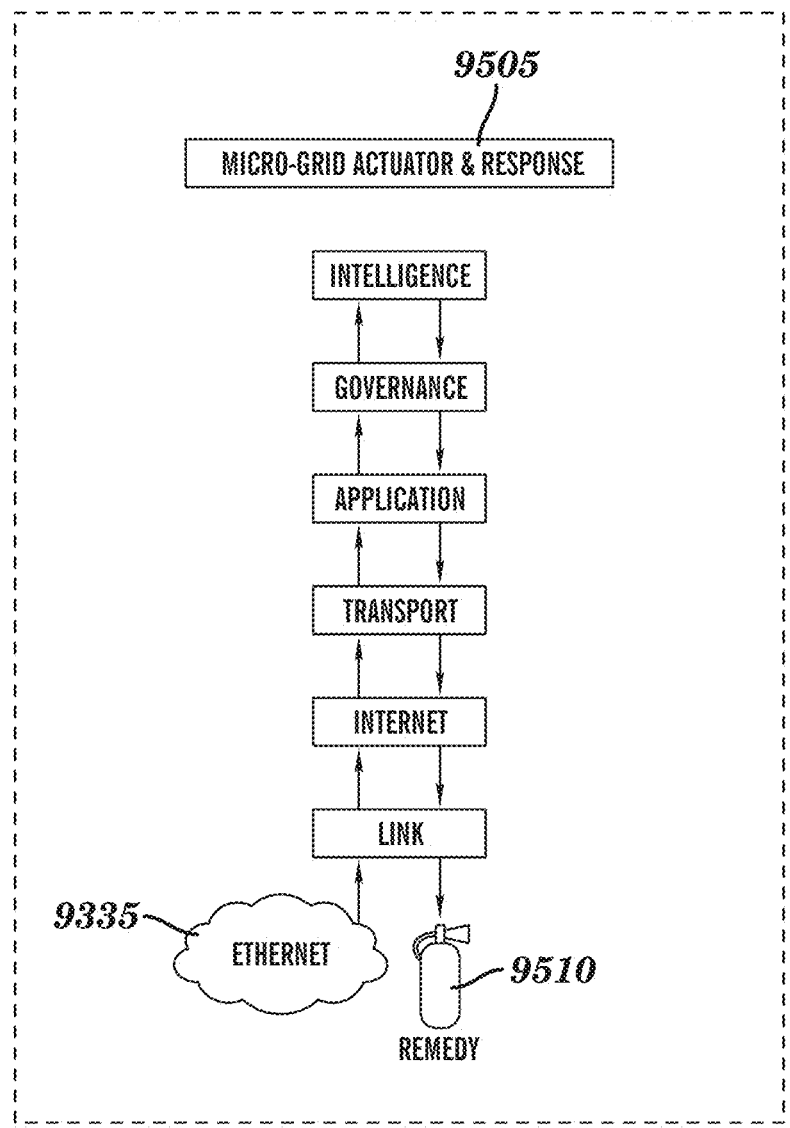
FIG. 10E is a data flow diagram depicting an enhanced Internet communications structure from the Internet (Ethernet) cloud to a micro grid actuator, as a seven layered Transmission Control Protocol/Internet Protocol (TCP/IP) data communication model, in accordance with embodiments of the present invention.

FIG. 10E is a data flow diagram depicting an enhanced Internet communications structure from the Internet (Ethernet) cloud 9335 to a micro grid actuator 9505, as a seven layered Transmission Control Protocol/Internet Protocol (TCP/IP) data communication model, in accordance with embodiments of the present invention.

The diagram in FIG. 10E depicts the micro grid actuator apparatus (irregular shaped module) 9505 which includes a single micro processor also being its own Council, with operational software to enable response and remedy 9510 and conveyance of actions, and embodiment of Governance and Intelligence communication over the seven layered TCP/IP model from the Internet (Ethernet) network cloud 9335, in accordance with embodiments of the present invention.

Figure 10F:
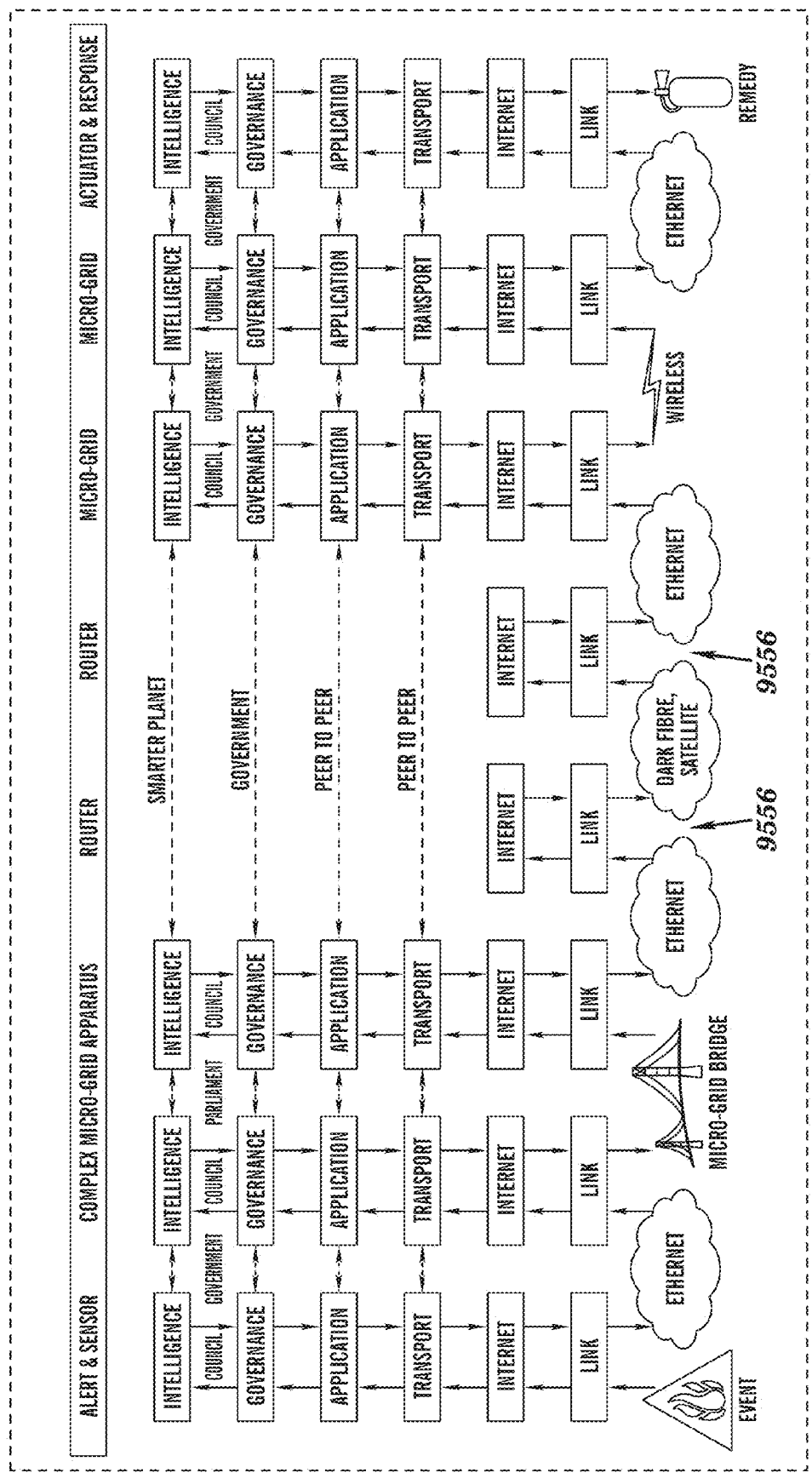
FIG. 10F is an end-to-end data concatenated data communication flow diagram of a macro grid activity from event to remedy depicting an enhanced Internet communications structure of a macro grid Government (presiding over its participating Parliaments and Councils) for the embodiment of a macro grid Intelligence, in a seven layered Transmission Control Protocol/Internet Protocol (TCP/IP) data communication model, in accordance with embodiments of the present invention.

FIG. 10F is an end-to-end data concatenated data communication flow diagram of a macro grid activity from event to remedy depicting an enhanced Internet communications structure of a macro grid Government (presiding over its participating Parliaments and Councils) for the embodiment of a macro grid Intelligence, in a seven layered Transmission Control Protocol/Internet Protocol (TCP/IP) data communication model, in accordance with embodiments of the present invention.

The diagram in FIG. 10F is a composite of FIGS. 10A-10E depicting consistent concatenation and communication continuity of a macro grid Government (presiding over four Councils and a Parliament with two Councils) responding to an alert (e.g., fire alarm), with an action of remedy (e.g., fire extinguisher), in accordance with embodiments of the present invention.

The current TCP/IP five layered model (see FIG. 10A) is identified in FIG. 10F by reference numeral 9556, and will continue to provide current Internet communication functionality to non-micro grid computers in concert with this invention, in accordance with embodiments of the present invention.

FIG. 11A is a diagram depicting an Open Systems Interconnection (OSI) seven layered model for data communication interchange, in accordance with embodiments of the present invention.

The OSI model for data communications (9605) was the original standard for Packet Switched Networks (PSN's); however it has been surpassed today, by the current and rapid expansion of the TCP/IP model (IPv4, and the more recent IPv6), and is fading from use.

OSI is a seven layered model, wherein the lower three layers 1-3 are the Media Layers (9615) and the upper four layers 4-7 are known as the Host Layers (9610).

Proprietary networks still exist using the OSI model, for Business, Military and Government agency data communication, to name a few. This invention also embodies the OSI model.

FIG. 11B is a diagram depicting an enhanced Open Systems Interconnection (OSI enhanced) nine layered model for micro grid data communication interchange, in accordance with embodiments of the present invention.

The present invention is intended to be used on proprietary OSI data networks, to provide Intelligence and Governance on alternative data communication platforms to the Internet.

Additional Virtual Layers (9665), which comprise a set of two layers, is added to the Host layers (9610) and Media Layers (9615) to form the highest layers in the enhanced OSI model (layer eight Governance, and layer nine Intelligence). An enhanced Transmission Control Protocol (TCP) header is used as the data unit.

The present invention includes the use of mechatronics (9660) in the OSI enhanced model, with the embodiment of IP Actuator functionality by the Artificial Intelligence in layer nine, and the embodiment of IP Alert Sensor functionality by Council Governance in layer eight, in accordance with embodiments of the present invention.

FIG. 12A is a structure diagram depicting the TCP/IP packet content on each layer of a five layered Transmission Control Protocol/Internet Protocol (TCP/IP) data communication model, for computers on the Internet in accordance with embodiments of the present invention. FIG. 12A is related directly to FIG. 10A.

The Physical layer (Layer 1, 9705) includes the physical use of Ethernet data cabling, optical fiber and satellites as physical conduits for the direct router connection over the Internet cloud to other computers.

The Link Layer (Layer 2, 9710) carries the full TCP/IP data packet in data bits. The data packet is encapsulated with a Frame header (9714) and Frame footer (9715) for completeness of the Link layer structure.

The Internet layer (Layer 3, 9720) is the highest layer in the TCP/IP stack where data is interpreted by a router. The Internet layer contains IP addresses and other information for the router in the IP header structure. Data embodied in the Frame header or Frame footer of Layer 2 are not necessary for interpretation in Layer 3.

The Transport layer (9725) provides delivery information and options (9730) in the TCP header (9726) for final carriage of the data field in the packet to layer 5 (Application Layer).

The Application Layer (9735) provides the data (9736) to the application software requiring it. The other data (i.e., Frame header (9714) and Frame footer (9715), IP Header (9722) and TCP Header (9726) and TCP Options (9730) in the data packet, are not required for interpretation by the Application Layer. The Application Layer is the highest layer in the current TCP/IP model.

The Transport and Application layers above the Internet layer function in a peer-to-peer way, without interpretation of the packet data by the router.

Additional Transport, Application, layer protocols and new Governance and Intelligence layer protocols are provided for full functionality of the enhanced TCP/IP seven layered model.

Figure 12B:
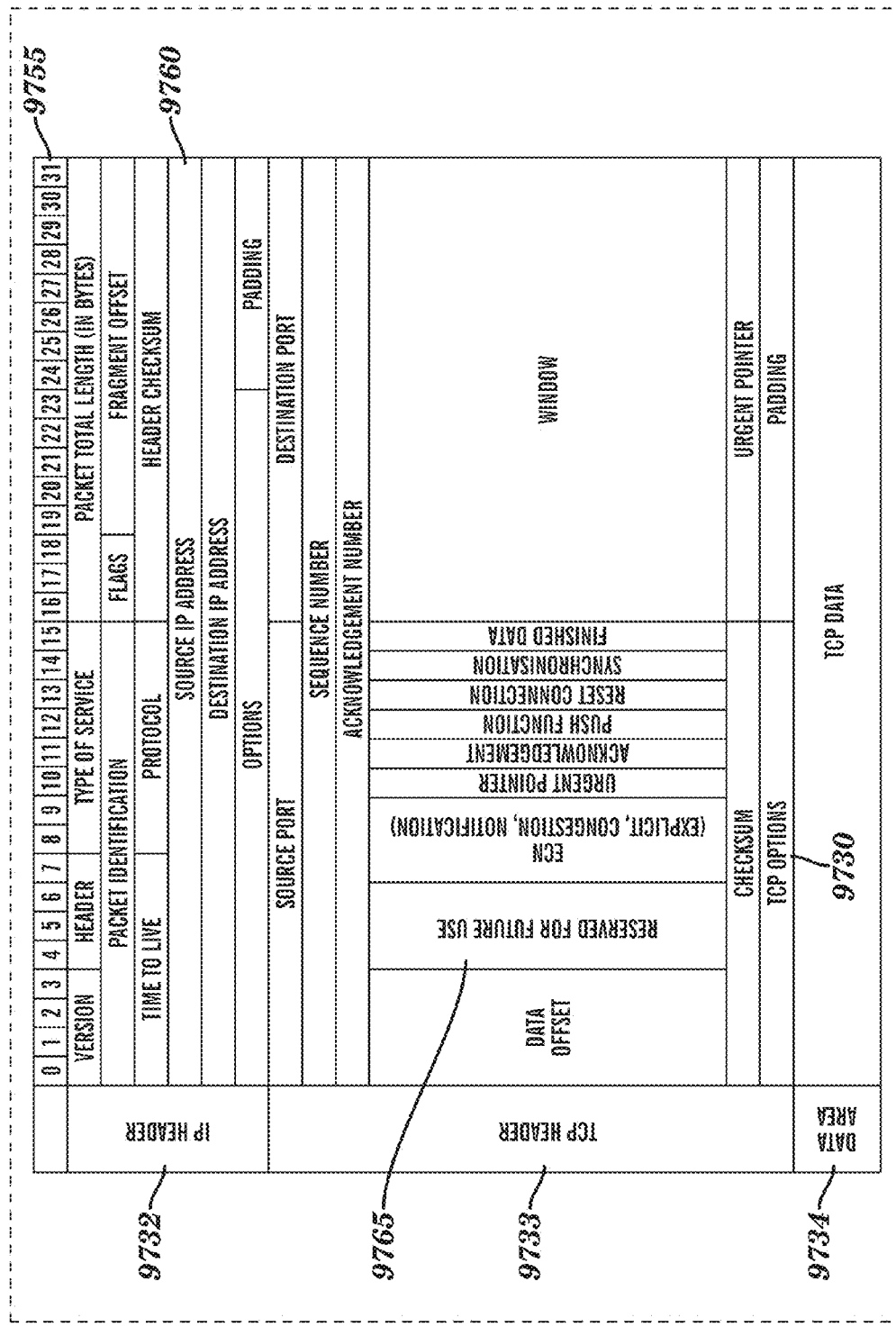
FIG. 12B is a detailed diagram depicting the TCP/IP header structure of an IPv4 (Internet Protocol Version Four) data packet for computer to computer data communication interchange, in accordance with embodiments of the present invention.

FIG. 12B is a detailed diagram depicting the TCP/IP header structure of the current IPv4 (Internet Protocol Version Four) data packet for computer to computer data communication interchange, in accordance with embodiments of the present invention.

The data are organized in groups of 32 data bits (0-31) (9755). The 32 data bits are also commonly described in octets (groups of 8 data bits). The structure of the pre-defined and allocated bits for the Data Area (9734), the TCP Header (9733) and IP Header (9732), in the TCP/IP data packet are known and function this way over the Internet today.

The source computer's IP address (9760) is contained in the IP Header as four octets (i.e. 32 bits), followed by the destination computers IP address (structured similarly).

There is an area of 3 bits 'reserved for future use' (9765), each currently set to zero, and space provided for 'TCP Options' (9730), in the TCP header.

Figure 13A:
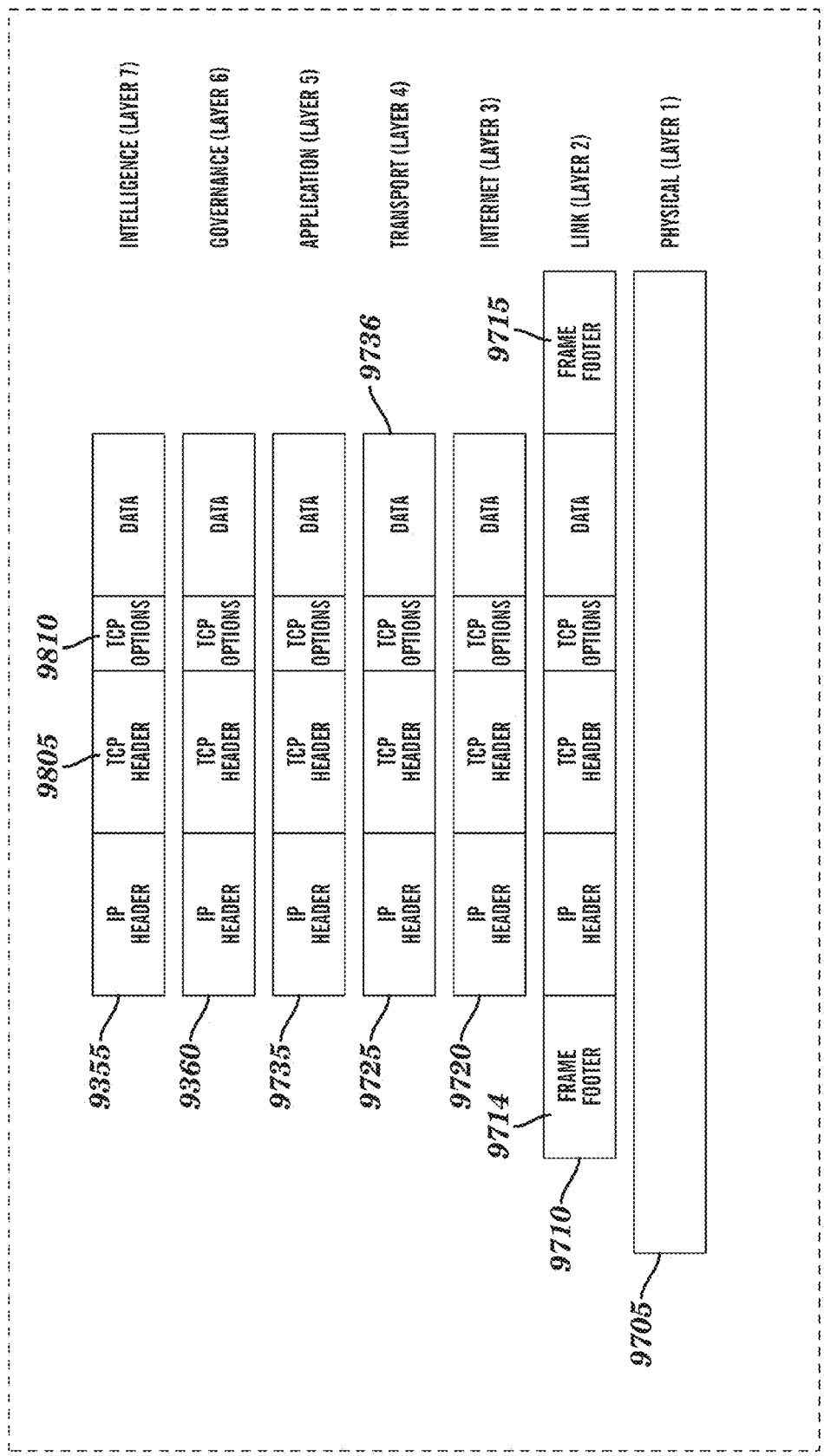
FIG. 13A is a structure diagram depicting the TCP/IP packet content on each layer of an enhanced seven layered Transmission Control Protocol/Internet Protocol (TCP/IP) data communication model, for inclusion of micro grid Governance and Intelligence on the Internet, in accordance with embodiments of the present invention.

FIG. 13A is a structure diagram depicting the TCP/IP packet content on each layer of an enhanced seven layered Transmission Control Protocol/Internet Protocol (TCP/IP) data communication model, for inclusion of micro grid Governance and Intelligence on the Internet, in accordance with embodiments of the present invention. FIG. 13A is related directly to FIG. 10B.

As in FIG. 10A, the Physical Layer (Layer 1, 9705) remains the same, as does the Link Layer (Layer 2, 9710) with its Frame header (9714) and Frame footer (9715)), the Internet Layer (3, 9720), the Transport Layer (4, 9725), and the Application layer (5, 9735) which continues to carry the data field (9736—see FIG. 12A) to the application software in the receiving computer.

Through the process of delivery the data packets remain structurally complete for the Transport and Application layers to locate the header and the data field information within the packet.

As described in FIG. 10B, the present invention adds two more layers, namely the Governance Layer (9360) and the Intelligence Layer (9355). All content of the data packet remains in place for delivery to these new layers.

The micro grid Governance layer 9360 (of Councils, Executives, Parliaments and Government) utilizes new identifier bits in the TCP header (9805) (corresponds to 'reserved for future use' 9765 in the TCP header in FIG. 12B) to tag, in one embodiment, the micro grid processor (that has just been delivered the data field in the Application layer), with its Governance type.

New Kind and Descriptor data in the TCP Options field (9810) (corresponding to 'TCP Options' 9730 in the TCP header in FIG. 12B) further facilitates the additional functions of Governance and Intelligence with provision of read and write fields for communicating information such as micro grid Alert data, GPS data and Actuator data. A Class E IP address is used for the micro grid processor when it is under Artificial Intelligence control.

The macro grid Intelligence layer 9355 (of Artificial Intelligence) comprises intelligence software capable of reading from (and writing into) the new Kind and Descriptor areas in the TCP Options field (9810). The macro grid Intelligence layer 9355 remains informed of the numbers of Council or Parliament governed micro grid processors assigned and available, whether at mobile or fixed locations. The Artificial Intelligence can place instructive data into the Data Area (9734—see FIGS. 12B and 13B) of the packet header structure of the packet to request application software (Layer 5) to undertake application tasks across its Government (e.g., for responding to an alert).

The first five layers (9705, 9710, 9720, 9725, 9735) remain functionally the same as the original five layered TCP/IP model; that is, to deliver data to the micro processors running application software across a communication link. This functionality continues as is, with its inclusion in the enhanced TCP/IP model, without impairment (see FIG. 10F). The new upper two layers drive Intelligence and Governance down to the Application layers (and across the network) to instruct the application software of tasks and priorities based on alerts (micro grid sensor) and requests for purposes of delivery and pro-active (micro grid actuator) remedy.

In the present invention, the Application layer forfeits its top role position (as described in the five layered TCP/IP model) and acts as the recipient and conveyer of Governance and Intelligence Instructions and Data, (as described in the enhanced seven layered TCP/IP model) for a more efficient and smarter use of the Internet.

Figure 13B:
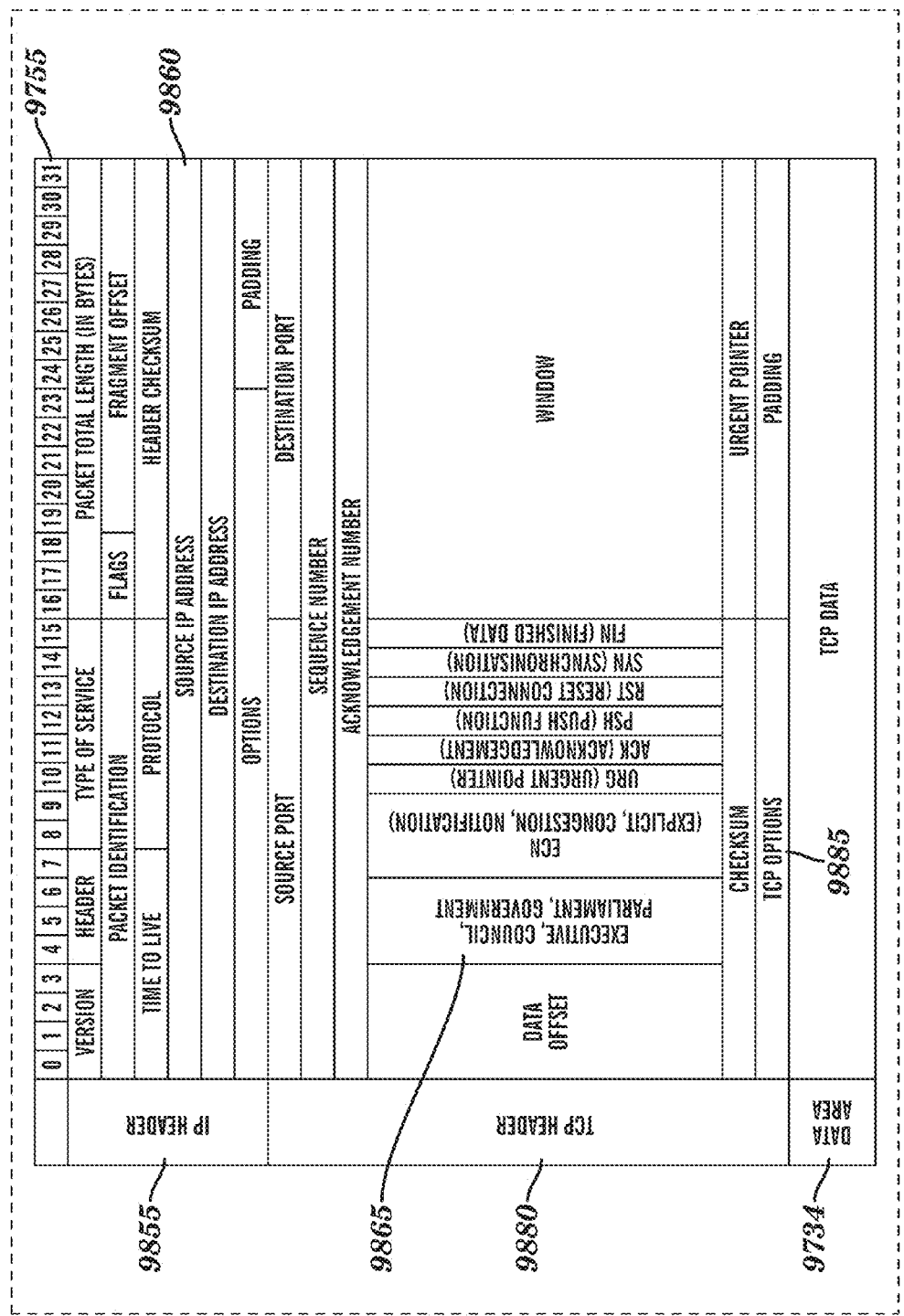
FIG. 13B is a detailed diagram depicting the TCP/IP header structure of an enhanced data packet for micro grid Council, Parliament and Government data communication interchange and Artificial Intelligence governance, in accordance with embodiments of the present invention.

FIG. 13B is a detailed diagram depicting the TCP/IP header structure of an enhanced data packet for micro grid Council, Executive, Parliament and Government data communication interchange and Artificial Intelligence governance, in accordance with embodiments of the present invention.

The data are organized in groups of 32 data bits (0-31) (9755). The 32 data bits are also commonly described in octets (groups of 8 data bits). In the present invention, the structure of the allocated bits for the enhanced TCP Header (9880) and enhanced IP Header (9855), in the TCP/IP data packet, includes unobtrusive data field changes to the existing TCP/IP structure as it operates over the Internet today.

The Source micro grid processor's IP address (9860) is contained in the IP Header as four octets (i.e. 32 bits). The present invention uses the currently reserved Class E IP address specifically for Artificial Intelligence IP addressing (see FIG. 14B infra). The Destination micro grid processor's IP address is similarly contained in the IP Header.

Thus, the IP header comprises the source IP address (9860) (e.g., of a Council that sends the packet) that is linked as a sub-IP address to the primary Class E IP address of the artificial intelligence. The IP header also comprises the destination IP address (e.g., pertaining to a Council that receives the packet) that is linked as another sub-IP address to the primary Class E IP address of the artificial intelligence.

Table 1 depicts the governance matrix and use of a sequence of bits in the enhanced TCP Header 9880, such as the three available data bits (4,5,6) to encode a multi bit identifier in the enhanced TCP Header 9880 to provide code replacement of the current Internet data bits (4,5,6) setting of (0,0,0). The three bits (4,5,6) of the multi bit identifier collectively identify a governance entity type (Executive; Council, Parliament; Government) in whose behalf the packet, or a message comprising the packet, is being sent. The bit combinations distinguishing the four governance entity types (Executive; Council, Parliament; Government) are: Executive (1,0,0); Council (1,0,1); Parliament (1,1,0); Government (1,1,1). In addition, the following combinations of bits for the three bits (4,5,6) maintains three available descriptors for future use: (0,0,1), (0,1,0) and (0,1,1).

TABLE 1

| Enhanced 'TCP Header' (Governance Identifiers) | | | |
|---|---|---|---|
| TCP Header | Data Bit 4 | Data bit 5 | Data Bit 6 |
| Current Internet | 0 | 0 | 0 |
| Future reserved | 0 | 0 | 1 |
| Future reserved | 0 | 1 | 0 |
| Future reserved | 0 | 1 | 1 |
| Executive | 1 | 0 | 0 |
| Council | 1 | 0 | 1 |
| Parliament | 1 | 1 | 0 |
| Government | 1 | 1 | 1 |

The intelligence software in the Intelligence Layer writes additional Kind and Descriptor fields (see Table 1 infra) into the TCP Options area (9885) in the enhanced TCP Header 9855. The Kind and Descriptor data comprises, inter alia, parameters pertaining to the event, the alert, and the Government (e.g., a current composition of the Government).

In one embodiment, the intelligence software in the Intelligence Layer is configured to read the Kind and Descriptor data in the TCP header upon being implemented (i.e, performed) by a Council or other processor after a processor Council (or other processor) receives the message.

Figure 14A:
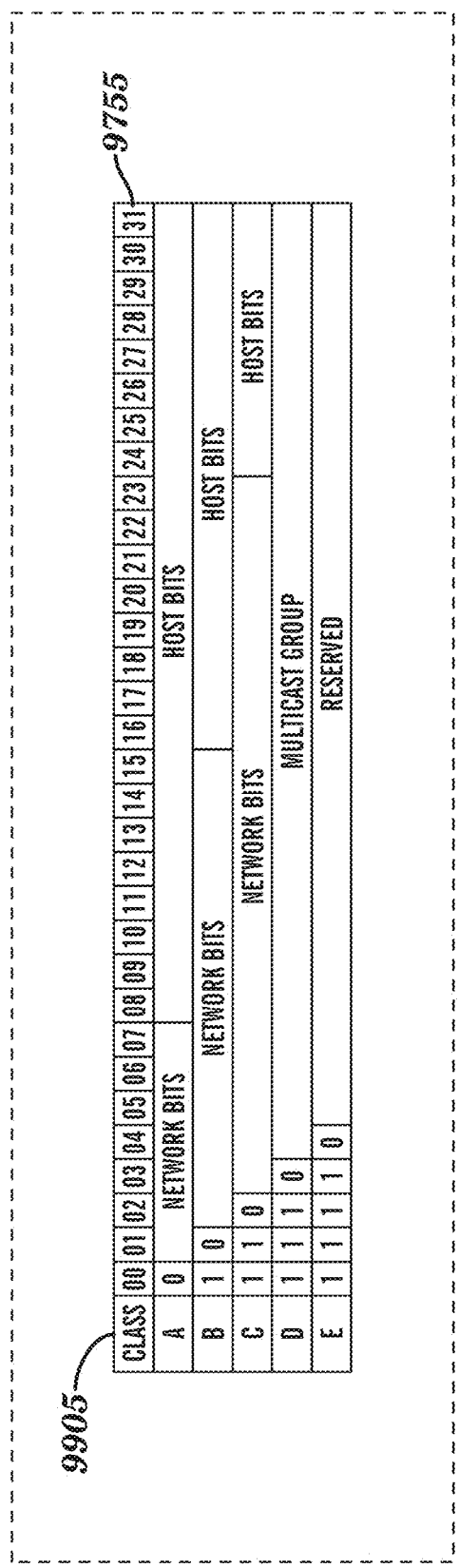
FIG. 14A is a diagram depicting Internet computer address (IP Address) Class structures in the IP header (9722), in accordance with embodiments of the present invention.

FIG. 14A is a diagram depicting Internet computer address (IP Address) Class structures in the IP header (9722), in accordance with embodiments of the present invention.

IP Addresses are Class (9905) defined and 32 bits in length (9755). The current TCP/IP Class E IP address is 'reserved' for future use. As seen in FIG. 14A, the classes A, B C, D, and E are distinguished by their high order bits.

FIG. 14B is a diagram depicting the Internet micro grid address (IP Address) Class E structure in the IP header, for micro grid Artificial Intelligence use, in accordance with embodiments of the present invention.

IP Addresses are Class defined and 32 bits in length (9755). The present invention utilizes the Class E IP address for Artificial Intelligence as indicated in FIG. 14B. As seen in FIG. 14B, the class E IP address has its five high order bits set to 1 1 1 1 0.

All assigned micro grid processors by a Council to a macro grid (Artificial Intelligence) under Council, Parliamentary or Governmental control would on assignment be allocated a Class E IP address, replacing its usual IP address, (until it returns back to its fold as an unassigned micro grid resource).

Table 2 depicts micro grid Kind and Descriptor enhancements to the TCP Options structure in the TCP header, for micro grid Sensor, GPS, Council, Executive, Parliament, Government, Actuator and Artificial Intelligence use, in accordance with embodiments of the present invention.

TABLE 2

Enhanced 'TCP Options' (KIND & Descriptors)

| KIND | DESCRIPTION |
|---|---|
| 29 | Artificial Intelligence (AI) - Scale of Detected Event (from IP Sensor)<br>    Alert Value - (8 levels) |
| 30 | Artificial Intelligence- Council location (GPS data)<br>    Telemetry Word (TLM) - 30 bits<br>    Hand Over Word (HOW) - 30 bits |
| 31 | Artificial Intelligence (Micro-Grid)<br>    Council<br>        total number of processors under Council governance<br>        number of processors currently assigned to AI by Council<br>    Parliament<br>        total number of Councils in the Parliament<br>        number of Councils in the Parliament currently employed by AI |
| 32 | Artificial Intelligence (Macro-Grid)<br>    Government<br>        number of Councils<br>            number of mobile Councils (as determined by variable GPS data)<br>            number of fixed Councils (as determined by static GPS data)<br>        number of Parliaments<br>            number of mobile Parliaments (as determined by variable GPS data)<br>            number of fixed Parliaments (as determined by static GPS data) |
| 33 | Artificial Intelligence - Scale of Action (IP Actuator)<br>    Response Value - (8 levels) |

Currently, many 'Kind' fields are available in the TCP/IP 'TCP Options' field for Packet Switched Networks. The present invention utilizes Kind 29-33 for Artificial Intelligence and Governance Descriptors in the data packet.

Kind 29 functions as the data location in the TCP header to carry the sensed Alert Value from a specific micro grid sensor device across all enhanced TCP/IP layers to the Intelligence Layer. The sensed Alert Value denotes a scale (S) of the event which is a function of the magnitude of the event and, in one embodiment, is 8 bits (0-7) for Kind 29.

Kind 30 functions as the data location in the TCP header to carry the Global Positioning System (GPS) data from a specific GPS irregular shaped module connected to a micro grid apparatus, across all enhanced TCP/IP layers to the Intelligence layer. In one embodiment, the GPS data is structured in two 'words' of 30 bits each, namely a Telemetry Word (TLM) and a Hand Over Word (HOW). Kind 30 requires 60 bits, 4 additional packing bits (zeros) are required to complete 8 octets (64 bits) of data.

As a result of the present invention embodying GPS data in Kind 30 of the TCP header, Internet administrators gain the capability of identifying the geographic location of an event or the source of the event such as inappropriate Internet content or use. This provides the police and prosecution with a world-wide tool for locating the source of the event such as offences (e.g., cyber bullying, and Internet wrongdoing) and linking the information together as material evidence.

Kind 31 functions as the data location in the TCP header to carry four fields (i.e., fields 1, 2, 3, and 4) of information. Kind 31 data pertains to resource processors which are micro grid processors that have been assigned to the artificial intelligence such that each resource processor is not a Council in the Government.

Field 1 of Kind 31 comprises the total number of resource processors available under single Council (i.e., Executive) governance. A resource processor is a micro grid processor not functioning as a macro grid processor of the macro grid and is used as a resource (e.g., a computational resource) of a Council in the Government.

Field 2 of Kind 31 comprises the specific number of resource processors that have been assigned by the Council(s) to the macro grid (Artificial Intelligence).

Field 3 of Kind 31 comprises the total number of resource processors available under all Parliaments' governance.

Field 4 of Kind 31 comprises the specific number of resource processors that have been assigned by the Parliament(s) to that Artificial Intelligence.

Kind 32 functions as the data location in the TCP header to carry four additional fields (i.e., fields 1, 2, 3, and 4) of information. Kind 32 data identifies a total number of mobile Councils in the Government, a total number of fixed Councils in the Government, a total number of mobile Parliaments in the Government, and a total number of fixed Parliaments in the Government.

Field 1 of Kind 32 comprises the total number of wireless connected mobile Councils (Mobility is determined by variations in the sampled GPS data) to the macro grid (Artificial Intelligence).

Field 2 of Kind 32 comprises the total number of wireless but fixed location Councils (Non-mobility is determined by static sampled GPS data) with micro grid processors assigned to the macro grid (Artificial Intelligence).

Field 3 of Kind 32 comprises the total number of wireless connected mobile Parliaments (Mobility is determined by variations in the sampled GPS data) to the macro grid (Artificial Intelligence).

Field 4 of Kind 32 comprises the total number of wireless but fixed location Parliaments (Non-mobility is determined by static sampled GPS data) with Councils and micro grid processors assigned to the macro grid (Artificial Intelligence).

Kind 33 functions as the data location in the TCP header to carry the Response Action Value to a specific micro grid actuator device across all enhanced TCP/IP layers to the Intelligence layer of the actuator and delivery of the remedy or response. The Response Action Value denotes a scale of the response to the event which is a function of the magnitude of the response and, in one embodiment, is 8 bits (0-7) for Kind 33.

D. Data Processing Apparatus

Figure 15:
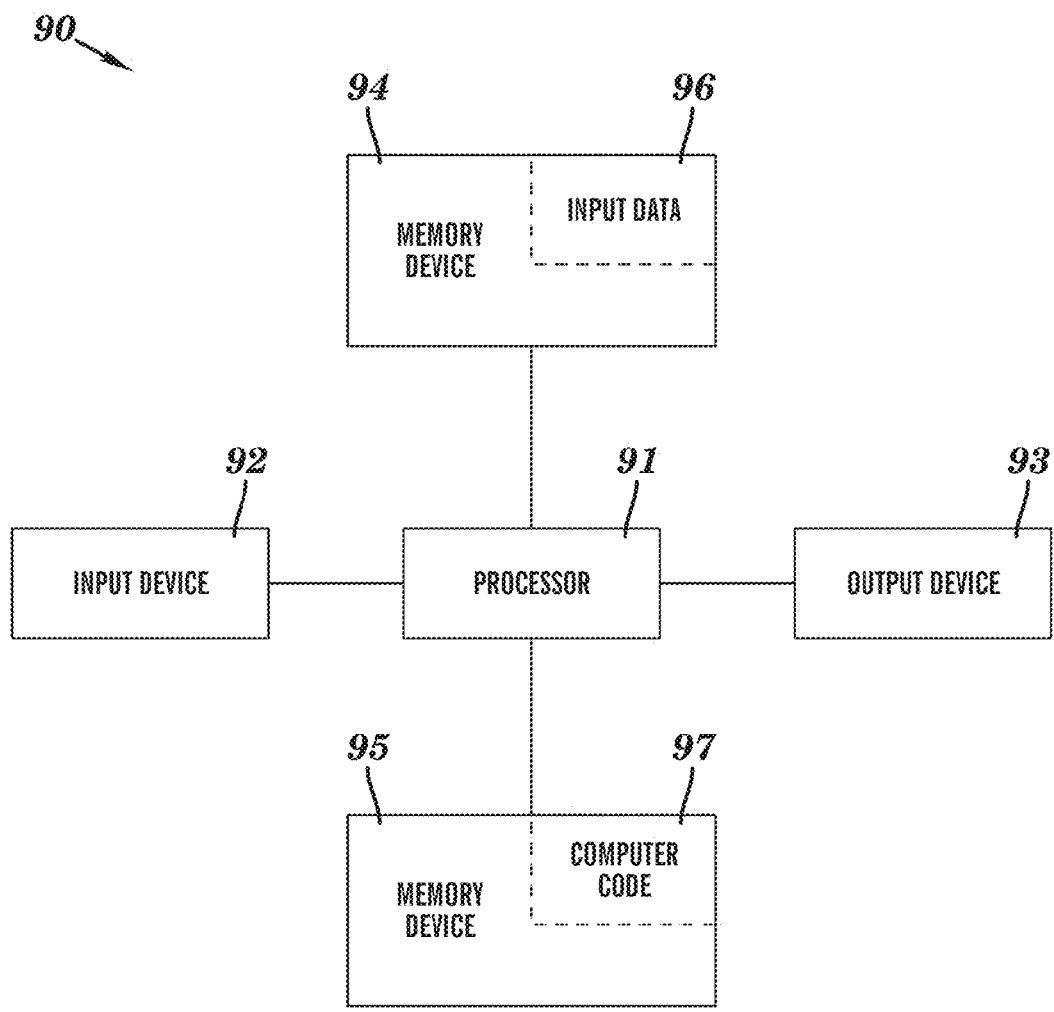
FIG. 15 illustrates an exemplary data processing apparatus used for implementing any process or functionality of any processor used in accordance with embodiments of the present invention.

FIG. 15 illustrates an exemplary data processing apparatus 90 used for implementing any process or functionality of any processor used in accordance with embodiments of the present invention. The data processing apparatus 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for implementing any process or functionality of any processor used in accordance with embodiments of the present invention. The processor 91 implements (i.e., performs) the computer code 97. The memory device 94 includes input data 96. The input data 96 includes input required by the computer code 97. The output device 93 displays output from the computer code 97.

Either or both memory devices 94 and 95 (or one or more additional memory devices not shown in FIG. 15) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Any of the components of the present invention could be created, integrated, hosted, maintained, deployed, managed, serviced, supported, etc. by a service provider who offers to facilitate implementation of any process or functionality of any processor used in accordance with embodiments of the present invention. Thus the present invention discloses a process for deploying or integrating computing infrastructure, comprising integrating computer-readable code into the data processing apparatus 90. Therefore, the code in combination with the data processing apparatus 90 is capable of performing any process or functionality of any processor used in accordance with embodiments of the present invention.

In another embodiment, the invention provides a method that performs the process steps of the invention on a subscription, advertising, and/or fee basis. That is, a service provider, such as a Solution Integrator, could offer to facilitate implementation of any process or functionality of any processor used in accordance with embodiments of the present invention. In this case, the service provider can create, integrate, host, maintain, deploy, manage, service, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 15 shows only one processor 91, the processor 91 may represent an array of processors such as the plurality of processors 65 coupled to the input device 92, the output device 93, and the memory devices 94 and 95.

While FIG. 15 shows the data processing apparatus 90 as a particular configuration of hardware and software, any configuration of hardware and software, as would be known to a person of ordinary skill in the art, may be utilized for the purposes stated supra in conjunction with the particular data processing apparatus 90 of FIG. 15. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A communication method, said method comprising:
providing a governance apparatus, said governance apparatus comprising: a Government comprising a plurality of governmental components, said governmental components collectively comprising a plurality of Councils such that a macro grid comprising an artificial intelligence and the Government is configured to respond to an alert pertaining to an event through use of the Government, each governmental component being an either an Executive or a Parliament; and communicating between governance entities within the governance apparatus, said Government responding to the alert, each governance entity being a Council of the plurality of Councils, said communicating comprising a first Council of the plurality of Councils sending a message to a second Council of the plurality of Councils in accordance with an enhanced Transmission Control Protocol/Internet Protocol (TCP/IP) communication stack of layers and a TCP/IP packet header structure comprising an enhanced IP header, an enhanced TCP header, and a Data Area, wherein the TCP/IP communication stack of layers comprises a Governance Layer and an Intelligence Layer, wherein the Intelligence Layer comprises intelligence software configured to process data pertaining to the event, data pertaining to the alert, and data pertaining to the Government, and wherein the Governance Layer comprises governance software configured to filter data in the TCP/IP packet header structure through data security and data integrity algorithms, both to and from the intelligence software in the Intelligence Layer, to protect the artificial intelligence from attack; and assigning the artificial intelligence a primary Class E IP address having its five high order bits set to 1 1 1 1 0, wherein the enhanced IP header comprises a source IP address pertaining to the first Council and being linked as a first sub-IP address to the primary Class E IP address of the artificial intelligence, and wherein the enhanced IP header further comprises a destination IP address pertaining to the second Council and being linked as a second sub-IP address to the primary Class E IP address of the artificial intelligence, wherein the artificial intelligence is residing in a primary Council of the plurality of Councils having the primary Class E IP address and is under isolation or extinguishment, and wherein the governance software is further configured to relocate the artificial intelligence to another Council of the plurality of Councils.

2. The method of claim 1, wherein the method further comprises said artificial intelligence placing instructive data into the Data Area to request application software to undertake application tasks across the Government for responding to the alert.

3. The method of claim 1, wherein the enhanced TCP header comprises a multi bit identifier consisting of a sequence of bits that identify a governance entity type in whose behalf the message is being sent by the first Council.

4. The method of claim 1, wherein the method further comprises said intelligence software writing Kind and Descriptor data into the enhanced TCP header, wherein the Kind and Descriptor data comprises parameters pertaining to the event, the alert, and/or the Government.

5. The method of claim 4, wherein the method further comprises said intelligence software configured to read the Kind and Descriptor data in the TCP header upon being implemented by the second Council after the second Council receives the message.

6. The method of claim 4, wherein the Kind and Descriptor data comprise a scale of the event, a scale of the response to the event, and GPS data which identify a location of the event or a location of a source of the event.

7. The method of claim 4, wherein the Kind and Descriptor data comprise data pertaining to resource processors which are micro grid processors that have been assigned to the artificial intelligence such that each resource processor is not a Council of the plurality of Councils.

8. The method of claim 4, wherein the Kind and Descriptor data comprise data identifying a total number of mobile Councils in the Government, a total number of fixed Councils in the Government, a total number of mobile Parliaments in the Government, and a total number of fixed Parliaments in the Government.

9. The method of claim 1, said governance apparatus further comprising: a plurality of micro grid apparatuses, each micro grid apparatus being either a simple micro grid apparatus or a complex micro grid apparatus, each complex micro grid apparatus being a connectivity structure, each micro grid apparatus being wirelessly connected to another micro grid apparatus of the plurality of micro grid apparatuses, each micro grid apparatus comprising a unique governmental component of the plurality of governmental components, each Executive consisting of a unique processor of a plurality of processors disposed in a unique simple micro grid apparatus of the plurality of micro grid apparatuses, each Parliament consisting of a unique processor of each plurality of processors of at least two pluralities of processors, each processor of each plurality of processors of each micro grid apparatus having its own operating system, each unique processor in each Executive or Parliament in the Government being a Council of the plurality of Councils and having a unique operating system differing from the operating system of each other processor in the plurality of processors that comprises said each unique processor.

\* \* \* \* \*